US011906395B2

(12) United States Patent
Shekhar et al.

(10) Patent No.: US 11,906,395 B2
(45) Date of Patent: Feb. 20, 2024

(54) SHAKER VIBRATION AND DOWNHOLE CUTTINGS MEASUREMENT ANALYSIS AND PROCESSING

(71) Applicant: Halliburton Energy Services, Inc., Houston, TX (US)

(72) Inventors: Prashant Shekhar, Houston, TX (US); Abhijit Kulkarni, Pune (IN); Gillies Alexander MacDonald, Aberdeenshire (GB)

(73) Assignee: Halliburton Energy Services, Inc., Houston, TX (US)

( * ) Notice: Subject to any disclaimer, the term of this patent is extended or adjusted under 35 U.S.C. 154(b) by 891 days.

(21) Appl. No.: 16/961,890

(22) PCT Filed: Feb. 12, 2019

(86) PCT No.: PCT/US2019/017649
§ 371 (c)(1),
(2) Date: Jul. 13, 2020

(87) PCT Pub. No.: WO2019/160859
PCT Pub. Date: Aug. 22, 2019

(65) Prior Publication Data
US 2020/0363289 A1 Nov. 19, 2020

Related U.S. Application Data

(60) Provisional application No. 62/630,144, filed on Feb. 13, 2018.

(51) Int. Cl.
*E21B 21/06* (2006.01)
*G01M 7/02* (2006.01)
(Continued)

(52) U.S. Cl.
CPC ......... *G01M 7/025* (2013.01); *B01D 33/0346* (2013.01); *B01D 33/804* (2013.01);
(Continued)

(58) Field of Classification Search
CPC .................. E21B 21/065; G01N 15/06; G01N 2015/0693; B07B 33/72; B01D 33/0346; B01D 33/804; B01D 33/807
See application file for complete search history.

(56) References Cited

U.S. PATENT DOCUMENTS

| 4,809,791 A | 3/1989 | Hayatdavoudi |
| 6,543,620 B2 * | 4/2003 | Allaei ....................... B07B 1/42 209/379 |

(Continued)

OTHER PUBLICATIONS

PCT Application Serial No. PCT/US2019/017649, International Written Opinion, dated Jun. 3, 2019, 10 pages.
(Continued)

*Primary Examiner* — Kenneth L Thompson
(74) *Attorney, Agent, or Firm* — DeLizio, Peacock, Lewin & Guerra, LLP

(57) ABSTRACT

A method includes performing a downhole operation in a borehole; capturing, during the downhole operation, downhole particles and drilling mud at the surface from the borehole into a screen of at least one shaker; shaking the screen to emit vibrations to separate the downhole particles from the drilling mud; defining a vibration limit for a normal operating condition of the at least one shaker; setting a vibration fault threshold based on the vibration limit for the normal operating condition; monitoring, using at least one sensor, the vibrations over time; and determining there is a fault condition for the shaker, in response to the vibrations exceeding the vibration fault threshold.

18 Claims, 27 Drawing Sheets

(51) Int. Cl.
  *B01D 33/03* (2006.01)
  *B01D 33/80* (2006.01)
  *G01L 1/22* (2006.01)
  *G01N 15/06* (2006.01)
  *G01P 3/00* (2006.01)
  *G01P 15/18* (2013.01)
  *E21B 49/00* (2006.01)

(52) U.S. Cl.
  CPC .............. *E21B 21/065* (2013.01); *G01L 1/22* (2013.01); *G01N 15/06* (2013.01); *G01P 3/00* (2013.01); *G01P 15/18* (2013.01); *B01D 2201/54* (2013.01); *E21B 49/005* (2013.01); *G01N 2015/0693* (2013.01)

(56) References Cited

U.S. PATENT DOCUMENTS

| | | | | |
|---|---|---|---|---|
| 9,023,275 | B2 * | 5/2015 | McClung, III | E21B 21/065 |
| | | | | 422/28 |
| 9,349,120 | B2 * | 5/2016 | Kalu | G06Q 10/107 |
| 10,001,464 | B2 * | 6/2018 | Kronenberger | G01N 25/56 |
| 10,167,689 | B2 * | 1/2019 | Jones | B07B 1/42 |
| 10,633,941 | B2 * | 4/2020 | Teodorescu | B01D 33/0376 |
| 10,643,322 | B2 * | 5/2020 | Holton | B01D 33/804 |
| 10,648,257 | B2 * | 5/2020 | Bingham | B07B 1/46 |
| 10,954,729 | B2 * | 3/2021 | Torrione | E21B 47/04 |
| 11,267,018 | B2 * | 3/2022 | Herrington | B07B 1/469 |
| 11,492,901 | B2 * | 11/2022 | ElGamal | E21B 21/01 |
| 2005/0242003 | A1 | 11/2005 | Scott et al. | |
| 2011/0114542 | A1 * | 5/2011 | Carr | B07B 1/42 |
| | | | | 209/369 |
| 2015/0167661 | A1 | 6/2015 | Garvey et al. | |
| 2016/0370274 | A1 | 12/2016 | Rowe et al. | |
| 2017/0089153 | A1 | 3/2017 | Teodorescu | |

OTHER PUBLICATIONS

PCT Application Serial No. PCT/US2019/017649, International Search Report, dated Jun. 3, 2019, 3 pages.

* cited by examiner

SHAKER VIBRATION AND DOWNHOLE CUTTINGS MEASUREMENT ANALYSIS AND PROCESSING

TECHNICAL FIELD

The disclosure generally relates to the field of downhole hydrocarbon recovery, and more particularly to shaker vibration and downhole cutting measurement and processing.

BACKGROUND

Increasing the effectiveness of pumping, sweeping, drilling operations, fracturing operations, etc. can reduce the cost of hydrocarbon recovery operations. An approach to increasing the effectiveness of such operations is to observe the characteristic features of various downhole particles returning to the Earth's surface from downhole and associated shaker vibrations used to separate drilling mud from cuttings from downhole particles during different hydrocarbon recovery operation.

BRIEF DESCRIPTION OF THE DRAWINGS

Embodiments of the disclosure may be better understood by referencing the accompanying drawings.

DESCRIPTION OF EMBODIMENTS

Figure 1:
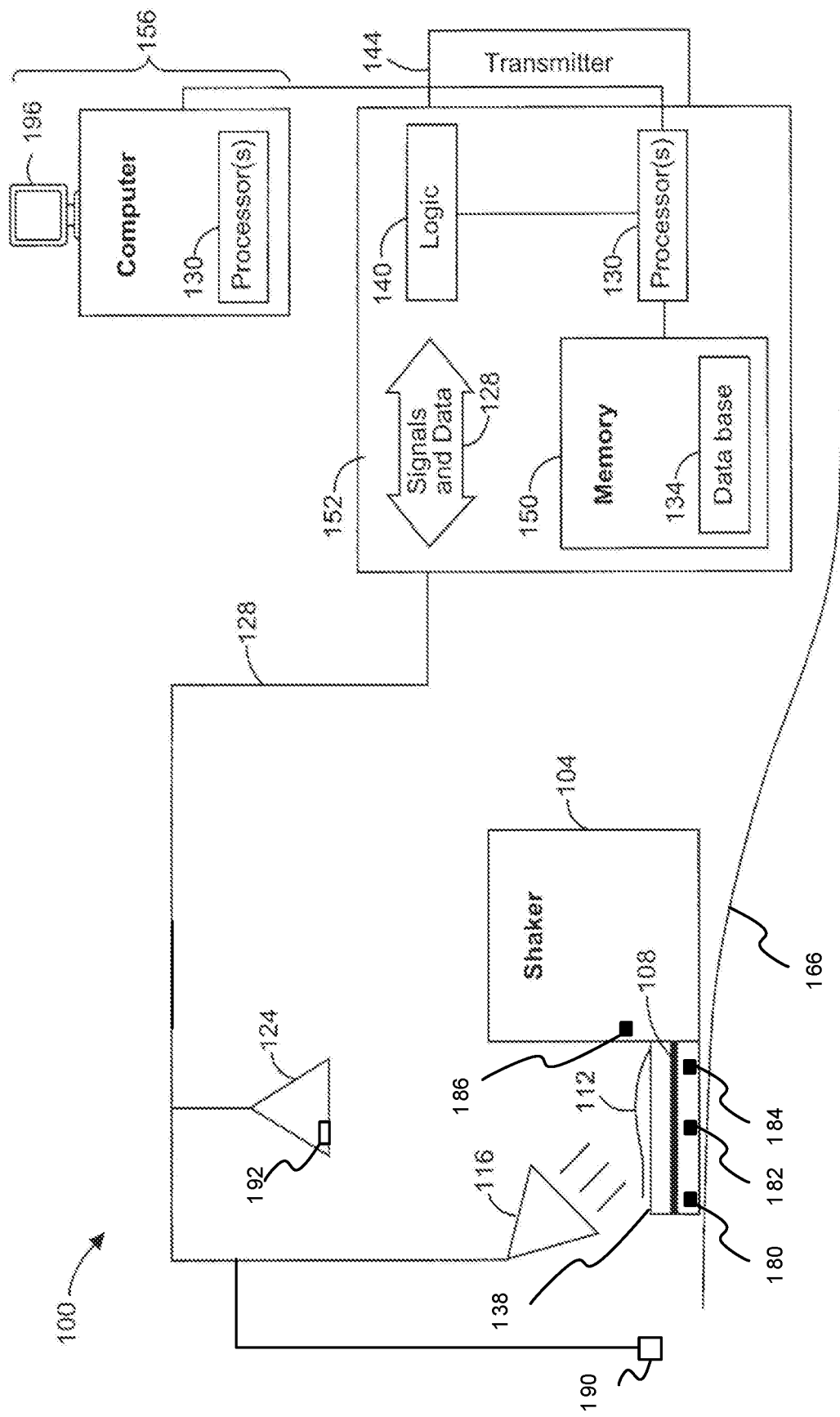
FIG. 1 is a block diagram of an example system for processing and analyzing vibrations of the shaker and measurement cuttings in the shaker, according to some embodiments.

The description that follows includes example systems, apparatuses, and methods that embody aspects of the disclosure. However, it is understood that this disclosure may be practiced without these specific details. For instance, this disclosure refers to drilling and fracturing operations for downhole particle analysis. Aspects of this disclosure can be also applied to any other applications that return downhole particles to the surface. In other instances, well-known instruction instances, structures and techniques have not been shown in detail in order not to obfuscate the description.

Various embodiments include processing and analyzing particles returned to the Earth's surface from a borehole. For example, the particles can be drill cuttings returning to the surface from downhole during drilling of the borehole. In another example, the particles can be the proppants and any other particles (e.g., portions of the formation) that return to the surface during or after hydraulic fracturing operations. Shakers are part of the solids control system on a drilling rig and can be used to remove large solids (cuttings) from the drilling fluid ("mud") returning to the surface from downhole. Examples of shakers can include a linear shaker, a circular shaker, and a general elliptical shaker.

The shaker can minimize loss of drilling mud while maximizing removal of drill cuttings. However, poor to minimum maintenance on the shaker causes losses in the drilling fluid. For example, losses in the drilling fluid can be caused by mud overflow at the end of the shaker. Drill cuttings can be separated by vibratory action imposed in the longitudinal direction of the shaker. A body under the action of force translates along the direction of force, if the action line of the force just goes through the center of the body. Accordingly, when the vibration sieve is in the process of action, lines to the resultant force of external forces come through its center of mass.

Vibration on the shaker can be one of the important parameters that determines movement of drill cuttings in the longitudinal or forward direction. Changes in the vibration pattern can cause the drill cuttings to stay longer on the shaker bed and also can cause the loss of drilling fluid due to overflow. Conventional systems generally do not monitor or track operating conditions of the shaker. In other words, there are no inputs that can help in predictive maintenance (PdM) of the shaker. Maintenance techniques can help determine the condition of the shale shaker in order to predict when maintenance should be performed. In some embodiments, a system monitors the trend of vibration across one or more multiple shaker configurations. The monitoring can be performed in real time and can be performed in one or more of three directions (X, Y, and Z).

When the shaker is performing properly (e.g., per specification), the vibration trend can be baselined. Using this baseline, the trend can be captured for a continuous monitoring of the shaker. Under fault conditions, vibration trends will deviate from the normal operating trends. Any deviation from the normal vibration trend can trigger an alarm or fault condition. Fault conditions can occur on the shaker due to various scenarios (e.g., broken or torn rubber mounts, unbalanced motors that are working in the opposite direction, mechanical faults, damaged screens, damaged springs, improper installation of screens, etc.). This information can be very beneficial while monitoring any fluid losses and drill cuttings collection.

In some embodiments, a sensor could be used to capture vibrations of the shaker. The detected vibrations can then be converted to an analog or digital signal. Examples of a sensor for detecting vibration can include a strain gauge with a uniform/eccentric loads or unbalanced loads, three-axis accelerometers, etc. Some embodiments can include one or more sensors for detection of vibration of the shaker. The sensors can be mounted directly on different parts of the body of the shaker.

Health of the motor for the shaker can be determined by tracking the shaker motor revolutions per minute (RPMs). The vibration frequency can correlate to the motor RPMs. The vibration trend can change due to multiple reasons such as change in the shaker motor RPMs, mechanical faults, and damaged rubber mounts etc. Some embodiments identify and single out the cause of variations in the vibration pattern caused by the motor versus any other mechanical faults. Thus, with the inclusion of the motor rotational input, the motor as well as the system health can be cross verified. In some embodiments, RPMs of the shaker motor can be incorporated with the input of the vibration sensor (e.g., input of the accelerometer) to determine vibration trends.

Also, some embodiments incorporate a vibration sensor with a volume cutting sensor to monitor and track the vibration trends and analyze the correlation between vibration and measurements of volume cuttings. Therefore, some embodiments can correlate shaker vibration trends with the volume cuttings trend. The shaker vibration trend can be used as a validation check for the cuttings volume measurements, thereby enhancing troubleshooting capabilities on volume cuttings sensor. Currently, there is no way to monitor the excessive vibrations with a volume cuttings sensor. For example, in a situation of excessive vibration, the volume captured from image acquisition can be erroneous due to objects being out of focus.

Accordingly, incorporating the shaker vibration trends with the measurement (e.g., volume or weight) cuttings monitoring can provide more accurate results for the measurement cuttings monitoring. In turn, the results for the measurement cuttings monitoring can be more reliable and trust worthy. Thus, the shaker vibration and measurement cuttings trends can provide indications of the health of different shaker configurations.

The trends can be used to predict when maintenance is needed on the shakers. Some embodiments provide for predictive maintenance which results in cost savings over routine or proactive preventive maintenance, because tasks are performed only when warranted. In other words, some embodiments provide the right information at the right time. Additionally, erroneous measurements of the measurement cuttings that are caused by shaker vibrations can be identified.

In some embodiments, results of this analysis can be used to alter various hydrocarbon recovery operations. For example, if the particles are received at the surface as a result of drilling operations, the drilling operations can be modified. For instance, the drilling can be stopped, or a direction of the borehole can be altered. Other examples of modified drilling operations can include replacement of parts of the drill string (e.g., the drill bit), a change in the weight of the drilling mud or flow rate, performing a borehole clean out, etc. For hydraulic fracturing operations, results of this analysis can be used to project the potential recovery of hydrocarbons from this current borehole. Additionally, results of this analysis can be used in drilling subsequent boreholes in a similar geographic region. For instance, if a level of proppants that are not retained in the formation is too high (returning to the surface instead), the direction or depth of the drilling of subsequent boreholes can be altered. Alternatively or in addition, the location or number of fractures in subsequent boreholes can be altered.

Example System for Processing Shaker Vibrations and Measurement Cuttings

An example system is now described for processing shaker vibrations and measurement cuttings. Shaker vibrations can be monitored with one or more sensors mounted on the shaker. Additionally, some embodiments use a camera(s), laser(s), lag calculation, volume calculations to determine cuttings volume per unit depth.

FIG. 1 is a block diagram of an example system for processing and analyzing vibrations of the shaker and measurement cuttings in the shaker, according to some embodiments. In many embodiments, a system 100 comprises a combination of an imaging device 124 and one or more processors 130. The imaging device 124 and/or the processors 130 may be located above the surface 166 of a geological formation, perhaps forming part of a data acquisition system 152. In some embodiments, any of the components in FIG. 1 may be located below the surface 166.

The system 100 may also include logic 140, perhaps comprising a programmable data acquisition subsystem. The logic 140 can be used to acquire live video stream information 128, and other data, such as information from down hole, including the depth of the drill bit during a drilling operation.

A memory 150, located above or below the surface 166, can be used to store acquired image data, as well as other data (e.g., perhaps in a database 134). The memory 150 is communicatively coupled to the processor(s) 130.

Figure 2:
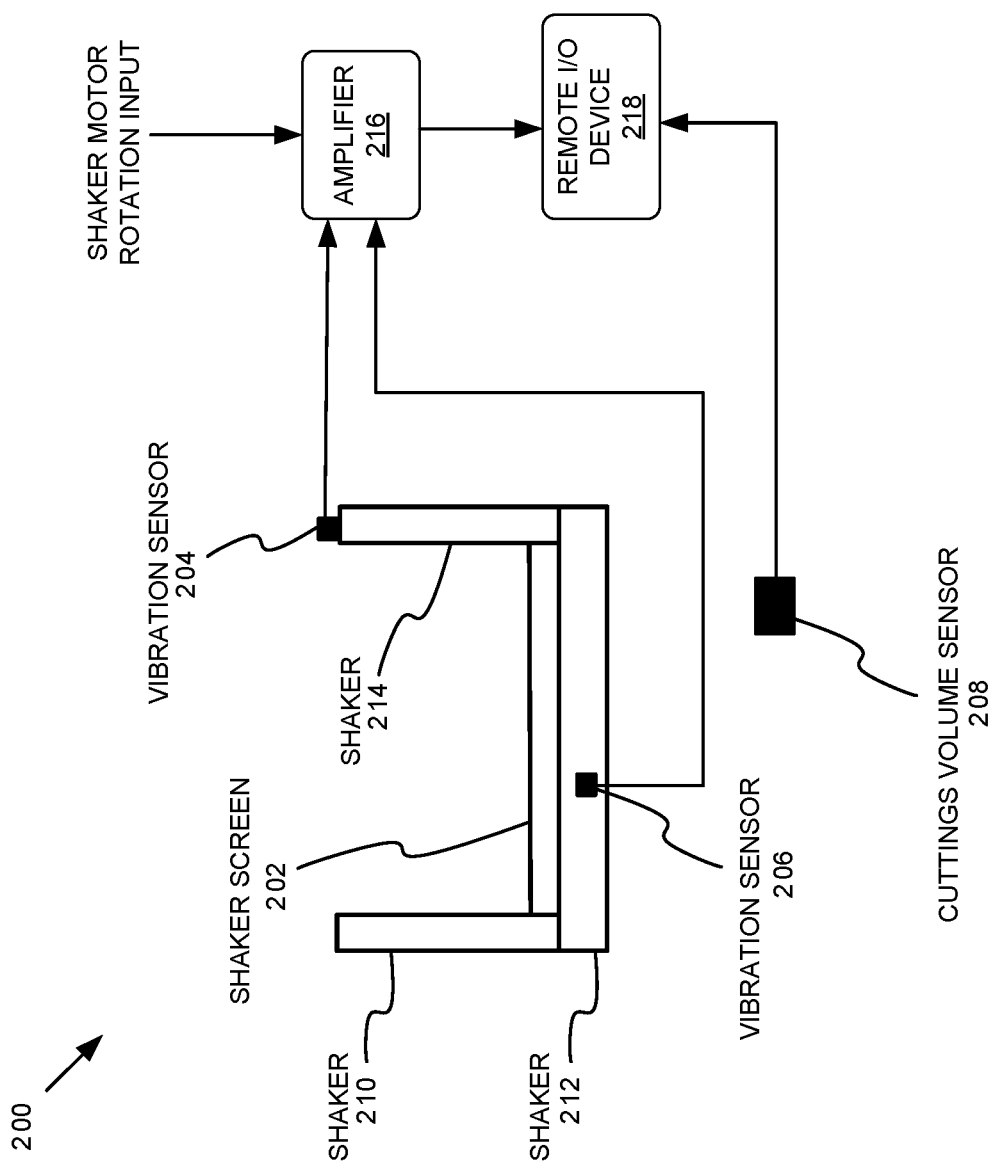
FIG. 2 is a block diagram of a more detailed example shaker and shaker screen with vibration sensors, according to some embodiments.

In some embodiments, the imaging device 124 may comprise one or more CCD (charge coupled device) cameras, including low light or infrared cameras, to be used in conjunction with one or more sources of illumination 116, such as white light, tungsten light, infrared light, or light emitting diodes (LEDs) to illuminate cuttings 112 deposited on a shaker 104, such as on a shaker screen 108 (also referred to herein as a "drilling mud screen 108"). The cameras may be focused on the shaker screen 108 to capture images of cuttings 112 as they move across one or more shakers 104. In this example, a number of vibration sensors have been coupled to the shaker 104 and the shaker screen 108. As shown, vibration sensors 180, 182, and 184 are positioned on the shaker screen 108. A vibration sensor 186 is positioned on the shaker 104. A more detailed example of incorporation of vibration sensors with the shaker screen and shaker are depicted in FIG. 2, which is further described below.

The imaging device 124 can be connected to a data acquisition system 152, perhaps including the logic 140, and then to a computer (comprising one or more processors 130), or directly to a computer. The computer may use a three-dimensional (3D) face recognition program or particle size analysis program to measure and determine characteristics of the cuttings 112, such as size, volume, shape, etc. The live data can be analyzed in real-time to provide shape and size distribution, along with the volume of the cuttings 112 coming over the shaker 104.

The system 100 also includes one or more lasers. In this example, a laser 192 that is incorporated into the imaging device 124 is positioned above the cuttings 112. The system 100 also includes a laser 190 positioned to a side of the cuttings 112. The system 100 can include more or less lasers. For example, the system 100 can include additional lasers at other positions relative to the cuttings 112. As part of the processing and analysis of the cuttings 112, the lasers 190-192 can emit a coherent radiation into the cuttings 112. A line of the coherent radiation may deflect as a result of contacting particles of a detectable thickness. The distance between the original line of coherent radiation and the deflected line can be analyzed to determine the thickness of the particle(s) which cause the line of coherent radiation to deflect (e.g., through triangle properties). An actual surface area of the cuttings 112 can then be determined based on the captured coherent radiation. Volume of the cuttings 112 can be obtained by multiplying the surface area of the cuttings 112 (determined by laser 190 and/or 192 deflection) to the velocity of cuttings 112 passing over the laser line. The velocity of the cuttings 112 may be determined using an approach of tracking a particle over a certain distance for a certain amount of time. The imaging device 124, in conjunction with a velocity capture algorithm can be used to track the velocity of the particle/cuttings 112. Other methods using radars may also be used to determine velocity of particles. Accurate volume measurements should be taken since no physical measurements may be taken. Additionally, noise in form of vibration on the shaker 104 should be filtered out. This can be done by mounting a reference target on a static portion of the shaker 104 and capturing the pixel movement using the imaging device 124. An algorithm may be used to capture the pixel movement on the shaker 104. Other methods using accelerometers may also be used to baseline the vibrations on the shaker screen 108.

The illumination source 116 may comprise white lights for CCD cameras or near, mid, or far wave infrared lights, depending on the type of imaging device 124 that is used. The illumination source 116 may be used to intensify the image. The imaging device 124, such as a camera, can capture various images of the cuttings 112. The field of view, detection wavelength sensitivity, and resolution of the imaging device 124 may be used to determine the number and type of devices 124 that are focused on the shaker 104.

Imaging devices may comprise, for example, a pco 4000 CCD camera from Adept Turnkey Pty Ltd. with 4008×2672 pixel resolution for the visible light spectrum. If the conditions are such that a high sensitivity line scan camera may be useful, a Piranha HS-80-08K40 camera or Piranaha HS-40-04K40 camera, also from Adept Turnkey Pty Ltd. can be used. For near infrared imaging, an XEVA-FPA-1.7-640 camera from the LOT-Oriel Group Europe with an InGaAs array at 640×512 resolution can be used. For mid infrared imaging, a VarioTHERM® InSb camera from JENOPTIK Optical Systems Inc. with an InSb array at 640×512 resolution can be used. For far infrared detection, a Photon 640 camera from FLIR Systems, Inc. can be employed. Other devices can also be used.

The video stream information 128, or a processed form of the information, can be sent to a remote workstation 156 via coaxial cable or Ethernet cable. For longer data transmission distances, and to reduce the magnitude of possible interference, the video stream information 128 may be converted to an optical format and sent to the remote workstation 156 via fiber optic transmission. A transmitter 144 may be used to send the video stream information 128 or a processed form of the information, to the workstation 156 via wires, fiber optics, or wirelessly.

Programs that provide face recognition and particle size analyzer are commercially available. Three-dimensional face recognition software can be used to identify more than just the general shape of cuttings—the volume distribution of the cuttings can also be determined. The software can be trained or modified to identify cutting shapes, to determine volume distribution, and to provide data in a form that various monitoring software, such as Halliburton's INSITE Anywhere® web delivery system, can process.

These recognition and analysis programs include software that is similar to or identical to PAX-it image management and analysis software by MIS Inc. of Villa Park, IL and the Split-Online® automated digital image analysis system from Split Engineering LLC, as well as the SureMatch 3D facial recognition software suite available from Genex Technologies, Inc. of Bethesda, MD Other software and processing instructions may be used, based on technical needs and flexibility.

The acquired video stream information 128 can be processed by programs similar to or identical to the INSITE Anywhere® web delivery system for real-time trend analysis. The processed data, which can be stored in the memory 150 (e.g., in the database 134) includes particle size distribution, particle shape distribution, and cutting volume. Thus, many embodiments may be realized.

For example, the system 100 may comprise an imaging device 124 and one or more processors 130. The imaging device 124 may be configured to acquire live video stream information 128 including down hole cuttings image information. The processor(s) 130 may be configured to process the down hole cuttings image information to determine data that quantifies the shape, size distribution, and/or volume of the down hole cuttings. The processor(s) 130 may also be configured to publish changes in the data in conjunction with probable conditions associated with a borehole drilling operation or a borehole fracturing operation.

Elements can be added to the path of energy travel to selectively reduce the amount of energy received by the imaging device 124. Thus, the system 100 may comprise polarizers, filters, or beam splitters to intercept energy reflected or emitted by the downhole cuttings 112 ("cuttings 112"), and to reduce the amount of the energy received by the imaging device 124. One or more cameras can be used as the imaging device. Thus, the imaging device 124 may comprise one or more visible light cameras and/or infrared cameras. Additional embodiments may be realized.

FIG. 2 is a block diagram of a more detailed example shaker and shaker screen with vibration sensors, according to some embodiments. FIG. 2 depicts a system 200 that includes a shaker screen 202 (similar to the shaker screen 108 of FIG. 1) on which cuttings and drilling mud are placed after returning to the surface for separation of the cuttings from the drilling mud. The system also includes shakers 210-214 that are coupled to the shaker screen 202. The shakers 210-214 (similar to the shaker 104) cause the shaker screen 202 to vibrate to assist in the separation of the cuttings from the drilling mud. In this example, the shaker 210 is positioned to the left of and approximately perpendicular to the shaker screen 202. The shaker 214 is positioned to the right of and approximately perpendicular to the shaker screen 202. The shaker 212 is positioned below and approximately parallel to the shaker screen 220. The shakers 210-214 can vibrate together or independent of each other. The system 200 also includes vibration sensors 204-206. In this example, the vibration sensor 204 is positioned on the shaker 214, and the vibration sensor 206 is positioned on the shaker 212. More or less vibrations sensors can be positioned on other locations on the same and/or different shakers.

The system 200 also includes a cuttings volume sensor 208. The cuttings volume sensor 208 can represent one or more devices used to capture the volume cuttings on the shaker screen. For example, the cuttings volume sensor 208 can include a coherent radiation emitter and cameras (as further described below).

Figure 27:
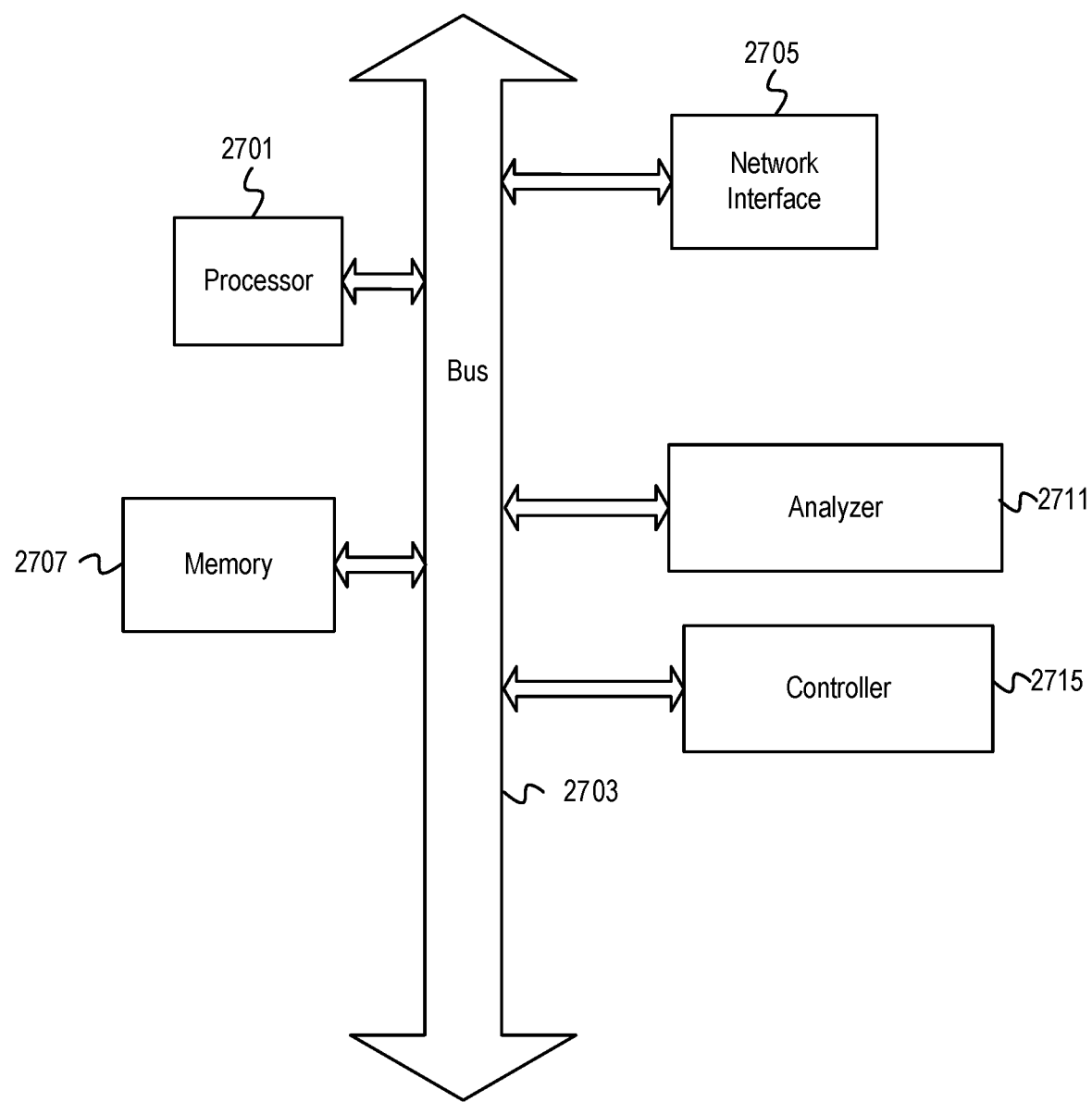
FIG. 27 is an example computer, according to some embodiments.

The system 200 also includes an amplifier 216 coupled to the vibration sensors 204-206 and the cuttings volume sensor 208. The amplifier 216 can receive the level of vibration from each of the vibration sensors 204-206. The amplifier 216 can also be coupled to receive shaker motor rotation input. For example, the shaker motor rotation input can be number of rotations per unit of time for one or more motors used to vibrate the shakers. The amplifier 216 can amplify this data prior to its transmission to a remote Input/Output (I/O) device 218. For example, the remote I/O device 218 can be remote from the well site where the downhole operations are occurring. The remote I/O device 218 is also coupled to the cuttings volume sensor 208 to receive the amount of cuttings volume from the cutting volume sensor 208. The remote I/O device 218 can be coupled to a computer or other device for processing the data (as further described below). The remote I/O device 218 can be connected to a network computer and database, where the data can be recorded real time. In some embodiments, graphical user interfaces (GUIs) can be created to plot the vibration trends. An example of such a computer is depicted in FIG. 27, which is further described below. Some embodiments can be certified for Zone 1/Class 1/Division 1 Hazardous location installations. The sensors can be connected to the remote I/O device 218 through intrinsically safe cables (armored or unarmored) via universal intrinsic safe transmitter/amplifier. To minimize multiple cable runs, fiber or copper cable can run from the Zone 1 certified local data acquisition system to the safe area (e.g., mud logging unit).

Deviation from the normal vibration trend can be alerted to the user to monitor using alarms/signals etc. Thus, some embodiments can monitor fluid losses and drill cuttings separation and then analyze the correlation between vibration and measurement cuttings. Example embodiments for processing measurement cuttings are described below. These example embodiments are described based on analyzing volume of the cuttings. However, some embodiments can be incorporated into other type of measurement of the cuttings. For example, shaker vibration analysis and trends can be incorporated into the weight of the cuttings. Also, in some embodiments, the shaker vibration analysis and trends can be incorporated into shape and size of the downhole particles (as described below). In some embodiments, the shaker vibration analysis and trends can be incorporated into measure cuttings and shape and size of the downhole particles (as described below). The shaker vibration analysis and trends can be incorporated into any type of particles returned to the surface from downhole (e.g., drilling, fracturing, etc.).

Example Drilling Application

Figure 3:
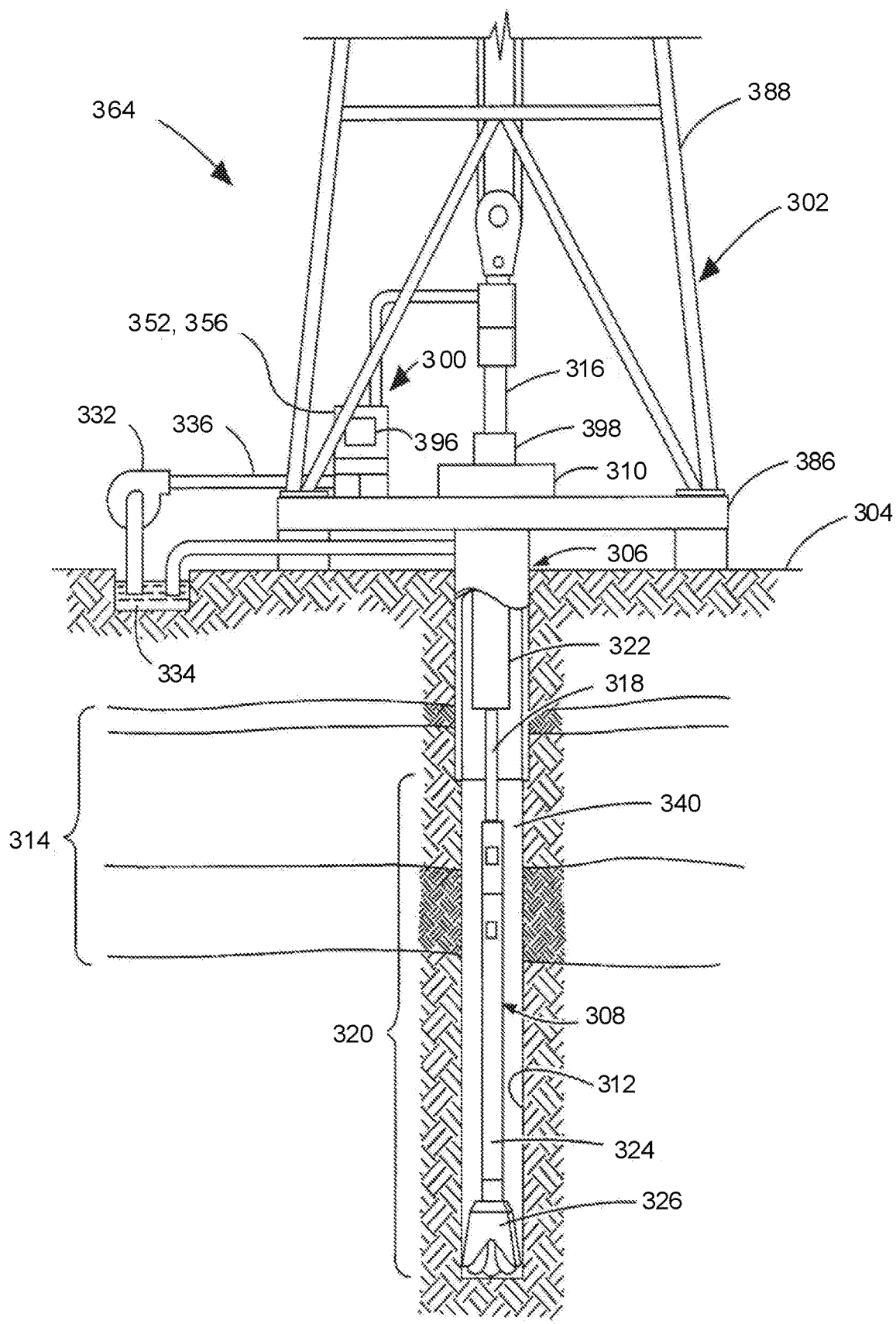
FIG. 3 is a schematic diagram of a drilling rig system, according to some embodiments.

FIG. 3 is a schematic diagram of a drilling rig system, according to some embodiments. For example, in FIG. 3 it can be seen how a system 364 may also form a portion of a drilling rig 302 located at the surface 304 of a well 306. Drilling of oil and gas wells is commonly carried out using a string of drill pipes connected together so as to form a drilling string 308 that is lowered through a rotary table 310 into a wellbore or borehole 312. Here a drilling platform 386 is equipped with a derrick 388 that supports a hoist.

The drilling rig 302 may thus provide support for the drill string 308. The drill string 308 may operate to penetrate the rotary table 310 for drilling the borehole 312 through subsurface formations 314. The drill string 308 may include a Kelly 316, drill pipe 318, and a bottom hole assembly 320, perhaps located at the lower portion of the drill pipe 318.

The bottom hole assembly 320 may include drill collars 322, a down hole tool 324, and a drill bit 326. The drill bit 326 may operate to create a borehole 312 by penetrating the surface 304 and subsurface formations 314. The down hole tool 324 may comprise any of a number of different types of tools including MWD tools, LWD tools, and others.

During drilling operations, the drill string 308 (perhaps including the Kelly 316, the drill pipe 318, and the bottom hole assembly 320) may be rotated by the rotary table 310. In addition to, or alternatively, the bottom hole assembly 320 may also be rotated by a motor (e.g., a mud motor) that is located down hole. The drill collars 322 may be used to add weight to the drill bit 326. The drill collars 322 may also operate to stiffen the bottom hole assembly 320, allowing the bottom hole assembly 320 to transfer the added weight to the drill bit 326, and in turn, to assist the drill bit 326 in penetrating the surface 304 and subsurface formations 314.

During drilling operations, a mud pump 332 may pump drilling fluid (sometimes known by those of ordinary skill in the art as "drilling mud") from a mud pit 334 through a hose 336 into the drill pipe 318 and down to the drill bit 326. The drilling fluid can flow out from the drill bit 326 and be returned to the surface 304 through an annular area 340 between the drill pipe 318 and the sides of the borehole 312. The drilling fluid may then be returned to the mud pit 334, where such fluid is filtered. In some embodiments, the drilling fluid can be used to cool the drill bit 326, as well as to provide lubrication for the drill bit 326 during drilling operations. Additionally, the drilling fluid may be used to remove subsurface formation 314 cuttings created by operating the drill bit 326. It is the images of these cuttings that many embodiments operate to acquire and process.

Thus, referring now to FIGS. 1-3, it may be seen that in some embodiments, a system 364 may comprise a drilling mud screen 108 to receive drilling mud, and one or more image processing system 100 as described previously. The image processing system 100 may be configured to have a field of view that includes the drilling mud screen 108, wherein the system 100 includes one or more imaging devices 124 and one or more processors 130, operating as described previously.

The drilling mud screen 108 may form part of a shaker deck, such as a shale shaker deck. Thus, the drilling mud screen 108 may be included in a shaker deck 138.

The processed data (e.g., cutting shape, size, volume) can be displayed to show changes that have occurred, and the operational conditions that are likely to be associated with those types of changes. Thus, the system 364 may comprise a display 196 to display the changes and the probable conditions. These conditions may be used to implement real-time control in some embodiments (e.g., if falling shale is indicated by a dramatic increase in cutting size and volume, the weight on the bit may be reduced, or drilling may be halted entirely).

A transmitter can be used to send the data (e.g., cutting shape, size, volume) to a remote location, such as a workstation 156, perhaps for alarming, further processing/analysis, or real-time operational control. Thus, a system 364 may comprise a transmitter 144 to transmit at least a portion of the data to a remote processor. Many embodiments may thus be realized.

It should also be understood that the apparatus and systems of various embodiments can be used in applications other than for pumping and drilling operations, and thus, various embodiments are not to be so limited. The illustrations of system 100 and systems 364 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

A rig is surveyed to determine number of shakers present and number of needed cameras to cover shaker surface area. Ambient light can also be measured to determine if additional lighting is needed. Determination can be made whether cameras will need support structure or can be mounted on a surface within a line-of-sight of the shaker. A determination as to whether additional lighting is needed can also be made. Cameras with lasers and possible additional lighting can be sent to the rig site with computers setup to handle the data rate for processing and analyzing the downhole particles. Lasers can be used to determine depth of investigation and as a point of reference. Cameras can be mounted on a support structure or other flat surface that gives a line-of-sight of the shakers with possible additional lighting.

A communication cable and possible power cable can be run from the nearest point of power and data acquisition point. The data acquisition device can be a computer of some other device with the capability to interpret or transmit the pictures to a software program. The software program may or may not have to be calibrated using objects with a known volume that may or may not be of different shapes. The calibration could occur on the shakers themselves or on another flat surface with the same focal length To determine the depth that the cuttings from which the cuttings originate downhole, bit depth and lag can be monitored. Bit depth can be derived from the amount of pipe in the borehole. For example, bit depth can be based on the number of joints of pipe in the hole and knowing the length of all the joints or by monitoring the draw works and determining how much the block has traveled while adding pipe to the borehole. Lag can be determined based on a location of the drill bit, the pump rate in either strokes or volume per unit of time, and the volume of the annulus.

When a foot of formation is drilled and knowing the bit and reamer size, the volume of formation can be calculated based on a unit of depth of the formation that has been drilled, the size of the drill bit, and size of the reamer. The return of this volume of formation to the surface can be determined based on the lag.

The camera system and software can measure the volume of rock returning to the surface. The computer system may maintain a discrete or cumulative volume of cuttings per discrete depth interval or/and as a discrete cumulative volume of cuttings per discrete time. The data in the form of pictures and/or volumes may be stored at the well site and/or transmitted off-site. If drilling fluid is not removed from the cuttings, an erroneous volume would be calculated. If shaker screens become flooded with cuttings or fluid, an erroneous volume would also be calculated. In some embodiments, the drilling fluid maintained on the cuttings will not be calculated and no method will be used to remove wetting of cuttings. The drilling fluid left on cuttings can be considered an error of measurement.

Figure 4:
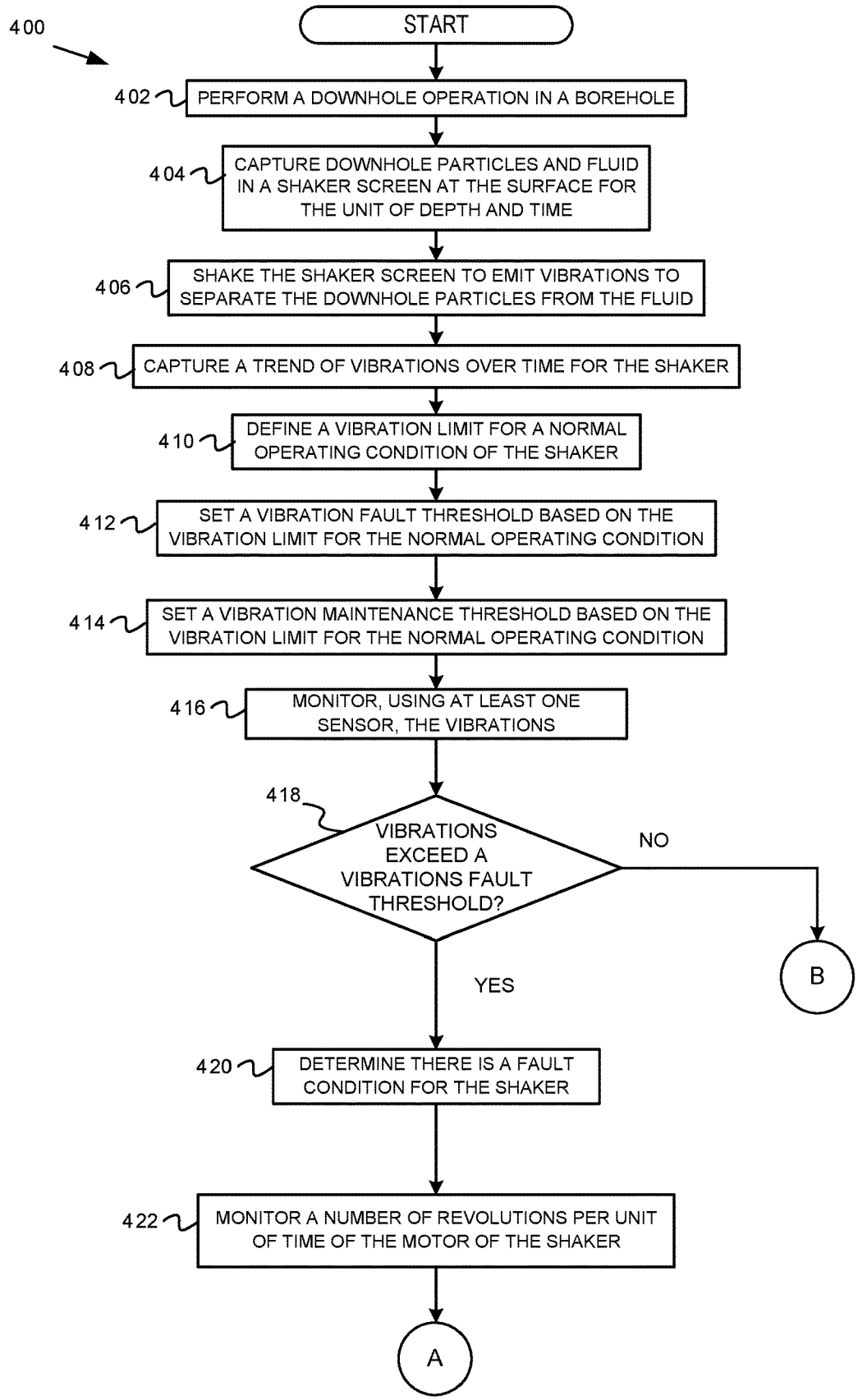
FIGS. 4-5 are flowcharts of operations detecting fault conditions of a shaker based on vibration monitoring and downhole cuttings analysis, according to some embodiments.
Figure 5:
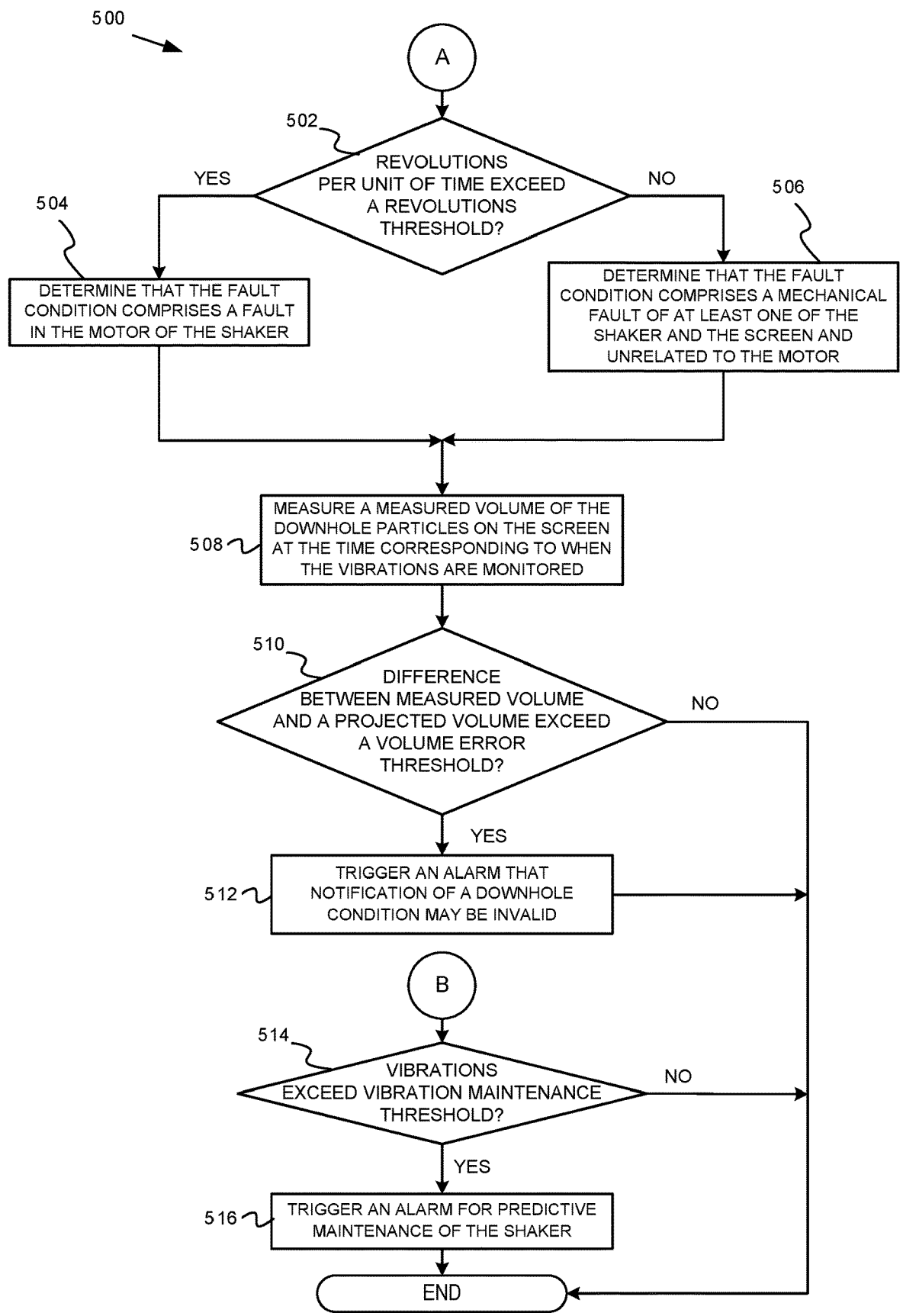

Fault Condition Detection Operations Based on Shaker Vibration Monitoring and Downhole Cutting Analysis Example operations of fault condition detection of a shaker based on shaker vibration monitoring and downhole cutting analysis are now described. FIGS. 4-5 are flowcharts of operations detecting fault conditions of a shaker based on vibration monitoring and downhole cuttings analysis, according to some embodiments. Operations of flowcharts 400-500 of FIGS. 4-5 continue among each other through transition points A-B. Operations of the flowcharts 400-500 can be performed by software, firmware, hardware or a combination thereof. The operations of the flowchart 400 start at block 402.

Figure 25:
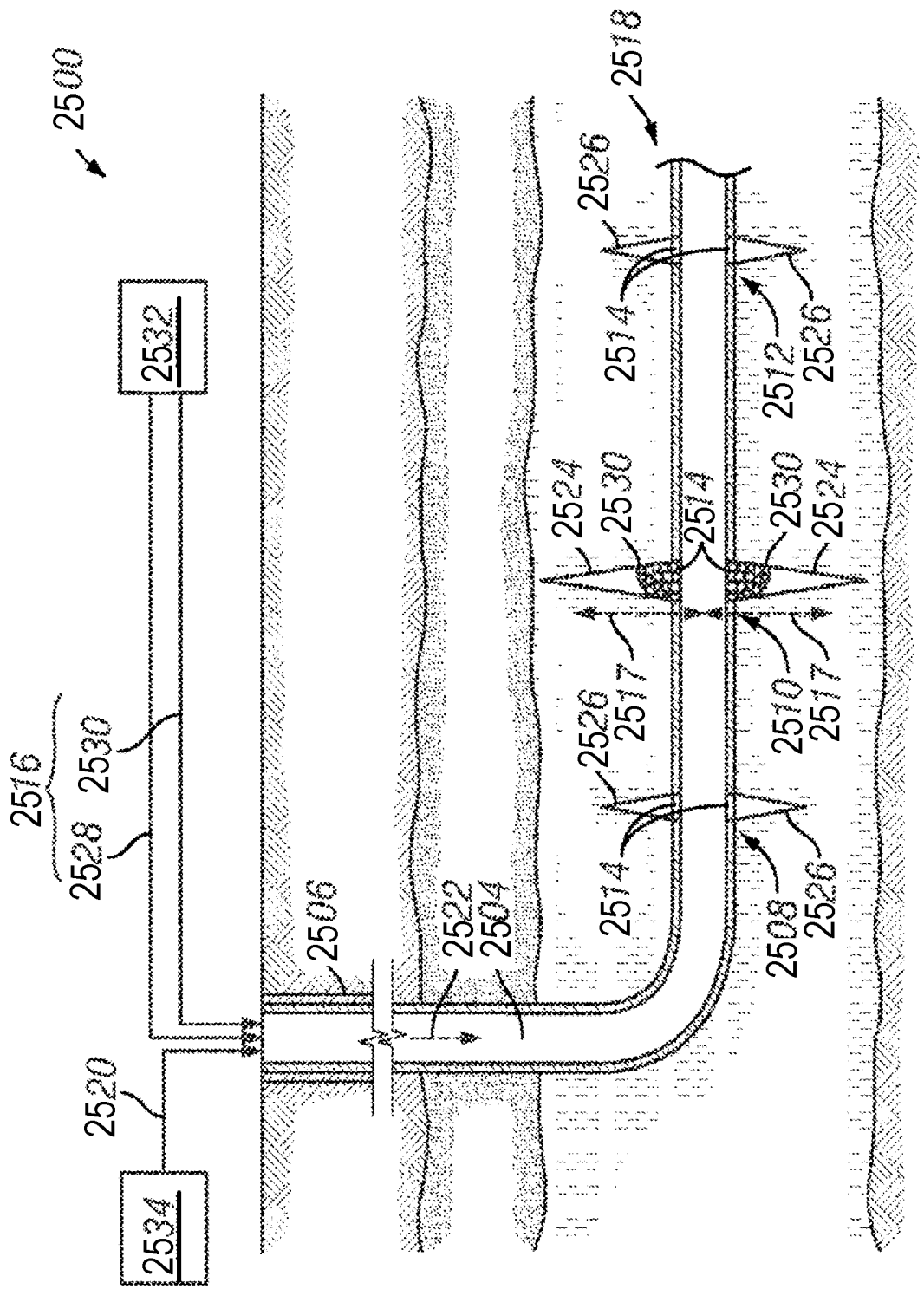
FIG. 25 is a schematic diagram of a fracturing operation, according to some embodiments.

At block 402, a downhole operation in a borehole is performed. Example downhole operations can include drilling as depicted in FIG. 2 fracturing operations as depicted in FIG. 25.

At block 404, downhole particles and fluid are captured in a shaker screen at the surface for a unit of depth and time. For example, with reference to FIGS. 1-3, cuttings from the subsurface formation 314 are created during operation of the drill bit 326. Drilling fluid is used to remove the cuttings. The drilling fluid and cuttings are returned to the surface 304 during drilling of the borehole 312 for the determined unit of depth and time. The shaker screen 108 receives the drilling fluid which includes the cuttings. The drilling fluid may be filtered before or after it is received by the shaker screen 108 as to remove drilling fluid from the cuttings prior to analysis.

At block 406, the shaker screen is shaken to emit vibrations to separate the downhole particles from the fluid. For example, with reference to FIG. 2, the shakers 210-214 can shake the shaker screen 202 to emit vibrations to cause the downhole particles (e.g., cuttings) to be separate from the fluid.

At block 408, a trend of vibrations over time for the shaker is captured. For example, with reference to FIG. 2, the amplifier 216 can receive the vibration data detected by the vibration sensors 204-206 and forward to the remote I/O device 218 after amplifying. A computer or device coupled to the remote I/O device 218 can capture the trend of vibrations. The captured trend can include periods of normal and non-normal operating conditions of the shaker. For example, the captured trend can include periods when the shaker is not operating correctly such that excessive vibrations are a result.

At block 410, a vibration limit for a normal operating condition of the shaker is defined based on the trend of vibrations over time for the shaker. For example, with reference to FIGS. 1-3, a computer or device coupled to the remote I/O device 218 can define this vibration limit based on the captured vibrations during a period that is considered normal operating conditions.

At block 412, a vibration fault threshold is set based on the vibration limit for a normal operating condition of the shaker. For example, with reference to FIGS. 1-3, a computer or device coupled to the remote I/O device 218 can set the vibration fault threshold. For example, the vibration fault threshold can be set to a value of the vibration limit.

At block 414, a vibration maintenance threshold is set based on the vibration limit for a normal operating condition of the shaker. For example, with reference to FIGS. 1-3, a computer or device coupled to the remote I/O device 218 can set the vibration maintenance threshold. For example, the vibration maintenance threshold can be set to a value less than the vibration limit (e.g., 95% of the vibration limit, 90% of the vibration limit, etc.).

At block 416, the vibrations are monitored using at least one sensor. For example, with reference to FIG. 2, the vibrations sensors 204-206 monitor the vibrations of the shakers 210-214. To illustrate, the vibration sensors 204-206 can be strain gauges, accelerometers, etc. to monitor the vibration.

At block 418, a determination is made of whether vibrations exceed a vibrations fault threshold. For example, with reference to FIG. 2, the amplifier 216 can receive the vibration data detected by the vibration sensors 204-206 and forward to the remote I/O device 218 after amplifying. A computer or device coupled to the remote I/O device 218 can make this determination. The vibrations fault threshold can be based on the type of motors in the shakers, the type of shaker screen, the type of cuttings, the type of drilling fluid, etc. Additionally, if there are multiple vibration sensors, each sensor can have its own vibrations fault threshold. In some embodiments, if the vibrations fault threshold for any of the vibration sensors is exceeded, the vibrations can be determined to be in excess of the vibrations fault threshold. In some other embodiments, the vibrations can be determined to be in excess of the vibrations fault threshold if vibrations for each of the vibrations sensors are exceeded. In some other examples for a multiple vibration sensor configuration, values of the vibrations from the different vibration sensors can be combined (e.g., averaged). In such situations, the combined value can be compared to a vibrations fault threshold. If the vibrations do exceed the vibrations fault threshold, operations continue at block 420. Otherwise, operations continue at transition point B, which continues at transition point B of the flowchart 500.

At block 420, it is determined that a fault condition has occurred for the shaker. For example, with reference to FIGS. 1-3, a computer or device coupled to the remote I/O device 218 can determine that a fault condition has occurred for the shaker. Examples of a fault condition can include broken or torn rubber mounts, unbalanced motors that are working in the opposite direction, mechanical faults, damaged screens, damaged springs, improper installation of screens, etc.). As part of determining that a fault condition has occurred, the computer or device can generate the notification or alarm which is output to the display 196.

At block 422, a number of revolutions per unit of time of the motor of the shaker is monitored. For example, with reference to FIGS. 1-3, a computer or device coupled to the remote I/O device 218 can receive the shaker motor rotation input from any type of sensor or a device or apparatus monitoring the shaker motor's rotation per unit of time. This data can be received from one or more of the shaker motors. Operations continue at transition point A, which continues at transition point A of the flowchart 500. From transition point A of the flowchart 500, operations continue at block 502.

At block 502, a determination is made of whether the number of revolutions per unit of time exceed a revolutions threshold. For example, with reference to FIGS. 1-3, a computer or device coupled to the remote I/O device 218 can make this determination. In particular, health of the motor for the shaker can be determined by tracking the shaker motor revolutions per unit of time (e.g., minute). The vibration frequency can correlate to the motor's revolutions per unit of time. The vibration trend can change due to multiple reasons such as change in the shaker motor revolutions per unit of time, mechanical faults, and damaged rubber mounts etc. Some embodiments identify and single out the cause of variations in the vibration pattern caused by the motor versus any other mechanical faults. Thus, with the inclusion of the motor rotational input, the motor as well as the system health can be cross verified. The revolutions threshold can be based on the type of motors, the type of shaker screen, the type of cuttings, the type of drilling fluid, etc. Additionally, if there are multiple motors, each motor can have its own revolutions threshold. In some embodiments, if the rotations threshold for any of the motors is exceeded, the vibrations can be determined to be in excess of the rotations threshold. In some other embodiments, the rotations can be determined to be in excess of the rotations threshold if rotations per unit of time for each of the motors is exceeded. In some other examples for a multiple motor configuration, values of the rotations per unit of time from the different motors can be combined (e.g., averaged). In such situations, the combined value can be compared to a rotations threshold. If the rotations per unit of time do exceed the rotations threshold, operations continue at block 504. Otherwise, operations continue at block 506.

At block 504, it is determined that the fault condition comprises a fault in the motor of the shaker. For example, with reference to FIGS. 1-3, a computer or device coupled to the remote I/O device 218 can determine that the fault condition for the shaker is a fault in the motor. Operations continue at block 508 (described below).

At block 506, it is determined that the fault condition comprises a mechanical fault of at least one of the shaker and the screen and unrelated to the motor. For example, with reference to FIGS. 1-3, a computer or device coupled to the remote I/O device 218 can determine that the fault condition for the shaker is a mechanical fault for either the shaker or screen that is unrelated to the motor. Examples include broken or torn rubber mounts, unbalanced motors that are working in the opposite direction, damaged screens, damaged springs, improper installation of screens, etc. Operations continue at block 508.

At block 508, a measured volume of the downhole particles on the screen at the time corresponding to when the vibrations are monitored is determined. For example, with reference to FIGS. 1-3, the line of coherent electromagnetic radiation deflects as a result of contacting the cuttings 112. The imaging device 124 captures an image of the line of coherent radiation. The processors 130 can analyze the captured image to determine the distance between the initial line and the deflection of the line resulting from contact with the cuttings 112. The resulting distance is used to determine the surface area of the cuttings 112. The surface area of the cuttings can be determined based on geometric relationships between known distances and/or thicknesses (e.g., with triangle properties). Volume of the cuttings can be obtained by multiplying the surface area of the cuttings (determined by laser deflection) to the velocity of cuttings passing over the laser line. The volume may also be determined by comparing the measured distance with distances previously measured for objects of a known thickness which are stored in memory 150 (e.g., in a lookup table). For instance, an object with a known thickness of 1.5 centimeters (cm) can be used during calibration to determine the distance of deflection resulting from an object with a thickness of 1.5 cm. The distance may be stored in a lookup table in memory 150. When obtaining the volume of the cuttings 112, the processors 130 can identify whether the current measured distance has been stored in the lookup table (e.g., to determine if particles have a thickness of 1.5 cm). Programs which facilitate particle analysis (e.g., particle size analysis software, three-dimensional facial recognition software, etc.) may also be leveraged when determining volume. The discrete and/or cumulative volume of cuttings for the current interval of depth and/or time which are determined based on analysis of the line of coherent electromagnetic radiation may be stored in the memory 150.

At block 510, a determination is made of whether the difference between the measured volume and a projected volume exceed a volume error threshold. The error threshold indicates a deviation of the projected volume from the measured volume which can be attributed to error. The error threshold can account for drilling fluid which remains on cuttings after the cuttings are returned to the surface and deposited on the shaker screen. For instance, with reference to FIGS. 1-3, cuttings 112 which contain remnants of drilling fluid may be deposited onto the shaker screen 108. The drilling fluid which remains at the time of analysis of the cuttings 112 contributes to error of measurement and is thus accounted for in the error threshold. The processors 130 can determine whether the error threshold is exceeded after calculating the difference between the measured volume and projected volume. If the difference between the measured volume and a projected volume does exceed a volume error threshold, operations continue at block 512. Otherwise, operations are complete.

At block 512, an alarm is triggered that notification of a downhole condition occurring based on the measured volume may be invalid. As further described below, examples of the different downhole conditions based on the measured volume can include borehole collapsing, pore pressure of the formation has surpassed the drilling fluid weight, pore pressure of the formation has changed, formation that is being drilled has changed, poor borehole cleanout, drill bit is breaking down, etc. However, the difference between the measured volume and the projected volume may be a result of excessive vibration instead of or in addition to a downhole condition. The processors 130 can trigger this alarm. Operations are complete.

From transition point B of the flowchart 500, operations continue at block 514. At block 514, a determination is made of whether vibrations exceed a vibrations maintenance threshold. For example, with reference to FIG. 2, the amplifier 216 can receive the vibration data detected by the vibration sensors 204-206 and forward to the remote I/O device 218 after amplifying. A computer or device coupled to the remote I/O device 218 can make this determination. The vibrations maintenance threshold can be less than the vibrations fault threshold. For example, vibrations can be occurring that may require preventive maintenance prior to an actual fault condition occurring. Like the vibrations fault threshold, the vibrations maintenance threshold can be based on the type of motors in the shakers, the type of shaker screen, the type of cuttings, the type of drilling fluid, etc. Additionally, if there are multiple vibration sensors, each sensor can have its own vibrations maintenance threshold. In some embodiments, if the vibrations maintenance threshold for any of the vibration sensors is exceeded, the vibrations can be determined to be in excess of the vibrations maintenance threshold. In some other embodiments, the vibrations can be determined to be in excess of the vibrations maintenance threshold if vibrations for each of the vibrations sensors are exceeded. In some other examples for a multiple vibration sensor configuration, values of the vibrations from the different vibration sensors can be combined (e.g., averaged). In such situations, the combined value can be compared to a vibrations maintenance threshold. If the vibrations do exceed the vibrations maintenance threshold, operations continue at block 516. Otherwise, operations are complete.

At block 516, an alarm is triggered for predictive maintenance of the shaker. For example, with reference to FIGS. 1-3, a computer or device coupled to the remote I/O device 218 can trigger the alarm. For example, the computer or device can generate the notification or alarm which is output to the display 196 to a speaker, etc. Otherwise, operations are complete.

Volume-Based Analysis Operations of Downhole Drill Cuttings

Figure 6:
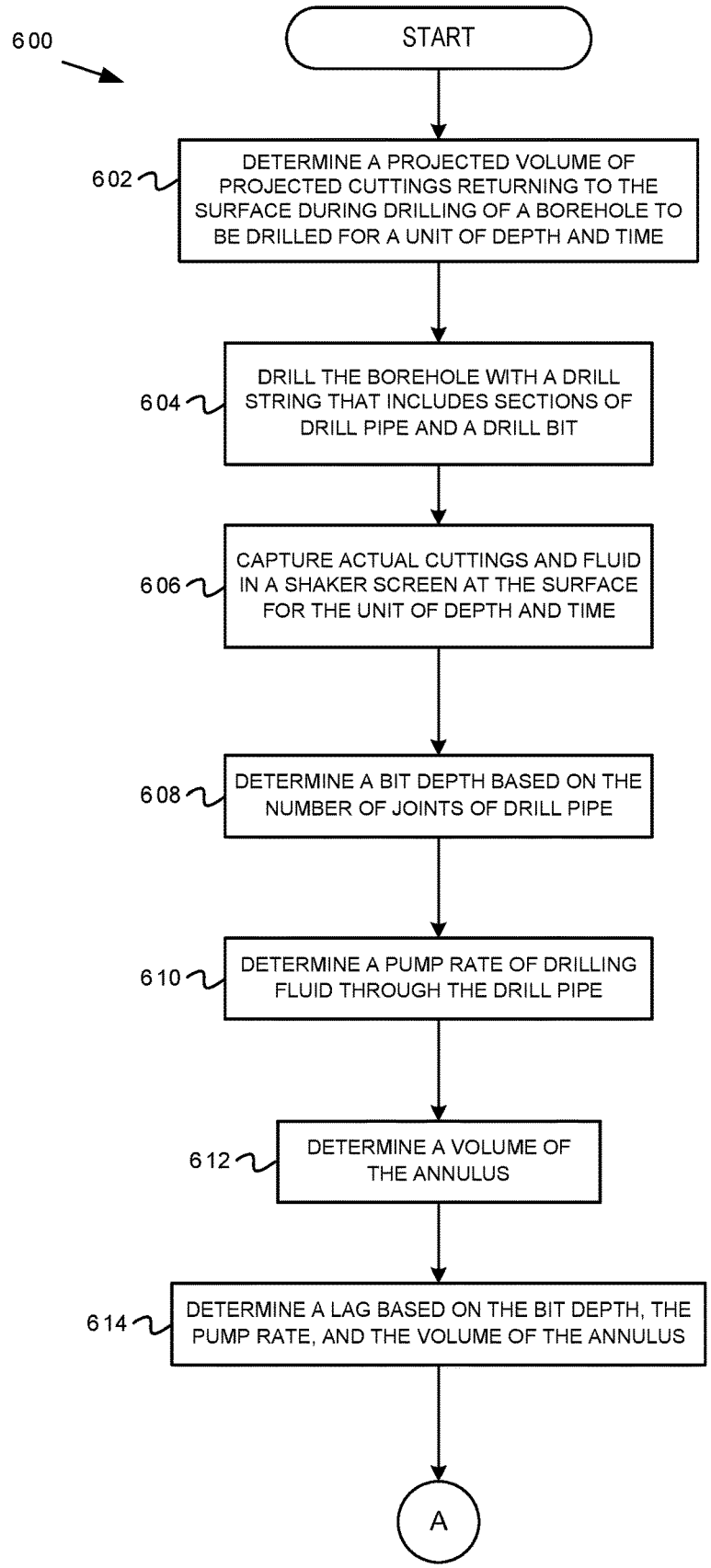
FIGS. 6-8 are flowcharts of operations for evaluating and possibly altering downhole drilling operations based on analysis of volume of downhole cuttings, according to some embodiments.
Figure 7:
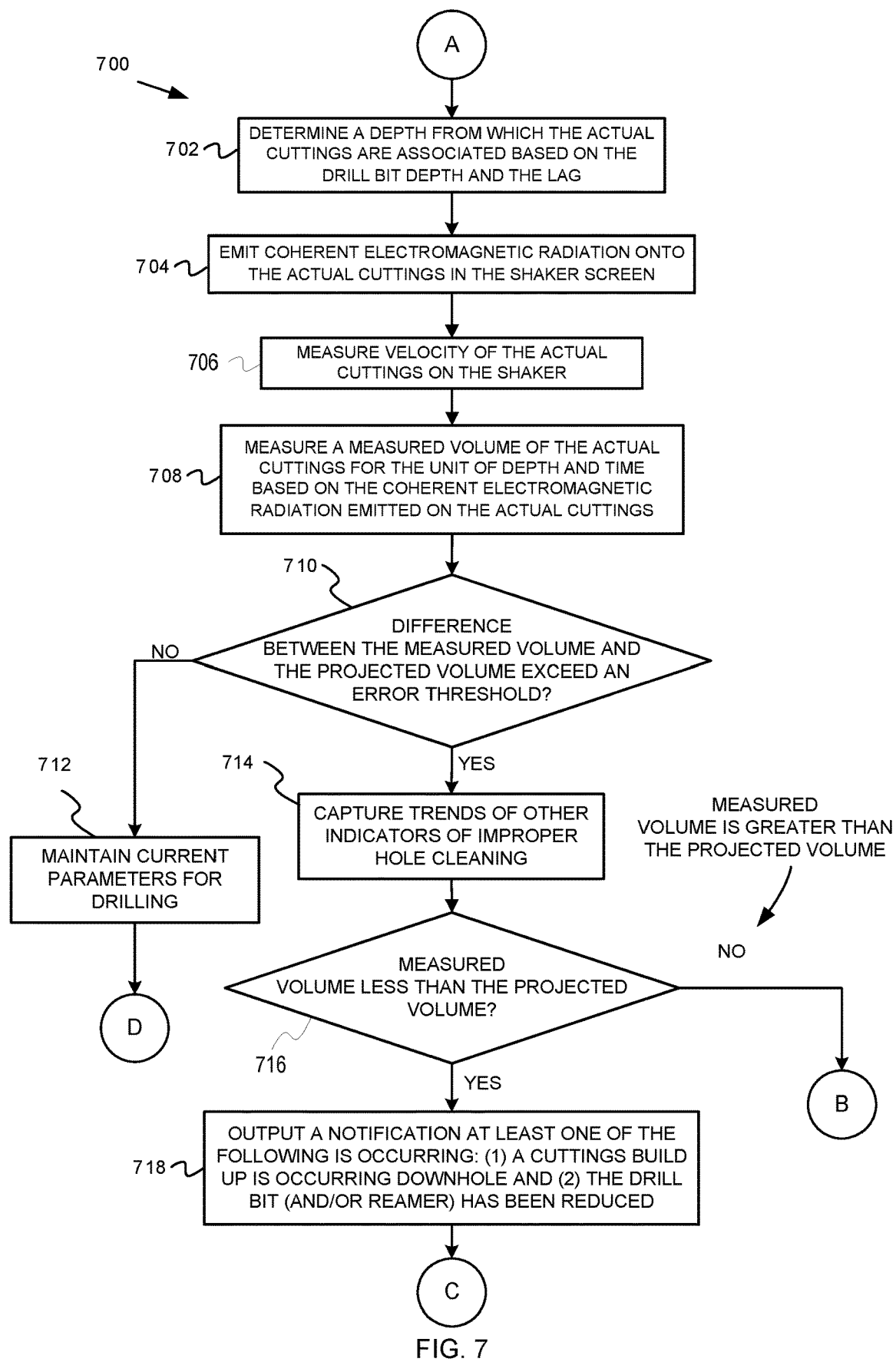
Figure 8:
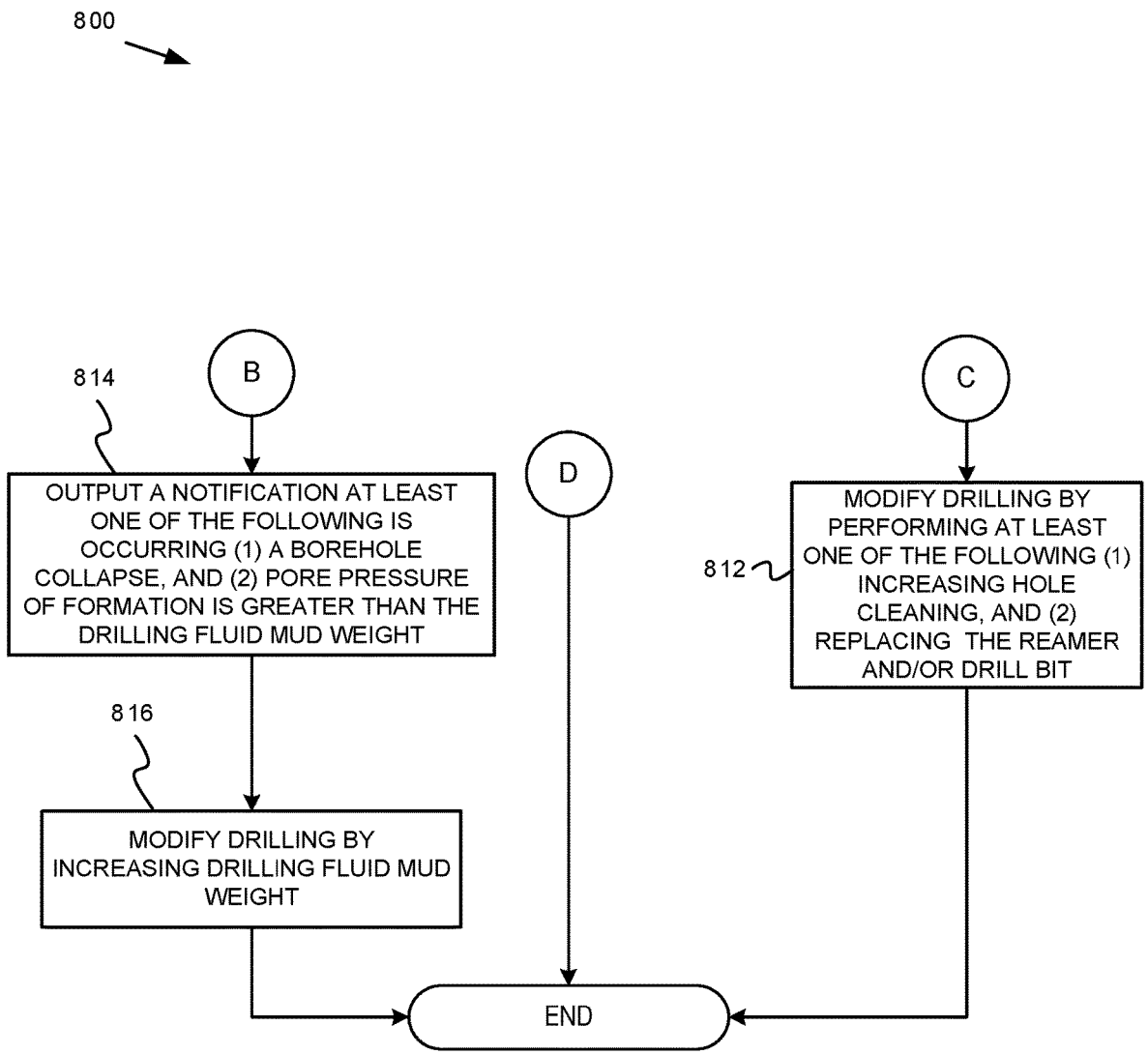
Figure 9:
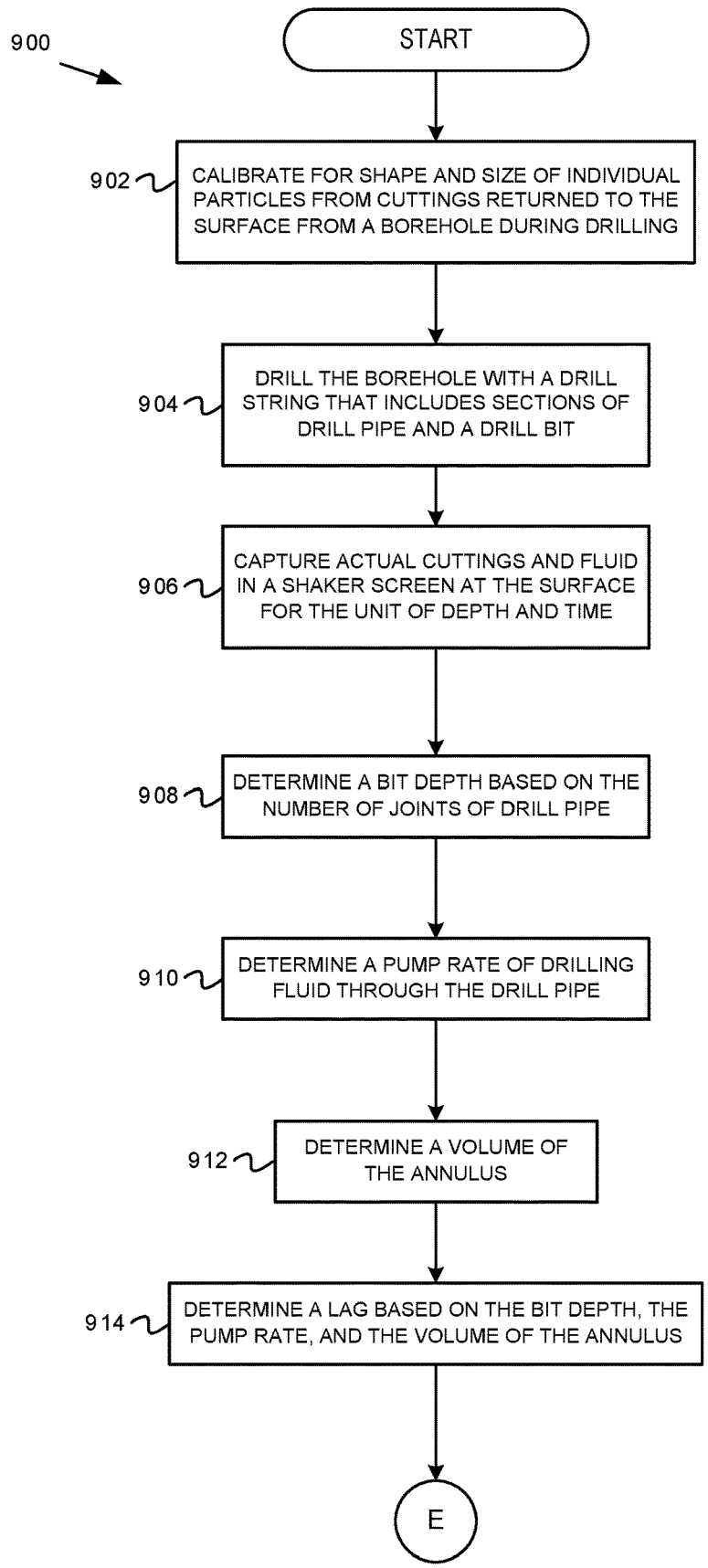
FIGS. 9-14 are flowcharts of operations for evaluating and possibly altering downhole drilling operations based on analysis of size and shape of particles in downhole cuttings, according to some embodiments.
Figure 10:
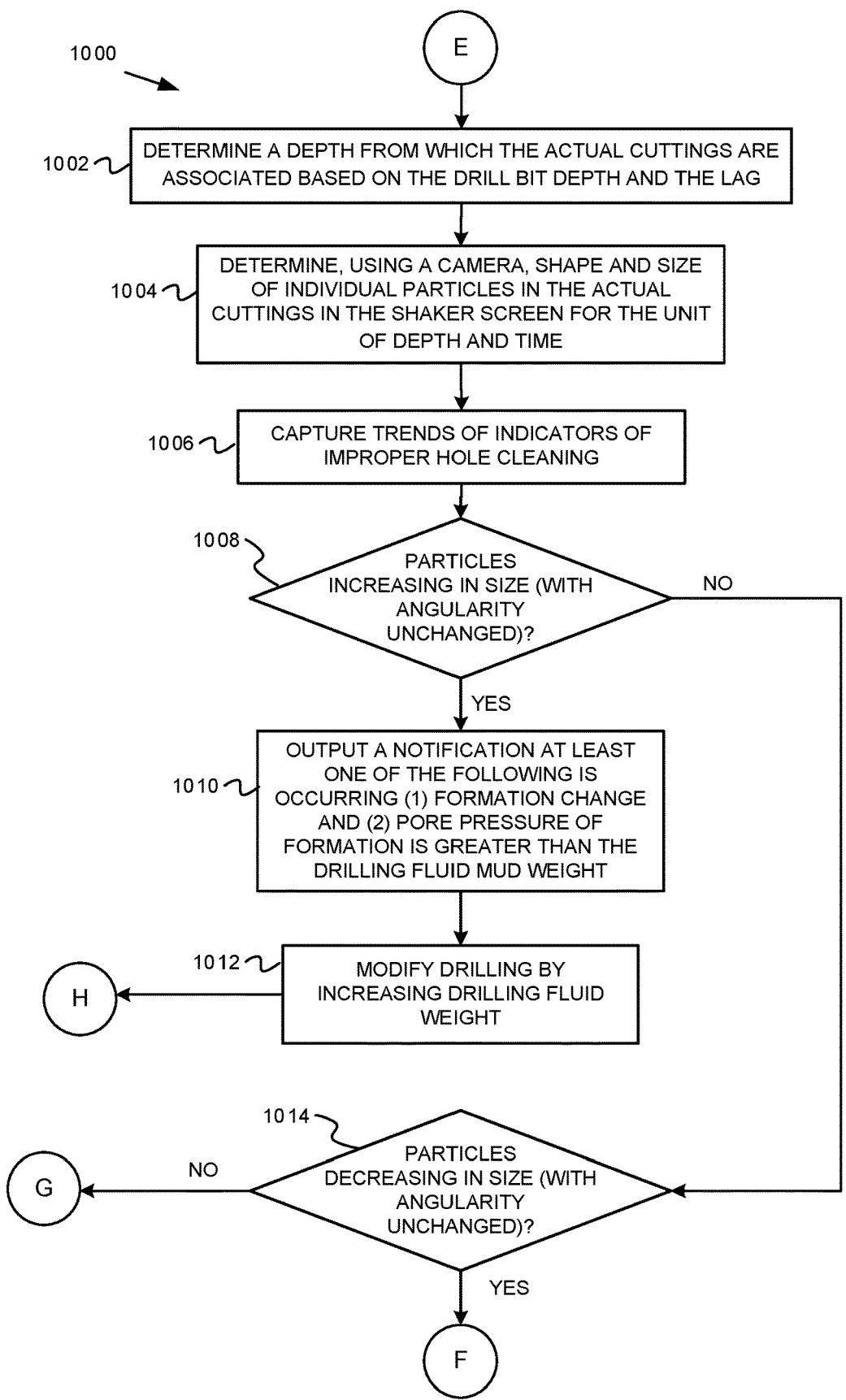
Figure 11:
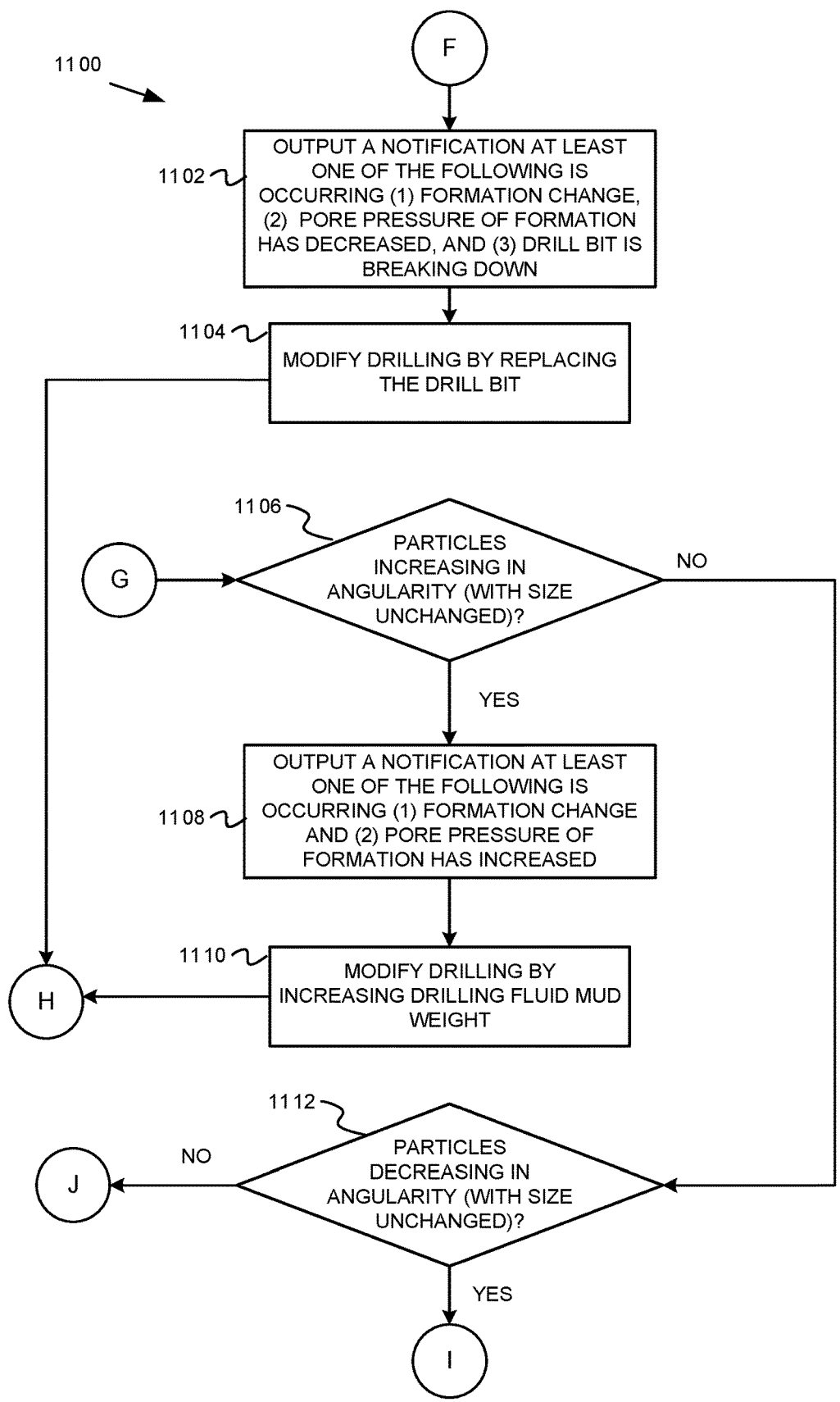
Figure 12:
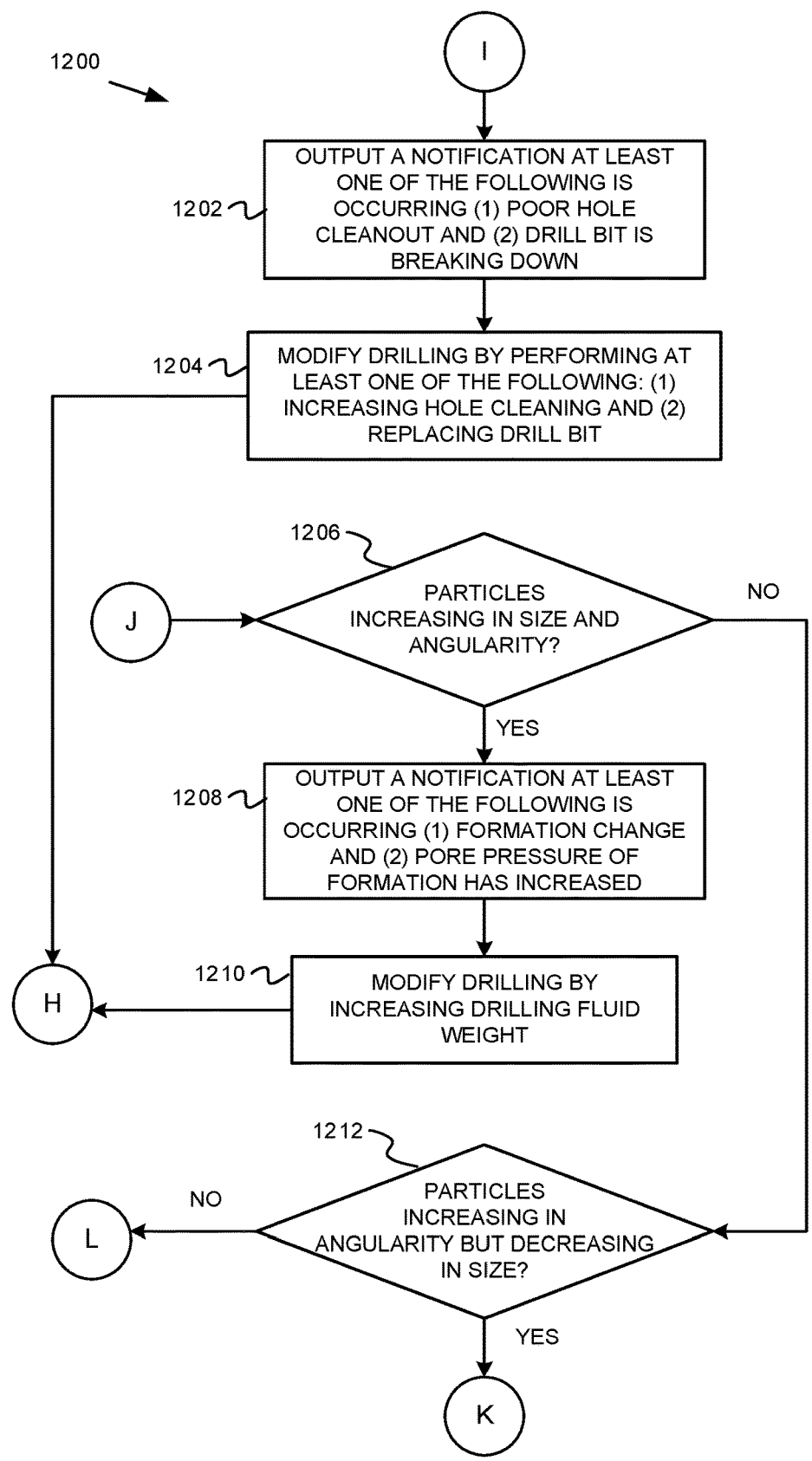
Figure 13:
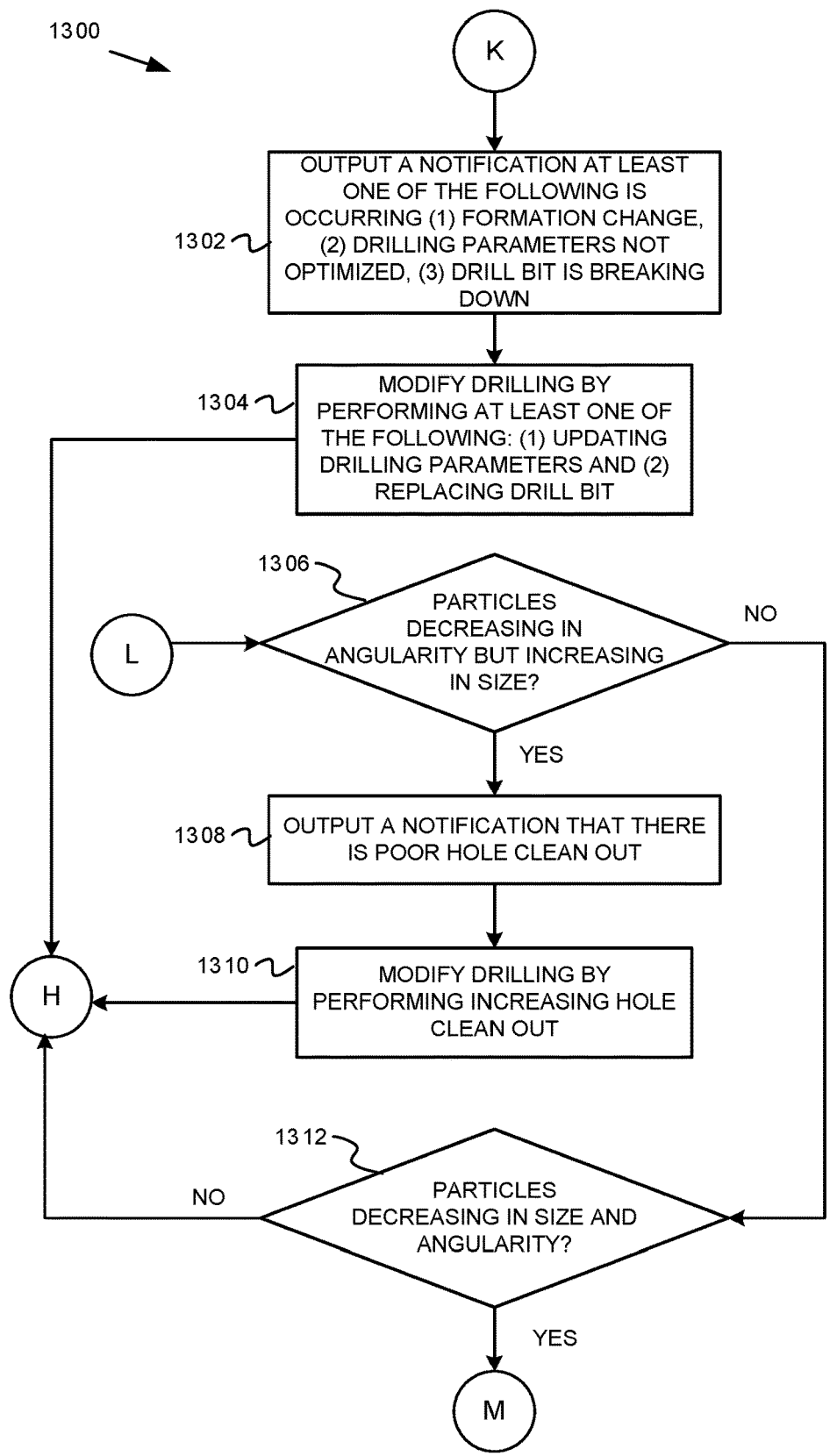
Figure 14:
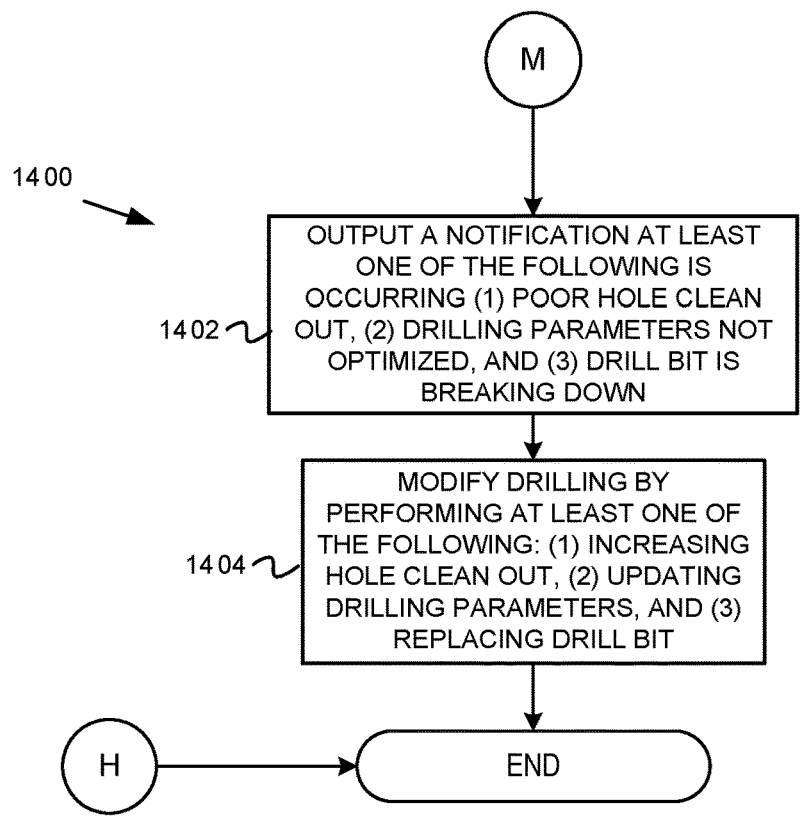
Figure 15:
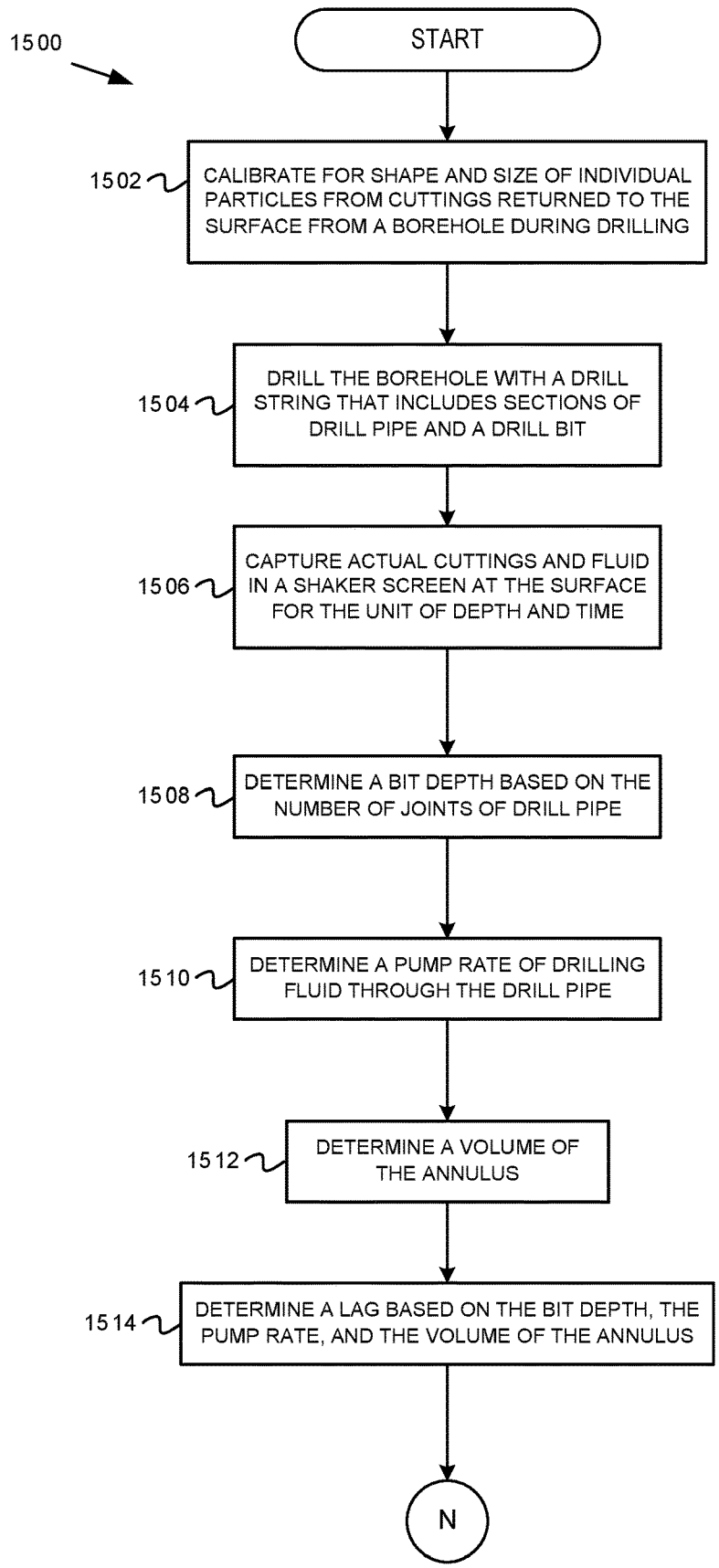
FIGS. 15-24 are flowcharts of operations for evaluating and possibly altering downhole drilling operations based on analysis of size and shape distributions of particles in downhole cuttings, according to some embodiments.
Figure 16:
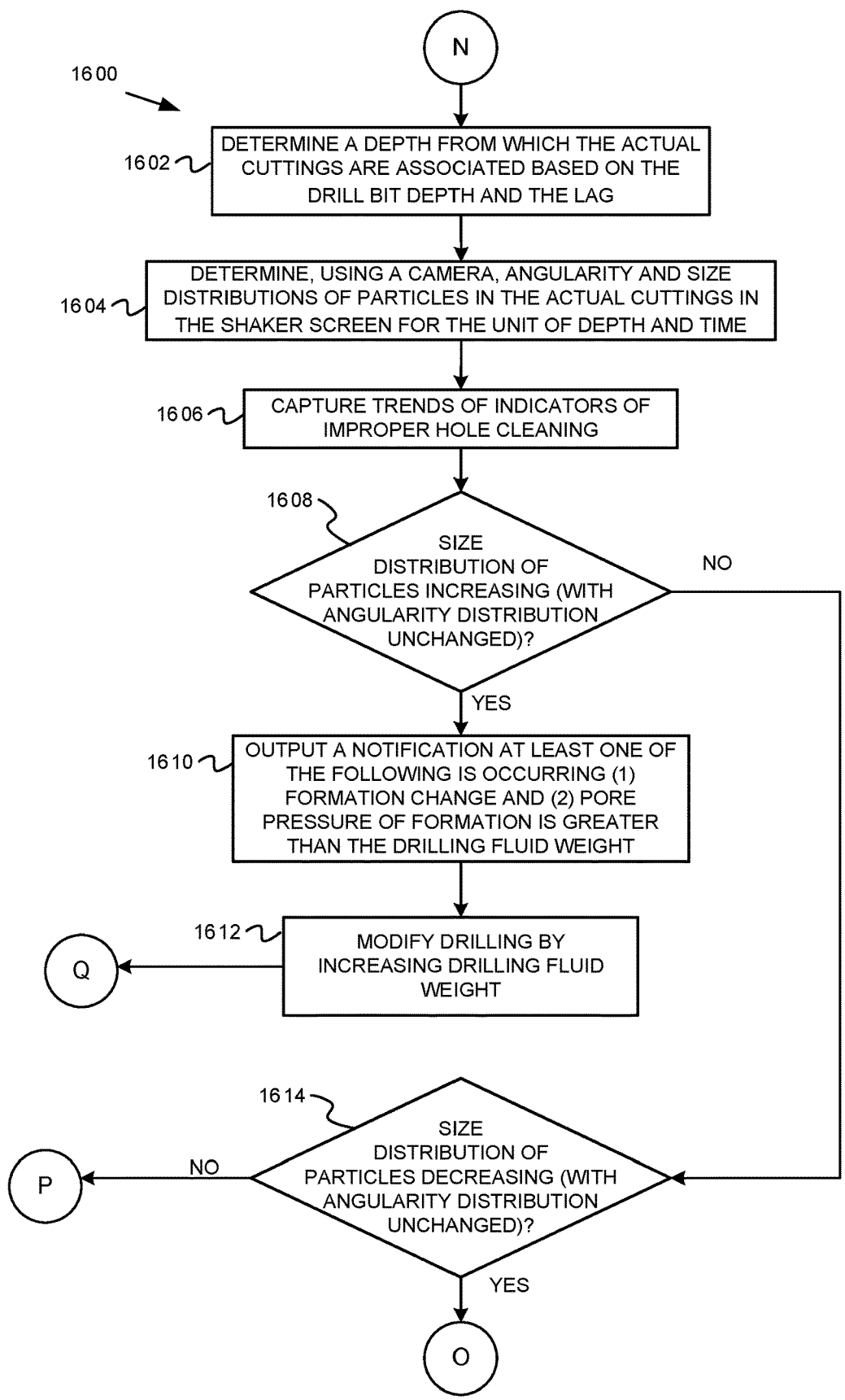
Figure 17:
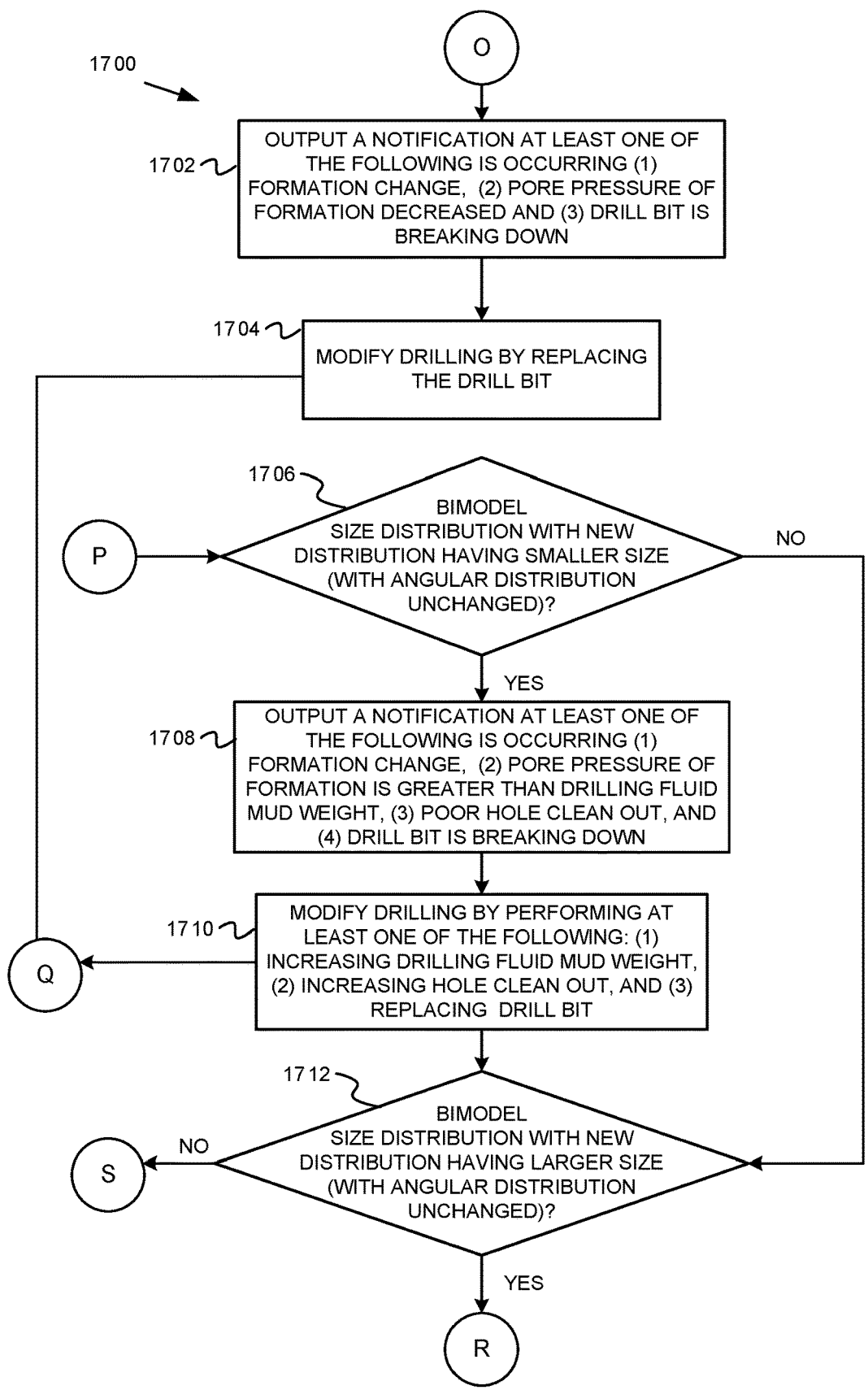
Figure 18:
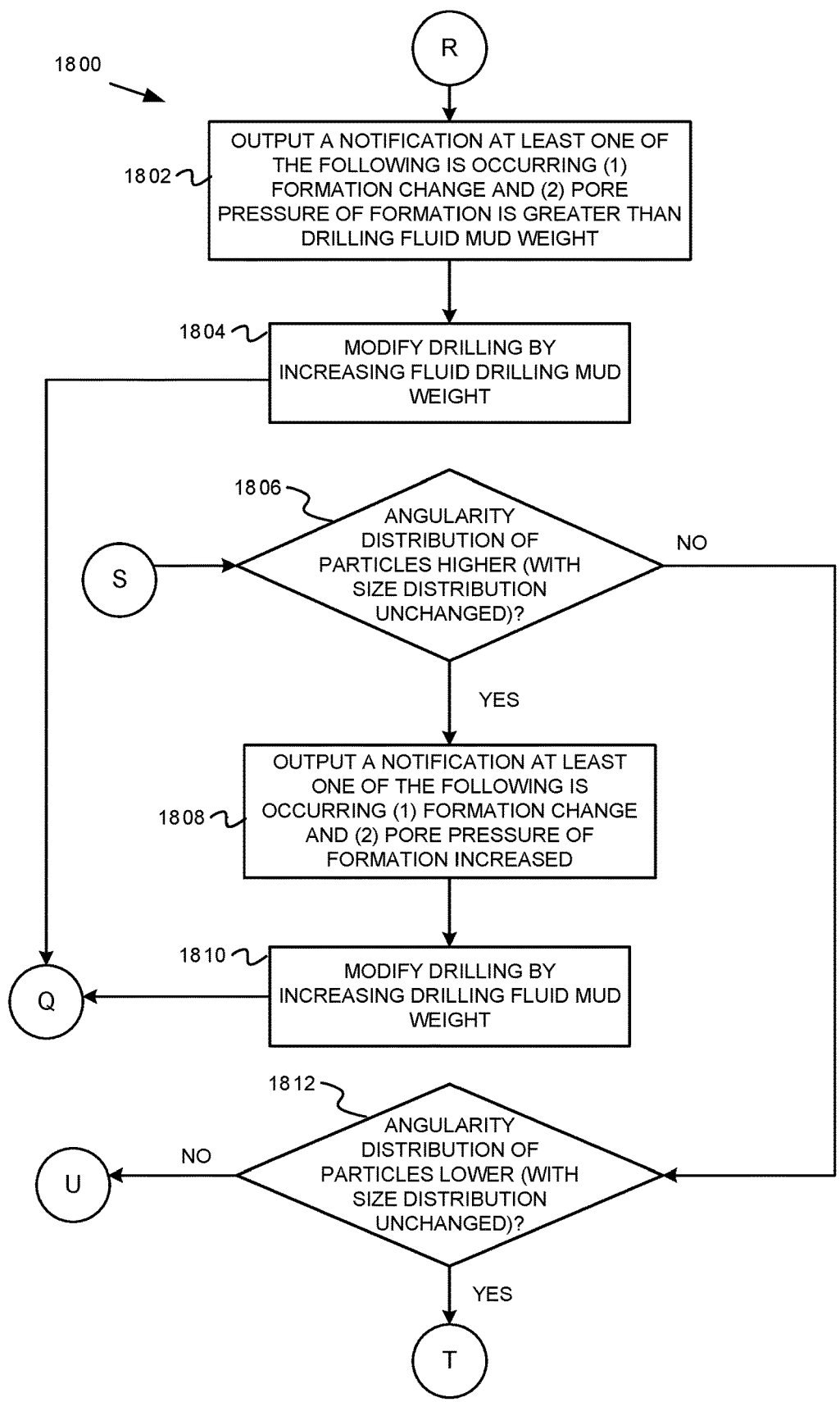
Figure 19:
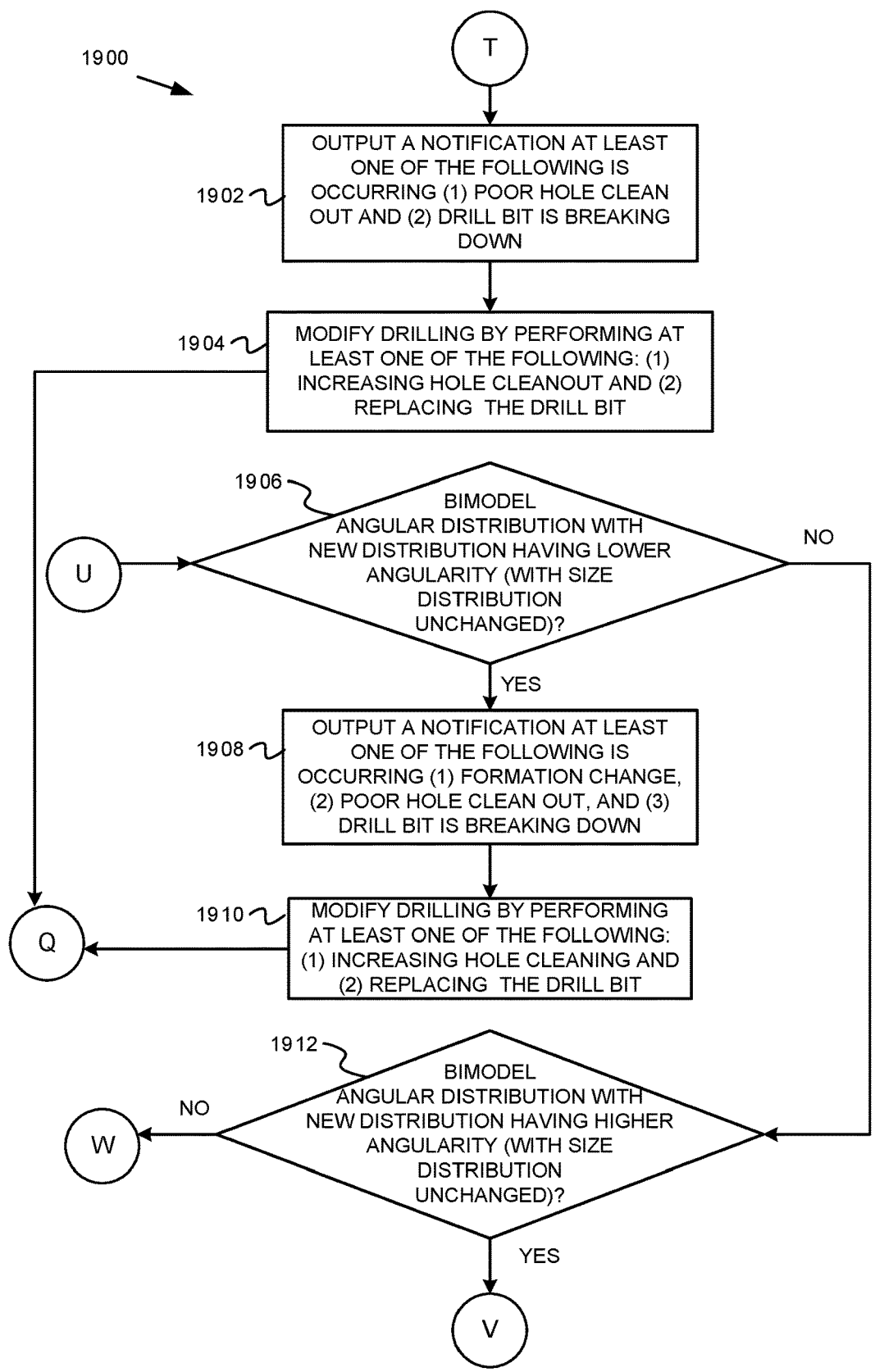
Figure 20:
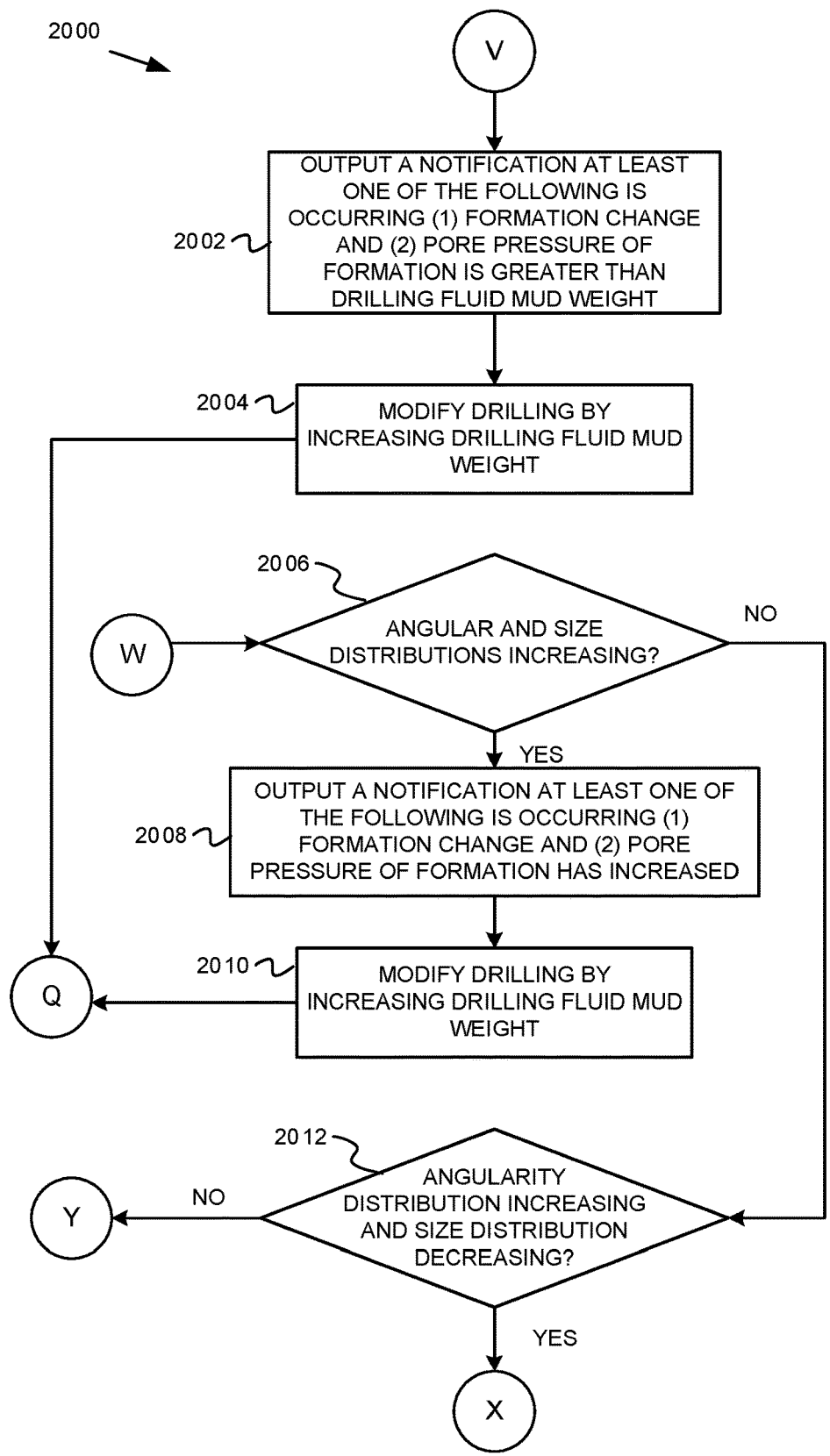
Figure 21:
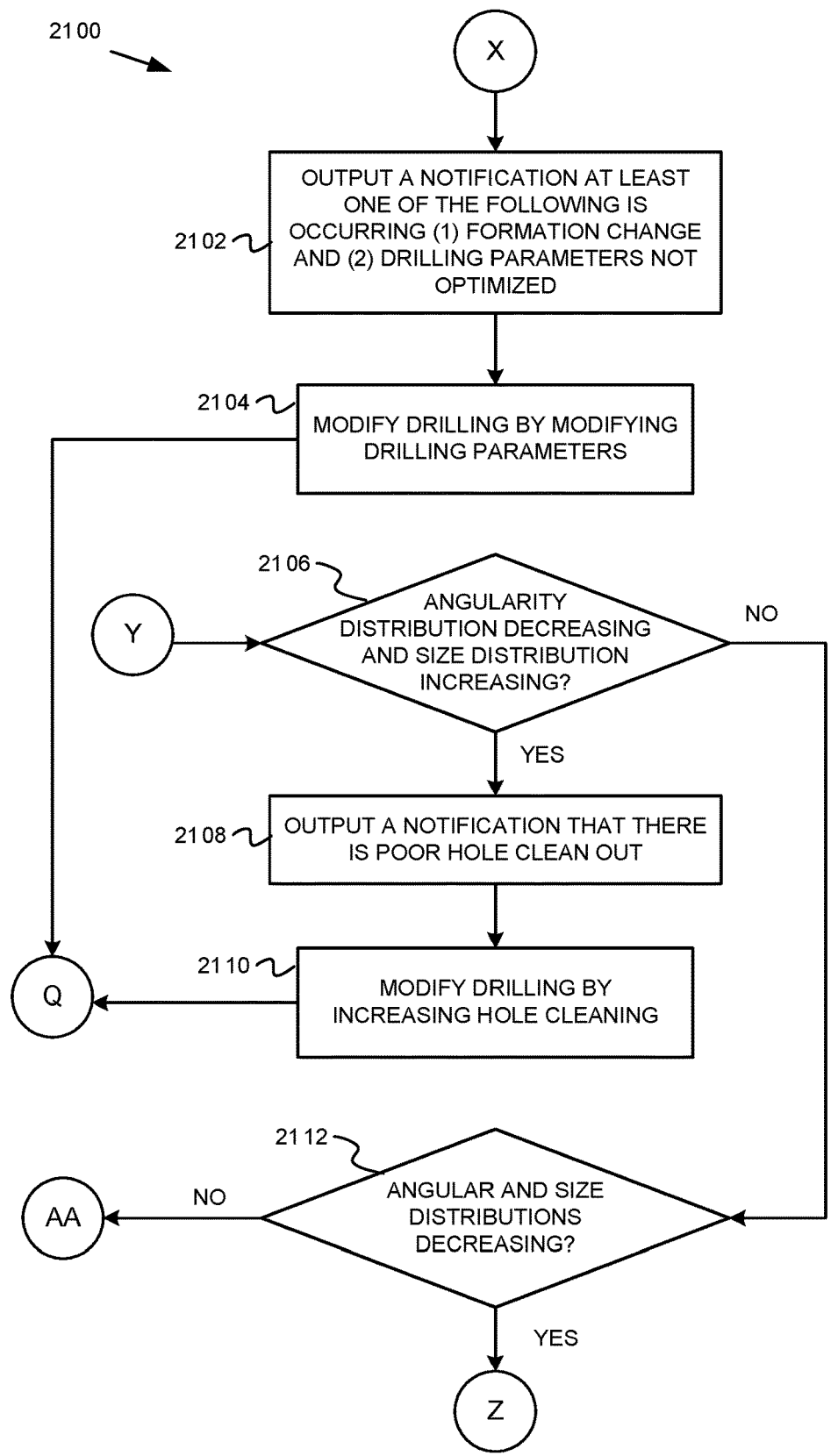
Figure 22:
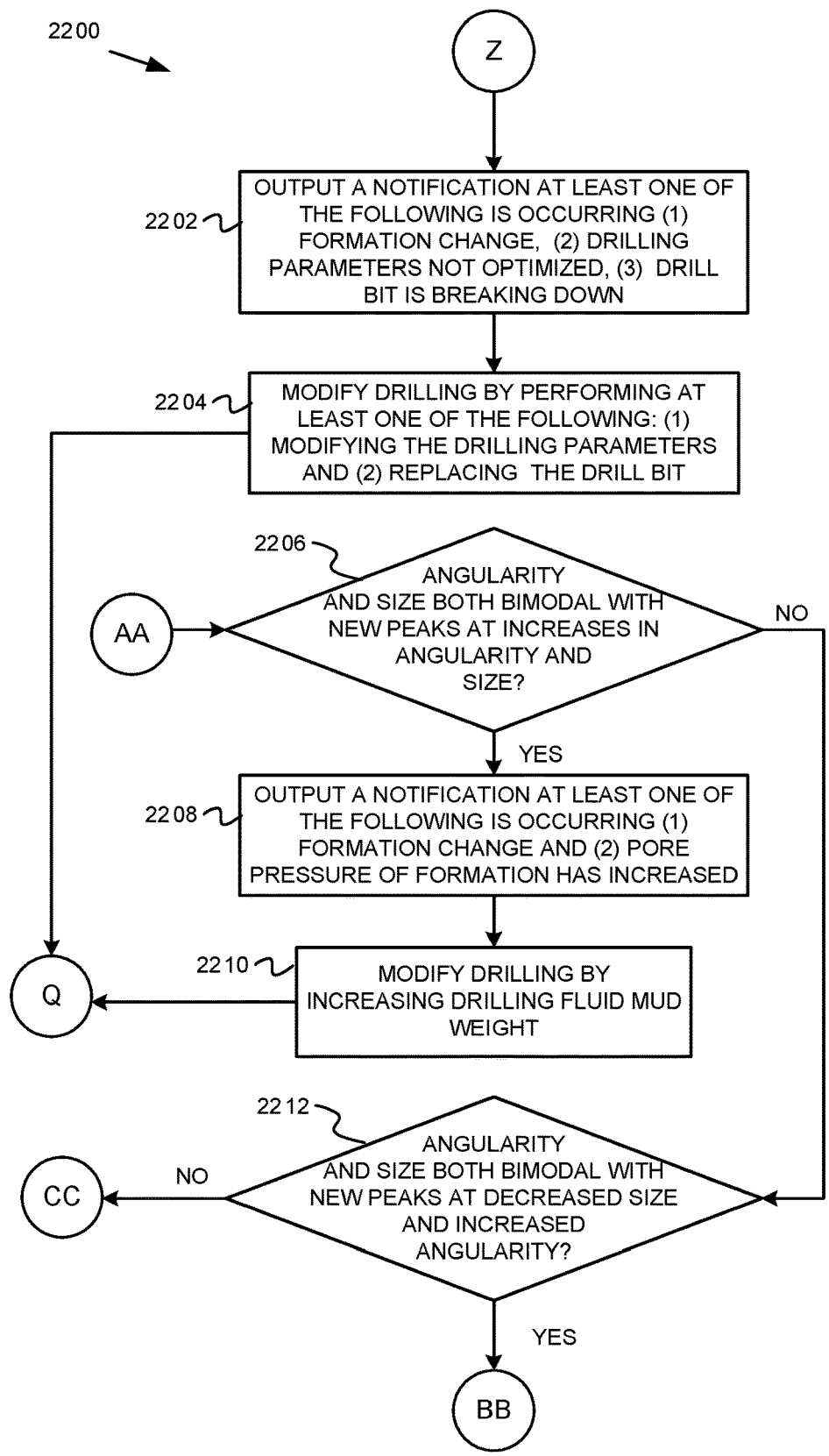
Figure 23:
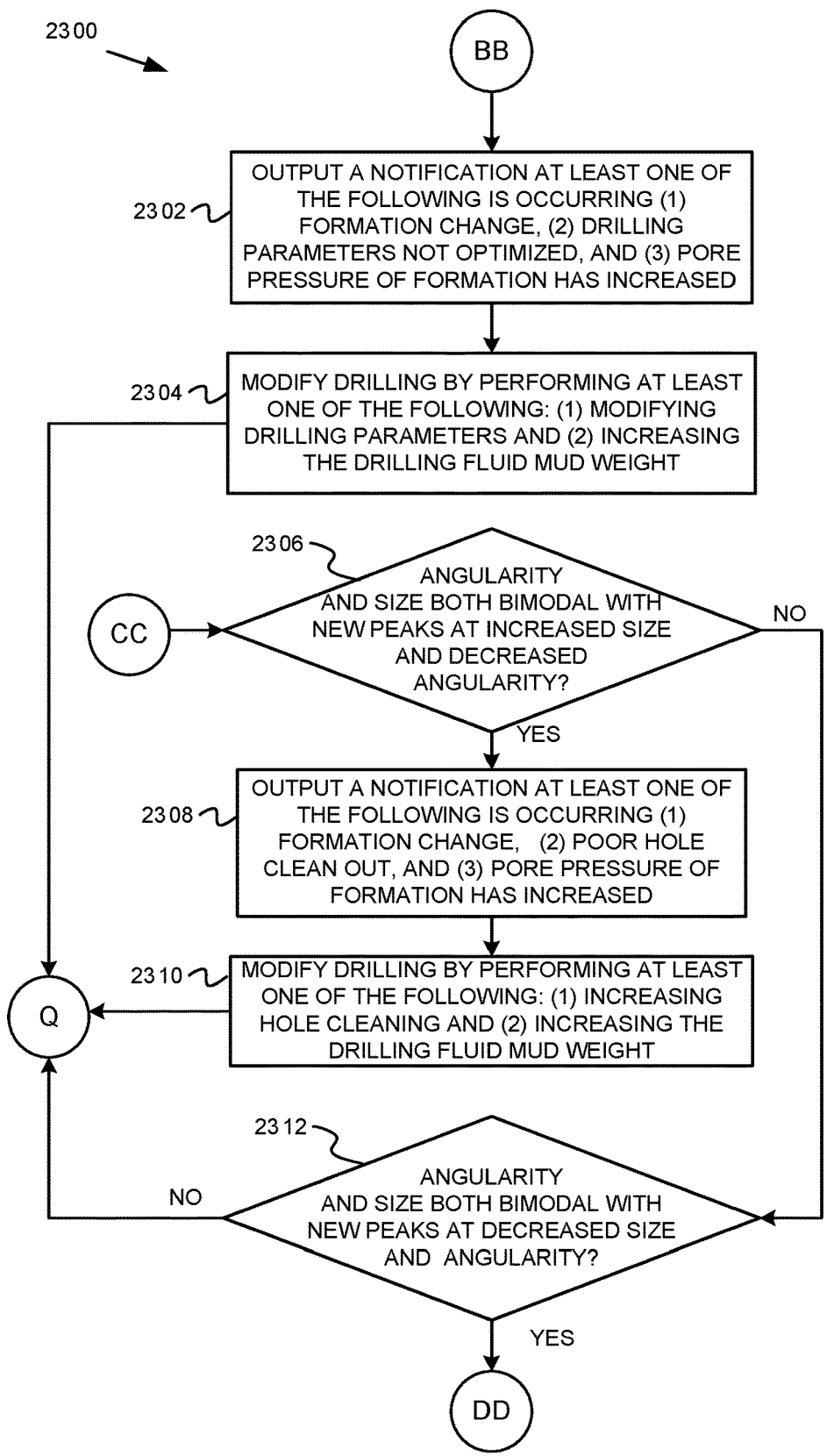
Figure 24:
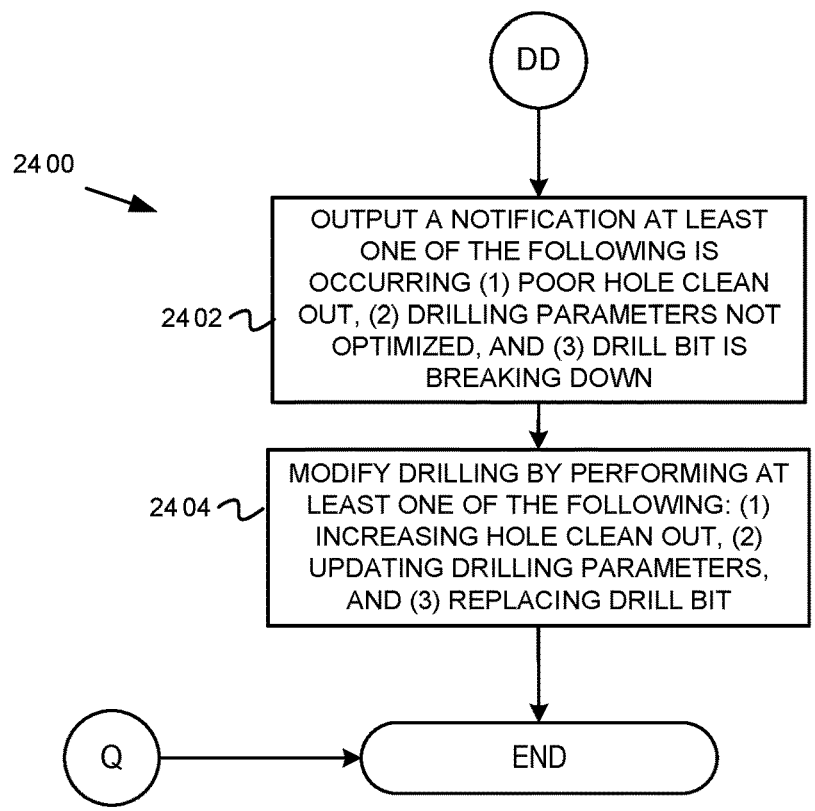

Example operations of analyzing and using the volume of cuttings are now described. FIGS. 6-8 are flowcharts of operations for evaluating and possibly altering downhole drilling operations based on analysis of volume of downhole cuttings, according to some embodiments. Operations of flowcharts 600-800 of FIGS. 6-8 continue among each other through transition points A-D. Operations of the flowcharts 300-500 can be performed by software, firmware, hardware or a combination thereof. The operations of the flowchart 600 start at block 602.

At block 602, a projected volume of cuttings projected to return to the surface during drilling of a borehole which is to be drilled for a unit of depth and time is determined. For example, with reference to FIGS. 1-3, the processors 130 calculate the projected volume of cuttings based on the determined unit of depth and time of drilling operations. The projected volume can also account for the size (e.g., diameter) of the drill bit 326 and/or reamer. The projected volume of cuttings for the determined depth and time interval may be calculated as a function of time.

At block 604, a borehole is drilled with a drill string that includes sections of drill pipe and a drill bit. For example, with reference to FIGS. 1-3, the drill bit 326 included on the bottommost portion of the drill string 308 drills the borehole 312. The drill string 308 includes one or more sections of drill pipe 318.

At block 606, actual cuttings and fluid are captured in a shaker screen for the unit of depth and time of drilling. For example, with reference to FIGS. 1-3, cuttings from the subsurface formation 314 are created during operation of the drill bit 326. Drilling fluid is used to remove the cuttings. The drilling fluid and cuttings are returned to the surface 304 during drilling of the borehole 312 for the determined unit of depth and time. The shaker screen 108 receives the drilling fluid which includes the cuttings. The drilling fluid may be filtered before or after it is received by the shaker screen 108 as to remove drilling fluid from the cuttings prior to analysis.

At block 608, a drill bit depth is determined based on the number of joints of drill pipe. The depth of the drill bit can be calculated if the number of joints of drill pipe and the lengths of each respective joint of drill pipe are known. For example, with reference to FIGS. 1-3, the depth of the drill bit 326 is determined based on the number of joints of drill pipe 318 and the known lengths of each of the drill pipe 318 joints.

At block 610, a pump rate of drilling fluid through the drill pipe is determined. The pump rate may be provided in pump strokes or volume of fluid pumped per minute. For example, with reference to FIGS. 1-3, the pump rate in addition to other drilling parameters may be stored in memory 150. The processors 130 may retrieve the pump rate from memory 150.

At block 612, a volume of the annulus is determined. For example, with reference to FIGS. 1-3, the processor 130 can calculate the volume of the annular area 340. The processor 130 may determine the volume based on the diameter of the borehole 312, diameter of the drill pipe 318, and the depth of the drill bit 326.

At block 614, a lag is determined based on the drill bit depth, pump rate, and volume of the annulus. The annular volume at the particular measured depth corresponding to the drill bit is determined based on the known drill bit depth and volume of the annulus. The lag can then be calculated using the resulting annular volume and the pump rate. For example, referring to FIGS. 1-3, the processors 130 can calculate the lag based on the depth of the drill bit 326, the volume of the annular area 340, and the pump rate of the mud pump 332. Operations of the flowchart 600 continue at transition point A, which continues at transition point A of the flowchart 700. From transition point A of the flowchart 700, operations continue at block 702.

At block 702, a depth from which the actual cuttings are associated is determined based on the drill bit depth and the lag. The depth of the drill bit may be tracked at each unit of depth and time. For instance, with reference to FIGS. 1-3, the processors 130 may retrieve from memory 150 the drill bit 326 depth recorded at the previous time which corresponds to the lag time. As an example, if the lag is determined to be 25 minutes and the current depth of the drill bit 326 is 5000 meters, the processor 130 may retrieve the drill bit 326 depth with a time stamp corresponding to 25 minutes prior.

At block 704, coherent electromagnetic radiation is emitted onto the actual cuttings in the shaker screen. For example, with reference to FIGS. 1-3, the lasers 190-192 emit coherent electromagnetic radiation onto the cuttings 112. The coherent electromagnetic radiation emitted onto the cuttings 112 can be visible as a line or curve, depending on the shape of the shaker screen.

At block 706, the velocity of the actual cuttings on the shaker is measured. The velocity of the cuttings may be determined using traditional approach of tracking a particle over a certain distance for a certain amount of time. For example, with reference to FIGS. 1-3, the imaging device 124 in conjunction with a velocity capture algorithm can be used to track the velocity of the particle/cuttings. Other methods using radars may also be used to determine velocity of particles. To filter out noise in the form of vibration of the shaker 104, a reference target can be mounted on a static portion of the shaker. The pixel movement can be captured using the imaging device 124. An algorithm may be selected to capture the pixel movement on the shaker 104. Other methods using accelerometers may also be used to baseline the vibrations on the shaker screen.

At block 708, a volume of the actual cuttings is measured for the unit of depth and time based on the coherent electromagnetic radiation emitted on the actual cuttings. For example, with reference to FIGS. 1-3, the line of coherent electromagnetic radiation deflects as a result of contacting the cuttings 112. The imaging device 124 captures an image of the line of coherent radiation. The processors 130 can analyze the captured image to determine the distance between the initial line and the deflection of the line resulting from contact with the cuttings 112. The resulting distance is used to determine the surface area of the cuttings 112. The surface area of the cuttings can be determined based on geometric relationships between known distances and/or thicknesses (e.g., with triangle properties). Volume of the cuttings can be obtained by multiplying the surface area of the cuttings (determined by laser deflection) to the velocity of cuttings passing over the laser line. The volume may also be determined by comparing the measured distance with distances previously measured for objects of a known thickness which are stored in memory 150 (e.g., in a lookup table). For instance, an object with a known thickness of 1.5 centimeters (cm) can be used during calibration to determine the distance of deflection resulting from an object with a thickness of 1.5 cm. The distance may be stored in a lookup table in memory 150. When obtaining the volume of the cuttings 112, the processors 130 can identify whether the current measured distance has been stored in the lookup table (e.g., to determine if particles have a thickness of 1.5 cm). Programs which facilitate particle analysis (e.g., particle size analysis software, three-dimensional facial recognition software, etc.) may also be leveraged when determining volume. The discrete and/or cumulative volume of cuttings for the current interval of depth and/or time which are determined based on analysis of the line of coherent electromagnetic radiation may be stored in the memory 150.

At block 710, it is determined whether the difference between the measured volume and the projected volume exceeds an error threshold. The error threshold indicates a deviation of the projected volume from the measured volume which can be attributed to error. The error threshold can account for drilling fluid which remains on cuttings after the cuttings are returned to the surface and deposited on the shaker screen. For instance, with reference to FIGS. 1-3, cuttings 112 which contain remnants of drilling fluid may be deposited onto the shaker screen 108. The drilling fluid which remains at the time of analysis of the cuttings 112 contributes to error of measurement and is thus accounted for in the error threshold. The processors 130 can determine whether the error threshold is exceeded after calculating the difference between the measured volume and projected volume.

At block 712, if the difference between the measured volume and the projected volume does not exceed the error threshold, the current parameters for drilling are maintained. A difference between the measured volume of and the projected volume of cuttings, discrete or cumulative, which exceeds the error threshold indicates that current drilling parameters are maintaining formation stability and safe conditions. For example, with reference to FIGS. 1-3, drilling of the borehole 312 with the drill bit 326 and/or reamer will be maintained with the current set of parameters, such as the drilling fluid weight. Operations of the flowchart 700 continue at transition point D, which continues at transition point D of the flowchart 800. From transition point D of the flowchart 800, operations are complete.

At block 714, if the difference between the measured volume and the projected volume exceed the error threshold, trends of other indicators of improper hole cleaning are captured. Other indicators of improper hole cleaning include changes in torque, drag, equivalent circulating density, and standpipe pressure. For instance, with reference to FIGS. 1-3, the processors 130 can obtain improper hole cleaning indicator data over a unit of depth and/or time for storage in memory 150. For example, the processors 130 may obtain current drilling parameters, mud weight, depth of the drill bit 326, etc. Data obtained for the time or depth interval can be input into calculations for determining values of the indicators (e.g., by calculating standpipe pressure). The combination of such indicators may be combined to create a positive indicator for improper hole cleaning.

At block 716, it is determined whether the measured volume is less than the projected volume. For example, with reference to FIGS. 1-3, the processors 130 may make the determination based on comparison of the measured volume and the projected volume. If the measured volume is greater than the projected volume, operations of the flowchart 700 continue at transition point B, which continues at transition point B of the flowchart 800. From transition point B of the flowchart 800, operations continue at block 804.

At block 718, if the measured volume is less than the projected volume, a notification or alarm is output. For instance, with reference to FIGS. 1-3, the processors 130 can generate the notification or alarm which is output to the display 196. The notification or alarm could indicate that a cuttings buildup is occurring downhole. This information, when coupled with information such as changes in torque, drag, equivalent circulating density, standpipe pressure, etc., can lead to a positive indicator for improper borehole cleaning. A buildup of cuttings indicates that hole cleaning efforts should increase. Poor hole cleaning could lead to pack off, increased bottom hole pressure, and/or possible formation fracture. The notification or alarm could also indicate that the drill bit and/or reamer has reduced in diameter. Reduction of the diameter of the drill bit and/or reamer may lead to bit trip. Operations of the flowchart 700 continue at transition point C, which continues at transition point C of the flowchart 800. From transition point C of the flowchart 800, operations continue at block 802.

At block 802, drilling is modified by increasing hole cleaning and/or replacing the reamer and/or drill bit. Hole cleaning may be increased due to receipt of a notification that a buildup of cuttings is occurring downhole. Additionally, the drill bit and/or reamer may be replaced as a result of receiving a notification that the drill bit and/or reamer has reduced in diameter. For example, with reference to FIGS. 1-3, the drill bit 326 is replaced to resolve the reduction in diameter resulting from drilling of the borehole 312. Cleaning of the borehole 312 may also be increased if cuttings from the subsurface formation 314 have built up in the borehole. Cleaning of the borehole 312 may be increased by adjusting the properties of the drilling fluid, increasing the flow rate, altering the penetration rate, etc.

At block 804, if the measured volume is greater than the projected volume, a notification or alarm is output. For instance, with reference to FIGS. 1-3, the processors 130 can generate the notification or alarm which is output to the display 196. The notification or alarm could indicate that the hole is collapsing and that mitigating efforts should be taken to stabilize the wellbore. The notification or alarm could also indicate that the pore pressure has surpassed the drilling fluid weight.

At block 806, drilling is modified by increasing the drilling fluid weight. Drilling fluid weight should be increased as a result of identifying that the formation pore pressure is greater than the drilling fluid weight. For example, with reference to FIGS. 1-3, the density of the drilling fluid pumped from the mud pit 334 downhole can be increased (e.g., through addition of barite).

Size and Shape-Based Analysis Operations of Downhole Drill Cuttings

In some embodiments, a size and/or shape of the cuttings can be determined and used. The use of these determined size and/or shape of the cuttings can be in place of or in addition to the operations above that are based on volume of the cuttings described above with reference to FIGS. 6-8.

FIGS. 9-14 are flowcharts of operations for evaluating and possibly altering downhole drilling operations based on analysis of size and shape of particles in downhole cuttings, according to some embodiments. Operations of flowcharts 900-1400 of FIGS. 9-14 continue among each other through transition points E-M. Operations of the flowcharts 900-1400 can be performed by software, firmware, hardware or a combination thereof. The operations of the flowchart 900 start at block 902.

At block 902, shape and size of individual particles from cuttings returned to the surface from a borehole during drilling are calibrated for. Calibration of particle analysis can be performed with items of a known size and shape. For instance, with reference to FIGS. 1-3, the imaging device 124 focuses on the cuttings 112. Calibration may occur when the cuttings 112 are on the shaker 104 itself or when the cuttings are on another flat surface with the same focal length. Size and shape data can be communicated to the workstation 156. The lasers 190 and/or 192 may be used to mark known sizes and/or shapes on the shaker 104. Shape and/or size can be determined using the lasers 190 and/or 192 through analysis of the laser line deflection caused by the height of objects in the path of the laser line. Shapes and/or sizes determined through analysis of the laser line deflection can be stored in memory 150. When performing size and shape-based analysis of cuttings from downhole, size can be used in addition to or in place of volume. Size is a two-dimensional measurement of a single cutting and is proportional to change in volume that is a three-dimensional measurement. Shape changes can be defined as changes in angularity. The smaller the angle, the higher the angularity (e.g., a cube). Similarly, the larger the angle, the less angularity (e.g., a sphere).

At block 904, a borehole is drilled with a drill string that includes sections of drill pipe and a drill bit. For example, with reference to FIGS. 1-3, the drill bit 326 included on the bottommost portion of the drill string 308 drills the borehole 312. The drill string 308 includes one or more sections of drill pipe 318.

At block 906, actual cuttings and fluid are captured in a shaker screen for the unit of depth and time of drilling. For example, with reference to FIGS. 1-3, cuttings from the subsurface formation 314 are created during operation of the drill bit 326 for the determined interval of depth and time. Drilling fluid is used to remove the cuttings. The drilling fluid and cuttings are returned to the surface 304 and deposited onto the shaker screen 108. The drilling fluid may be filtered before or after it is received by the shaker screen 108 as to remove drilling fluid from the cuttings prior to analysis.

At block 908, a drill bit depth is determined based on the number of joints of drill pipe. The depth of the drill bit can be calculated if the number of joints of drill pipe and the lengths of each respective joint of drill pipe are known. For example, with reference to FIGS. 1-3, the depth of the drill bit 326 is determined based on the number of joints of drill pipe 318 and the known lengths of each of the drill pipe 318 joints.

At block 910, a pump rate of drilling fluid through the drill pipe is determined. The pump rate may be provided in pump strokes or volume of fluid pumped per minute. For example, with reference to FIGS. 1-3, the pump rate in addition to other drilling parameters may be stored in memory 150. The processors 130 may retrieve the pump rate from memory 150.

At block 912, a volume of the annulus is determined. For example, with reference to FIGS. 1-3, the processors 130 can calculate the volume of the annular area 340. The processors 130 may determine the volume based on the diameter of the borehole 312, diameter of the drill pipe 318, and the depth of the drill bit 326.

At block 914, a lag is determined based on the drill bit depth, pump rate, and volume of the annulus. The annular volume at the particular measured depth corresponding to the drill bit is determined based on the known drill bit depth and volume of the annulus. The lag can then be calculated using the resulting annular volume and the pump rate. For example, referring to FIGS. 1-3, the processors 130 can calculate the lag based on the depth of the drill bit 326, the volume of the annular area 340, and the pump rate of the mud pump 332. Operations of the flowchart 900 continue at transition point E, which continues at transition point E of the flowchart 1000. From transition point E of the flowchart 1000, operations continue at block 1002.

At block 1002, a depth from which the actual cuttings are associated is determined based on the drill bit depth and the lag. The depth of the drill bit may be tracked at each unit of depth and time. For instance, with reference to FIGS. 1-3, the processors 130 may retrieve from memory 150 the drill bit 326 depth recorded at the previous time which corresponds to the lag time. As an example, if the lag is determined to be 25 minutes and the current depth of the drill bit 326 is 5000 meters, the processor 130 may retrieve the drill bit 326 depth with a time stamp corresponding to 25 minutes prior. The previous depth of the drill bit 326 can then be determined to correspond to the depth from which the cuttings 112 are associated.

At block 1004, the shape and size of individual particles in the actual cuttings in the shaker screen for the unit of depth and time are determined with a camera. For example, with reference to FIGS. 1-3, images of the cuttings 112 may be recorded with the imaging device 124. The processors 130 may analyze the received images to determine corresponding shape and size data. The shape and size in the form of data and/or photographs may be stored onsite or offsite in memory 150.

At block 1006, trends of indicators of improper hole cleaning are captured. Indicators of improper hole cleaning include changes in torque, drag, equivalent circulating density, and standpipe pressure. For instance, with reference to FIGS. 1-3, the processors 130 can obtain improper hole cleaning indicator data over a unit of depth and/or time for storage in memory 150. For example, the processors 130 may obtain current drilling parameters, mud weight, depth of the drill bit 326, etc. Data obtained for the time or depth interval can be input into calculations for determining values of the indicators. The combination of such indicators may be combined to create a positive indicator for improper hole cleaning.

At block 1008, it is determined if the particles are increasing in size with unchanged angularity. For example, with reference to FIGS. 1-3, the processors 130 may compare the shape and size data collected for the cuttings 112 currently present in the shaker screen 108 with previously acquired shape and size data stored in memory 150. Particle sizes recorded from the previous unit of depth and time of drilling may be compared to the cuttings 112 to identify if the size is increasing. Similarly, particle angularity recorded during the previous unit of depth and time of drilling may be compared to the observed angularity of the cuttings 112 to identify if the angularity is unchanged. A threshold size and/or angularity change may be enforced which should be satisfied to determine that the observed changes are sufficiently significant to quantify as an increase or decrease. For instance, a size change threshold may be set at 5 square microns ($\mu m^2$). An observed size increase of 10 $\mu m^2$ therefore may be considered an increase in size due to satisfying the size change threshold. When particle size increases with no change in angularity, it may be assumed that the formation has changed and that the pore pressure of the formation has reduced or has increased relative to the drilling fluid weight. It may also be assumed that the formation has changed and/or the drill bit 326 is breaking down (e.g., wearing out) and is no longer fully functional.

At block 1010, if particles are increasing in size with unchanged angularity, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure has surpassed the drilling fluid weight.

At block 1012, drilling is modified by increasing the weight of drilling fluid. For example, with reference to FIGS. 1-3, the density of the drilling fluid pumped from the mud pit 334 downhole can be increased (e.g., through addition of barite or other additives). Operations of the flowchart 1000 continue at transition point H, which continues at transition point H of the flowchart 1400. From transition point H of the flowchart 1400, operations are complete.

At block 1014, if particles are not decreasing in size or changing in angularity, it is determined if the particles are decreasing in size with no change in angularity. For example, with reference to FIGS. 1-3, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is decreasing. Similarly, particle angularity recorded during the previous unit of depth and time of drilling may be compared to the observed angularity of the cuttings 112 to identify if the angularity is unchanged. A threshold size and/or angularity change may be enforced which should be satisfied to determine that the observed changes are sufficiently significant to quantify as an increase or decrease. When the size of particles decreases and angularity is unchanged, it may be assumed that the formation has changed and/or that the pore pressure of the formation has decreased. It may also be assumed that the drill bit is breaking down and is no longer fully functional.

If particles are decreasing in size with unchanged angularity, operations of the flowchart 1000 continue at transition point F, which continues at transition point F of the flowchart 1100. From transition point F of the flowchart 1100, operations continue at block 1102. If particles are not decreasing in size with unchanged angularity, operations of the flowchart 1000 continue at transition point G, which continues at transition point G of the flowchart 1100. From transition point G of the flowchart 1100, operations continue at block 1106.

At block 1102, a notification or alarm is output. For instance, with reference to FIGS. 1-3, the processors 130 can generate the notification or alarm which is output to the display 196. The notification or alarm may indicate that a formation change is occurring. The notification or alarm could also indicate that the pore pressure of the formation has increased. The notification or alarm could also indicate that the drill bit is breaking down.

At block 1104, drilling is modified by replacing the drill bit. For instance, with reference to FIGS. 1-3, after determining that the drill bit 326 is breaking down, the drill bit 326 may be replaced for subsequent drilling operations.

At block 1106, it is determined if particles are increasing in angularity with size unchanged. For example, with reference to FIGS. 1-3, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is unchanged. Similarly, particle angularity recorded during the previous unit of depth and time of drilling may be compared to the observed angularity of the cuttings 112 to identify if the angularity is increasing. A threshold size and/or angularity change may be enforced which should be satisfied to determine that the observed changes quantify as an increase or decrease. For instance, a threshold angularity change may indicate a difference between particle shapes which should be observed in order to determine that an increase or decrease in angularity has occurred. When the angularity of particles increases and size is unchanged, it may be assumed that the formation has changed and the pore pressure of the formation is increased.

At block 1108, if particles are increasing in angularity with size unchanged, a notification or alarm is output. For instance, with reference to FIGS. 1-3, the processors 130 can generate the notification or alarm which is output to the display 196. The notification or alarm may indicate that a formation change is occurring. The notification or alarm may also indicate that the pore pressure of the formation has increased.

At block 1110, drilling is modified by increasing the weight of drilling fluid. For example, with reference to FIGS. 1-3, the density of the drilling fluid pumped from the mud pit 334 downhole can be increased (e.g., through addition of barite). Operations of the flowchart 1100 continue at transition point H, which continues at transition point H of the flowchart 1400. From transition point H of the flowchart 1400, operations are complete.

At block 1112, if particles are not increasing in angularity with size unchanged, it is determined if particles are decreasing in angularity with size unchanged. For example, with reference to FIGS. 1-3, the processors 130 may compare the shape and size data collected for the cuttings 112 currently present in the shaker screen 108 with previously acquired shape and size data stored in memory 150. Particle sizes recorded at the previous unit of depth and time of drilling may be compared to the cuttings 112 to identify if the size is unchanging. Similarly, particle angularity recorded during the previous unit of depth and time of drilling may be compared to the observed angularity of the cuttings 112 to identify if the angularity is decreasing. A threshold size and/or angularity change may be enforced which should be satisfied to determine that the observed changes quantify as an increase or decrease. If a decrease in particle angularity without a change in size is observed, it may be determined that the hole cleanout is poor (i.e., cuttings are not returning to the surface). It may also be determined that the drill bit 326 is breaking down.

If particles are decreasing in angularity with unchanged size, operations of the flowchart 1100 continue at transition point I, which continues at transition point I of the flowchart 1200. From transition point I of the flowchart 1200, operations continue at block 1202. If particles are not decreasing in angularity with size unchanged, operations of the flowchart 1100 continue at transition point J, which continues at transition point J of the flowchart 1200. From transition point J of the flowchart 1200, operations continue at block 1206.

At block 1202, a notification or alarm is output. For instance, with reference to FIGS. 1-3, the processors 130 can generate the notification or alarm which is output to the display 196. The notification or alarm may indicate that hole cleanout is poor. The notification or alarm may also indicate that the drill bit 326 is breaking down.

At block 1204, drilling is modified by increasing hole cleaning and/or replacing the drill bit. For instance, with reference to FIGS. 1-3, the drill bit 326 is replaced for subsequent drilling operations. Cleanout of the borehole 312 may be increased by increasing flow rate of drilling fluid, adjusting drilling fluid properties, etc. Operations of the flowchart 1200 continue at transition point H, which continues at transition point H of the flowchart 1400. From transition point H of the flowchart 1400, operations are complete.

At block 1206, it is determined if particles are increasing in size and angularity. For example, with reference to FIGS. 1-3, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is increasing. Similarly, particle angularity recorded during the previous unit of depth and time of drilling may be compared to the observed angularity of the cuttings 112 to identify if the angularity is increasing. A threshold size and/or angularity change may be enforced which should be satisfied to determine that the observed changes quantify as an increase or decrease. For instance, a threshold angularity change may indicate a difference between particle shapes which should be observed in order to determine that an increase in angularity has occurred. An increase in both size and angularity may indicate that the formation has changed and/or that the pore pressure of the formation has increased.

At block 1208, if particles are increasing in size and angularity, a notification or alarm is output. The notification or alarm may indicate that a change in the formation is occurring. The notification or alarm may also indicate that the pore pressure of the formation has increased. For instance, with reference to FIGS. 1-3, the processors 130 can generate the notification or alarm which is output to the display 196.

At block 1210, drilling is modified by increasing the weight of drilling fluid. For example, with reference to FIGS. 1-3, the density of the drilling fluid pumped from the mud pit 334 downhole can be increased (e.g., through addition of barite or another additive). Operations of the flowchart 1200 continue at transition point H, which continues at transition point H of the flowchart 1400. From transition point H of the flowchart 1400, operations are complete.

At block 1212, if particles are not increasing in size and angularity, it is determined if particles are increasing in angularity and decreasing in size. For example, with reference to FIGS. 1-3, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is decreasing. Similarly, particle angularity recorded during the previous unit of depth and time of drilling may be compared to the observed angularity of the cuttings 112 to identify if the angularity is increasing. A threshold size and/or angularity change may be enforced which should be satisfied to determine that the observed changes quantify as an increase or decrease. For instance, a size change threshold may be set at 10 square microns ($\mu m^2$). An observed decrease in size of 4 $\mu m^2$ therefore may not be considered a decrease in size due to failing to satisfy the size change threshold. If an increase in angularity and decrease in size is observed, it may be determined that the formation is changing. It may also be assumed that the drilling parameters are not optimized. Also, it may be assumed that the drill bit 326 is breaking down and is no longer fully functional.

If particles are increasing in angularity and decreasing in size, operations of the flowchart 1200 continue at transition point K, which continues at transition point K of the flowchart 1300. From transition point K of the flowchart 1300, operations continue at block 1302. If particles are not increasing in angularity and decreasing in size, operations of the flowchart 1200 continue at transition point L, which continues at transition point L of the flowchart 1300. From transition point L of the flowchart 1300, operations continue at block 1306.

At block 1302, a notification or alarm is output. The notification or alarm may indicate that a change in the formation is occurring. The notification or alarm may also indicate that the current drilling parameters are not optimized. The notification or alarm may also indicate that the drill bit is breaking down. For instance, with reference to FIGS. 1-3, the processors 130 can generate the notification or alarm which is output to the display 196.

At block 1304, drilling is modified by updating drilling parameters and/or replacing the drill bit. For example, with reference to FIGS. 1-3, the drill bit 326 may be replaced for subsequent drilling operations. Drilling parameters may also be updated by modifying rotation speed of the drill string 308, adjusting penetration rate of the drill bit 326, etc. Operations of the flowchart 1300 continue at transition point H, which continues at transition point H of the flowchart 1400. From transition point H of the flowchart 1400, operations are complete.

At block 1306, it is determined if particles are decreasing in angularity and increasing in size. For example, with reference to FIGS. 1-3, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is increasing. Similarly, particle angularity recorded during the previous unit of depth and time of drilling may be compared to the observed angularity of the cuttings 112 to identify if the angularity is decreasing. A threshold size and/or angularity change may be enforced which should be satisfied to determine that the observed changes quantify as an increase or decrease. Observation of an increase in particle size and a decrease in particle angularity may be indicative of poor cleanout of the borehole 312.

At block 1308, if particles are decreasing in angularity and increasing in size, a notification or alarm is output which indicates that there is poor hole cleanout. For instance, with reference to FIGS. 1-3, the processors 130 can generate the notification or alarm which is output to the display 196.

At block 1310, drilling is modified by increasing hole cleanout. For example, with reference to FIGS. 1-3, cleanout of the borehole 312 may be increased by increasing flow rate of drilling fluid, adjusting drilling fluid properties, etc. Operations of the flowchart 1300 continue at transition point H, which continues at transition point H of the flowchart 1300. From transition point H of the flowchart 1400, operations are complete.

At block 1312, if particles are not decreasing in angularity and increasing in size, it is determined if particles are decreasing in size and angularity. For example, with reference to FIGS. 1-3, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is decreasing. Similarly, particle angularity recorded during the previous unit of depth and time of drilling may be compared to the observed angularity of the cuttings 112 to identify if the angularity is decreasing. A threshold size and/or angularity change may be enforced which should be satisfied to determine that the observed changes quantify as an increase or decrease. If both size and angularity of particles are decreasing, it may be determined that hole cleanout is poor and/or current drilling parameters are not optimized. It may also be assumed that the drill bit 326 is wearing out.

If particles are not decreasing in size and angularity, operations of the flowchart 1300 continue at transition point H, which continues at transition point H of the flowchart 1400. From transition point H of the flowchart 1400, operations are complete. If particles are decreasing in size and angularity, operations of the flowchart 1300 continue at transition point M, which continues at transition point M of the flowchart 1400. From transition point M of the flowchart 1400, operations continue at block 1402.

At block 1402, a notification or alarm is output. The notification or alarm may indicate that the hole cleanout is poor. The notification or alarm may also indicate that the current drilling parameters are not optimized. The notification or alarm may also indicate that the drill bit is breaking down. For instance, with reference to FIGS. 1-3, the processors 130 can generate the notification or alarm which is output to the display 196.

At block 1404, drilling is modified by increasing hole cleanout, updating drilling parameters, and/or replacing the drill bit. For example, with reference to FIGS. 1-3, cleanout of the borehole 312 may be increased (e.g., by increasing flow rate of drilling fluid or adjusting drilling fluid properties). Drilling parameters may be updated by modifying rotation speed of the drill string 308, adjusting penetration rate of the drill bit 326, etc. The drill bit 326 may also be replaced.

Size and Shape Distribution-Based Analysis Operations of Downhole Drill Cuttings In some embodiments, a size distribution curve and/or a shape (angularity) distribution curve can be determined and used. The use of these distribution curves can be in place of or in addition to the operations above that are based on changes in the size, angularity and/or volume of the cuttings (described above). FIGS. 15-24 are flowcharts of operations for evaluating and possibly altering downhole drilling operations based on analysis of size and shape distributions of particles in downhole cuttings, according to some embodiments. Operations of flowcharts 1500-2400 of FIGS. 15-24 continue among each other through transition points N-DD. Operations of the flowcharts 1500-2400 can be performed by software, firmware, hardware or a combination thereof. The operations of the flowchart 1500 start at block 1502.

At block 1502, shape and size of individual particles from cuttings returned to the surface during drilling of a borehole are calibrated for. Calibration of particle analysis can be performed with items of a known size and shape. For instance, with reference to FIGS. 1-3, the imaging device 124 focuses on the cuttings 112. Calibration may occur when the cuttings 112 are on the shaker 104 itself or when the cuttings are on another flat surface with the same focal length. Size and shape data can be communicated to the workstation 156. The lasers 190 and/or 192 may be used to mark known sizes and/or shapes on the shaker 104. As similarly described with reference to FIGS. 9-14, when performing size and shape distribution-based analysis of cuttings from downhole, size can be used in addition to or in place of volume. Size is a two-dimensional measurement of a single cutting and is proportional to change in volume that is a three-dimensional measurement. Shape changes can be defined as changes in angularity, where higher angularities correspond to smaller angles and lower angularities correspond to larger angles.

At block 1504, a borehole is drilled with a drill string that includes sections of drill pipe and a drill bit. For example, with reference to FIGS. 1-3, the drill bit 326 included on the bottommost portion of the drill string 308 drills the borehole 312. The drill string 308 includes one or more sections of drill pipe 318.

At block 1506, actual cuttings and fluid are captured in a shaker screen at the surface for the unit of depth and time. For example, with reference to FIGS. 1-3, cuttings from the subsurface formation 314 are created during operation of the drill bit 326. Drilling fluid is used to remove the cuttings. The drilling fluid and cuttings are returned to the surface 304 during drilling of the borehole 312 for the determined unit of depth and time. The shaker screen 108 receives the drilling fluid which includes the cuttings. The drilling fluid may be filtered before or after it is received by the shaker screen 108 as to remove drilling fluid from the cuttings prior to analysis.

At block 1508, a bit depth is determined based on the number of joints of drill pipe. The depth of the drill bit can be calculated if the number of joints of drill pipe and the lengths of each respective joint of drill pipe are known. For example, with reference to FIGS. 1-3, the depth of the drill bit 326 is determined based on the number of joints of drill pipe 318 and the known lengths of each of the drill pipe 318 joints.

At block 1510, a pump rate of drilling fluid through the drill pipe is determined. The pump rate may be provided in pump strokes or volume of fluid pumped per minute. For example, with reference to FIGS. 1-3, the pump rate in addition to other drilling parameters may be stored in memory 150. The processors 130 may retrieve the pump rate from memory 150.

At block 1512, a volume of the annulus is determined. For example, with reference to FIGS. 1-3, the processor 130 can calculate the volume of the annular area 340. The processor 130 may determine the volume based on the diameter of the borehole 312, diameter of the drill pipe 318, and the depth of the drill bit 326.

At block 1514, a lag is determined based on the bit depth, the pump rate, and the volume of the annulus. The annular volume at the particular measured depth corresponding to the drill bit is determined based on the known drill bit depth and volume of the annulus. The lag can then be calculated using the resulting annular volume and the pump rate. For example, referring to FIGS. 1-3, the processors 130 can calculate the lag based on the depth of the drill bit 326, the volume of the annular area 340, and the pump rate of the mud pump 332. Operations of the flowchart 1500 continue at transition point N, which continues at transition point N of the flowchart 1600. From transition point N of the flowchart 1600, operations continue at block 1602.

At block 1602, a depth from which the actual cuttings are associated is determined based on the drill bit depth and lag. The annular volume at the particular measured depth corresponding to the drill bit is determined based on the known drill bit depth and volume of the annulus. The lag can then be calculated using the resulting annular volume and the pump rate. For example, referring to FIGS. 1-3, the processors 130 can calculate the lag based on the depth of the drill bit 326, the volume of the annular area 340, and the pump rate of the mud pump 332.

At block 1604, a camera is used to determine angularity and size distributions of particles in the cuttings in the shaker screen for the unit of depth and time. For example, with reference to FIGS. 1-3, the imaging device 124 focuses on the cuttings 112 and records images of the cuttings 112. The processors 130 may analyze the received images to determine corresponding shape and size data as similarly described with reference to FIGS. 9-14. The processors 130 may analyze the shape and size data to determine relative volume corresponding to observed shapes and sizes of particles. The processors 130 then generate angularity and size distribution curves based on the obtained shape and size data and relative volumes. The resulting angularity and size distribution data may subsequently be stored in memory 150.

At block 1606, trends of indicators of improper hole cleaning are captured. Example indicators of improper hole cleaning include changes in torque, drag, equivalent circulating density, and standpipe pressure. For instance, with reference to FIGS. 1-3, the processors 130 can obtain improper hole cleaning indicator data over a unit of depth and/or time for storage in memory 150. For example, the processors 130 may obtain current drilling parameters, mud weight, depth of the drill bit 326, etc. Data obtained for the time or depth interval can be input into calculations for determining values of the indicators. The combination of such indicators may be combined to create a positive indicator for improper hole cleaning.

At block 1608, it is determined if a size distribution indicates an increase in particle size and angularity distribution remains unchanged. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. Thresholds may be established for determining if an increase or decrease can be attributed to error. For example, if an increase in the mean particle size exceeds the threshold, it may be determined that the particle size has increased. If an increase in the mean angularity does not exceed the threshold and the spread is approximately equal, it may be determined that the angularity distribution is unchanged. An increase in particle size without a change in angularity may indicate that the formation has changed and/or that the pore pressure of the formation has increased relative to the drilling fluid weight.

At block 1610, if the size distribution indicates an increase in particle size and the angularity distribution is unchanged, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure of the formation is greater than the drilling fluid weight.

At block 1612, drilling is modified by increasing the drilling fluid weight. For example, with reference to FIGS. 1-3, the density of the drilling fluid pumped from the mud pit 334 downhole can be increased (e.g., through addition of barite or other additives). Operations of the flowchart 1600 continue at transition point Q, which continues at transition point Q of the flowchart 2400. From transition point Q of the flowchart 2400, operations are complete.

At block 1614, if the size distribution does not indicate an increase in particle size and/or the angularity distribution has changed, it is determined if the size distribution indicates a decrease in particle size and the angularity distribution is unchanged. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. Thresholds may be established for determining if an increase or decrease can be attributed to error and should be regarded as no change during analysis. When the distribution curves indicate that the size of particles is decreasing and the angularity distribution remains unchanged, it can be determined that the formation has changed and the pore pressure of the formation has reduced. Also, in this situation, can be determined that the drill bit 326 is breaking down (e.g., wearing out) and is no longer fully functional.

If the size distribution indicates a decrease in particle size and the angularity distribution is unchanged, operations of the flowchart 1600 continue at transition point O, which continues at transition point O of the flowchart 1700. From transition point O of the flowchart 1700, operations continue at block 1702. If the size distribution does not indicate a decrease in particle size and/or the angularity distribution has changed, operations of the flowchart 1600 continue at transition point P, which continues at transition point P of the flowchart 1700. From transition point P of the flowchart 1700, operations continue at block 1706.

At block 1702, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure of the formation has decreased. The notification or alarm could also indicate that the drill bit 326 is breaking down.

At block 1704, drilling is modified by replacing the drill bit. For instance, with reference to FIGS. 1-3, after determining that the drill bit 326 is breaking down, the drill bit 326 may be replaced for subsequent drilling operations. Operations of the flowchart 1700 continue at transition point Q, which continues at transition point Q of the flowchart 2400. From transition point Q of the flowchart 2400, operations are complete.

At block 1706, it is determined if a bimodal size distribution develops with a new peak at a smaller size and the angularity distribution is unchanged. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If a bimodal distribution occurs for the size distribution such that the new distribution is at a smaller size and angularity distribution does not change, it can be assumed that the formation has changed and/or the pore pressure of the formation has increased relative to the drilling mud weight. Also, in this situation, it can be assumed that the borehole cleaning is poor and cuttings are tumbling and remaining downhole (i.e., not returning to the surface). This information, when coupled with information such as changes in torque, drag, equivalent circulating density, standpipe pressure, etc., can lead to a positive indicator for improper borehole cleaning. Additionally, it can be assumed that the drill bit 326 is breaking down (e.g., wearing out) and is no longer fully functional.

At block 1708, if a bimodal size distribution develops with a new peak at a smaller size and the angularity distribution is unchanged, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure of the formation is greater than the drilling fluid weight. The notification or alarm may indicate that hole cleanout is poor. The notification or alarm could also indicate that the drill bit 326 is breaking down.

At block 1710, drilling is modified by increasing the weight of drilling fluid, increasing hole cleanout, and/or replacing the drill bit. For example, with reference to FIGS. 1-3, the density of the drilling fluid pumped from the mud pit 334 downhole can be increased (e.g., through addition of barite or other additives). Cleanout of the borehole 312 may be increased by increasing flow rate of drilling fluid, pumping pills, adjusting drilling fluid properties, or bottoms up cleaning etc. The drill bit 326 may also be replaced for subsequent drilling operations. Operations of the flowchart 1700 continue at transition point Q, which continues at transition point Q of the flowchart 2400. From transition point Q of the flowchart 2400, operations are complete.

At block 1712, if a bimodal size distribution does not develop with a new peak at a smaller size and/or the angularity distribution has changed, it is determined if a bimodal size distribution develops with a new peak at a larger size and the angularity distribution is unchanged. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If a bimodal distribution occurs for the size distribution such that the new distribution is at a larger size, it can be assumed that the formation has changed and/or the pore pressure of the formation has increased relative to the drilling fluid weight.

If a bimodal size distribution develops with a new peak at a larger size and the angularity distribution is unchanged, operations of the flowchart 1700 continue at transition point R, which continues at transition point R of the flowchart 1800. From transition point R of the flowchart 1800, operations continue at block 1802. If a bimodal size distribution does not develop with a new peak at a larger size and/or the angularity distribution has changed, operations of the flowchart 1700 continue at transition point S, which continues at transition point S of the flowchart 1800. From transition point S of the flowchart 1800, operations continue at block 1806.

At block 1802, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure of the formation is greater than the drilling fluid weight.

At block 1804, drilling is modified by increasing the weight of the drilling fluid. For example, with reference to FIGS. 1-3, the density of the drilling fluid pumped from the mud pit 334 downhole can be increased (e.g., through addition of barite or other additives). Operations of the flowchart 1800 continue at transition point Q, which continues at transition point Q of the flowchart 2400. From transition point Q of the flowchart 2400, operations are complete.

At block 1806, it is determined if the angularity distribution indicates an increase in angularity of particles and the size distribution remains unchanged. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. Thresholds may be established for determining if an increase or decrease can be attributed to error and should be regarded as no change during analysis. If an increase in angularity without a change in size is observed, it can be determined that the formation has changed and/or the pore pressure of the formation has increased.

At block 1808, if the angularity distribution indicates an increase in angularity of particles and the size distribution remains unchanged, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure of the formation has increased.

At block 1810, drilling is modified by increasing the weight of drilling fluid. For example, with reference to FIGS. 1-3, the density of the drilling fluid pumped from the mud pit 334 downhole can be increased (e.g., through addition of barite or other additives). Operations of the flowchart 1800 continue at transition point Q, which continues at transition point Q of the flowchart 2400. From transition point Q of the flowchart 2400, operations are complete.

At block 1812, if the angularity distribution does not indicate an increase in angularity of particles and/or the size distribution has changed, it is determined if the angularity distribution indicates a decrease in particle angularity and the size distribution is unchanged. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. Thresholds may be established for determining if an increase or decrease can be attributed to error and should be regarded as no change during analysis. If the angularity distribution indicates a shift to a lower particle angularity without a change in the size distribution, it can be assumed that the borehole cleaning is poor and cuttings are tumbling and remaining downhole and/or that the drill bit 326 is breaking down and is no longer fully functional. This information, when coupled with information such as changes in torque, drag, equivalent circulating density, standpipe pressure, etc., can lead to a positive indicator for improper borehole cleaning.

If the angularity distribution indicates a decrease in particle angularity and the size distribution is unchanged, operations of the flowchart 1800 continue at transition point T, which continues at transition point T of the flowchart 1900. From transition point T of the flowchart 1900, operations continue at block 1902. If the angularity distribution does not indicate a decrease in particle angularity and/or the size distribution has changed, operations of the flowchart 1800 continue at transition point U, which continues at transition point U of the flowchart 1900. From transition point U of the flowchart 1900, operations continue at block 1906.

At block 1902, a notification or alarm is output. For instance, with reference to FIGS. 1-3, the processors 130 can generate the notification or alarm which is output to the display 196. The notification or alarm may indicate that hole cleanout is poor. The notification or alarm could also indicate that the drill bit 326 is breaking down.

At block 1904, drilling is modified by increasing hole cleanout and/or replacing the drill bit. For instance, with reference to FIGS. 1-3, cleanout of the borehole 312 may be increased by increasing flow rate of drilling fluid, adjusting drilling fluid properties, etc., The drill bit 326 may also be replaced for subsequent drilling operations. Operations of the flowchart 1900 continue at transition point Q, which continues at transition point Q of the flowchart 2400. From transition point Q of the flowchart 2400, operations are complete.

At block 1906, it is determined if a bimodal angularity distribution has developed with a new peak at a lower angularity and the size distribution is unchanged. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If a bimodal distribution occurs for the angularity distribution such that the new distribution is at a lower angularity, it can be assumed that the formation has changed and/or that the borehole cleaning is poor and cuttings are tumbling and remaining downhole. In this situation, it can also be assumed that the drill bit 326 is breaking down and is no longer fully functional. This information, when coupled with information such as changes in torque, drag, equivalent circulating density, standpipe pressure, etc., can lead to a positive indicator for improper borehole cleaning.

At block 1908, a bimodal angularity distribution develops with a new peak at a lower angularity and the size distribution is unchanged, a notification or alarm is output. For instance, with reference to FIGS. 1-3, the processors 130 can generate the notification or alarm which is output to the display 196. The notification or alarm could indicate that a formation change is occurring. The notification or alarm may indicate that hole cleanout is poor. The notification or alarm could also indicate that the drill bit 326 is breaking down.

At block 1910, drilling is modified by increasing hole cleaning and/or replacing the drill bit. For example, with reference to FIGS. 1-3, cleaning of the borehole 312 may be increased by increasing flow rate of drilling fluid, adjusting drilling fluid properties, etc. Alternatively or in addition, the drill bit 326 may be replaced for subsequent drilling operations. Operations of the flowchart 1900 continue at transition point Q, which continues at transition point Q of the flowchart 2400. From transition point Q of the flowchart 2400, operations are complete.

At block 1912, a bimodal angularity distribution does not develop with a new peak at a lower angularity and/or the size distribution has changed, it is determined if a bimodal angularity distribution has developed with a new peak at a higher angularity and the size distribution is unchanged. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. A bimodal distribution occurring for the angularity distribution such that the new distribution is at a higher angularity can indicate that the formation has changed and/or that the pore pressure of the formation has increased relative to the drilling fluid weight.

If a bimodal angularity distribution develops with a new peak at a higher angularity and the size distribution is unchanged, operations of the flowchart 1900 continue at transition point V, which continues at transition point V of the flowchart 2000. From transition point V of the flowchart 2000, operations continue at block 2002. If a bimodal angularity distribution does not develop with a new peak at a higher angularity and/or the size distribution has changed, operations of the flowchart 1900 continue at transition point W, which continues at transition point W of the flowchart 2000. From transition point W of the flowchart 2000, operations continue at block 2006.

At block 2002, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure of the formation is greater than the drilling fluid weight.

At block 2004, drilling is modified by increasing the weight of drilling fluid. For example, with reference to FIGS. 1-3, the density of the drilling fluid pumped from the mud pit 334 downhole can be increased (e.g., through addition of barite or other additives). Operations of the flowchart 2000 continue at transition point Q, which continues at transition point Q of the flowchart 2400. From transition point Q of the flowchart 2400, operations are complete.

At block 2006, it is determined if the angularity and size distributions have both increased. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Increases or decreases in distribution between the previous and current distribution curves may be determined based on mean, spread, standard deviation, etc. Thresholds may be established for determining if an increase or decrease can be attributed to error. Increases in both angularity distribution and size distribution may indicate that the formation has changed and/or that the pore pressure of the formation has increased.

At block 2008, if the angularity and size distributions have both increased, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure of the formation has increased.

At block 2010, drilling is modified by increasing the weight of the drilling fluid. For example, with reference to FIGS. 1-3, the density of the drilling fluid pumped from the mud pit 334 downhole can be increased (e.g., through addition of barite or other additives). Operations of the flowchart 2000 continue at transition point Q, which continues at transition point Q of the flowchart 2400. From transition point Q of the flowchart 2400, operations are complete.

At block 2012, if the angularity and size distributions have not both increased, it is determined if the angularity distribution is increasing and the size distribution is decreasing. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Increases or decreases in distribution between the previous and current distribution curves may be determined based on mean, spread, standard deviation, etc. If the angularity distribution increases and the size distribution decreases, it may be assumed that the formation has changed and/or that the drilling parameters are not optimized.

If the angularity distribution is increasing and the size distribution is decreasing, operations of the flowchart 2000 continue at transition point X, which continues at transition point X of the flowchart 2100. From transition point Y of the flowchart 2100, operations continue at block 2102. If the angularity distribution is not increasing and/or the size distribution is nondecreasing, operations of the flowchart 2000 continue at transition point Y, which continues at transition point Y of the flowchart 2100. From transition point W of the flowchart 2100, operations continue at block 2106.

At block 2102, a notification or alarm is output. For instance, with reference to FIGS. 1-3, the processors 130 can generate the notification or alarm which is output to the display 196. The notification or alarm could indicate that a formation change is occurring. The notification or alarm may also indicate that the current drilling parameters are not optimized.

At block 2104, drilling is modified by adjusting drilling parameters. For example, with reference to FIGS. 1-3, drilling parameters may be updated by modifying rotation speed of the drill string 308, adjusting penetration rate of the drill bit 326, etc. Operations of the flowchart 2100 continue at transition point Q, which continues at transition point Q of the flowchart 2400. From transition point Q of the flowchart 2400, operations are complete.

At block 2106, it is determined if the angularity distribution is decreasing and the size distribution is increasing. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Increases or decreases in distribution between the previous and current distribution curves may be determined based on mean, spread, standard deviation, etc. Thresholds may be established for determining if an increase or decrease can be attributed to error. If the angularity distribution has decreased and the size distribution has increased, it can be assumed that borehole cleaning is poor and cuttings are tumbling and remaining downhole. This information, when coupled with information such as changes in torque, drag, equivalent circulating density, standpipe pressure, etc., can lead to a positive indicator for improper borehole cleaning.

At block 2108, if the angularity distribution is decreasing and the size distribution is increasing, a notification or alarm indicating that hole cleanout is poor is output. For instance, with reference to FIGS. 1-3, the processors 130 can generate the notification or alarm which is output to the display 196.

At block 2110, drilling is modified by increasing hole cleaning. For instance, with reference to FIGS. 1-3, cleanout of the borehole 312 may be increased by increasing flow rate of drilling fluid, adjusting drilling fluid properties, etc. Operations of the flowchart 2100 continue at transition point Q, which continues at transition point Q of the flowchart 2400. From transition point Q of the flowchart 2400, operations are complete.

At block 2112, if the angularity distribution is not decreasing and/or the size distribution is nonincreasing, it is determined if the angularity and size distributions are both decreasing. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Increases or decreases in distribution between the previous and current distribution curves may be determined based on mean, spread, standard deviation, etc. Thresholds may be established for determining if an increase or decrease can be attributed to error. If the angularity and size distributions are both decreasing, it can be assumed that borehole cleaning is poor and cuttings are tumbling and remaining downhole. This information, when coupled with information such as changes in torque, drag, equivalent circulating density, standpipe pressure, etc., can lead to a positive indicator for improper borehole cleaning. In this situation, it can also be assumed that drilling parameters are not optimized. Additionally, it may be assumed that the drill bit 326 is breaking down and is no longer fully functional.

If the angularity and size distributions are both decreasing, operations of the flowchart 2100 continue at transition point Z, which continues at transition point Z of the flowchart 2200. From transition point Z of the flowchart 2100, operations continue at block 2202. If the angularity and size distributions are not both decreasing, operations of the flowchart 2100 continue at transition point AA, which continues at transition point AA of the flowchart 2200. From transition point AA of the flowchart 2200, operations continue at block 2206.

At block 2202, a notification or alarm is output. For instance, with reference to FIGS. 1-3, the processors 130 can generate the notification or alarm which is output to the display 196. The notification or alarm could indicate that a formation change is occurring. The notification or alarm may also indicate that the current drilling parameters are not optimized. The notification or alarm could also indicate that the drill bit 326 is breaking down.

At block 2204, drilling is modified by modifying drilling parameters and/or replacing the drill bit. For instance, with reference to FIGS. 1-3, drilling parameters may be updated by modifying rotation speed of the drill string 308, adjusting penetration rate of the drill bit 326, etc. The drill bit 326 may also be replaced for subsequent drilling operations. Operations of the flowchart 2200 continue at transition point Q, which continues at transition point Q of the flowchart 2400. From transition point Q of the flowchart 2400, operations are complete.

At block 2206, it is determined if bimodal distributions have developed for both angularity and size with new peaks at increases in angularity and size, respectively. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If bimodal distributions with new peaks at an increased angularity and size develop, it can be assumed that the formation has changed and/or that the pore pressure of the formation has increased.

At block 2208, if bimodal distributions have developed for both angularity and size with new peaks at increases in angularity and size, a notification or alarm is output. For instance, with reference to FIGS. 1-3, the processors 130 can generate the notification or alarm which is output to the display 196. The notification or alarm could indicate that a formation change is occurring. The notification or alarm could also indicate that the pore pressure of the formation has increased.

At block 2210, drilling is modified by increasing the weight of drilling fluid. For example, with reference to FIGS. 1-3, the density of the drilling fluid pumped from the mud pit 334 downhole can be increased (e.g., through addition of barite or other additives). Operations of the flowchart 1900 continue at transition point Q, which continues at transition point Q of the flowchart 2400. From transition point Q of the flowchart 2400, operations are complete.

At block 2212, if bimodal distributions have not developed for both angularity and size with new peaks at increases in angularity and size, it is determined if bimodal distributions have developed for both angularity and size with new peaks at a higher angularity and decreased size. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis.

If bimodal distributions have developed for both angularity and size with new peaks at an increased angularity and decreased size, operations of the flowchart 2200 continue at transition point BB, which continues at transition point BB of the flowchart 2300. From transition point BB of the flowchart 2300, operations continue at block 2302. If bimodal distributions have not developed for both angularity and size with new peaks at an increased angularity and decreased size, operations of the flowchart 2200 continue at transition point CC, which continues at transition point CC of the flowchart 2300. From transition point CC of the flowchart 2300, operations continue at block 2306.

At block 2302, a notification or alarm is output. For instance, with reference to FIGS. 1-3, the processors 130 can generate the notification or alarm which is output to the display 196. The notification or alarm could indicate that a formation change is occurring. The notification or alarm may also indicate that the current drilling parameters are not optimized. The notification or alarm could also indicate that the pore pressure of the formation has increased.

At block 2304, drilling is modified by modifying drilling parameters and/or increasing the weight of the drilling fluid. For example, with reference to FIGS. 1-3, drilling parameters may be updated by modifying rotation speed of the drill string 308, adjusting penetration rate of the drill bit 326, etc. The density of the drilling fluid pumped from the mud pit 334 downhole can be increased (e.g., through addition of barite or other additives). Operations of the flowchart 2300 continue at transition point Q, which continues at transition point Q of the flowchart 2400. From transition point Q of the flowchart 2400, operations are complete.

At block 2306, it is determined if bimodal distributions have developed for both angularity and size with new peaks at a lower angularity and increased size. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis.

At block 2308, if the angularity and size distributions are both bimodal with new peaks at increased size and lower angularity, a notification or alarm is output. For instance, with reference to FIGS. 1-3, the processors 130 can generate the notification or alarm which is output to the display 196. The notification or alarm could indicate that a formation change is occurring. The notification or alarm may indicate that hole cleanout is poor. The notification or alarm could also indicate that the pore pressure of the formation has increased.

At block 2310, drilling is modified by increasing hole cleaning and/or increasing the weight of drilling fluid. For instance, with reference to FIGS. 1-3, cleanout of the borehole 312 may be increased by increasing flow rate of drilling fluid, adjusting drilling fluid properties, etc. The density of the drilling fluid pumped from the mud pit 334 downhole can also be increased (e.g., through addition of barite or other additives). Operations of the flowchart 2300 continue at transition point Q, which continues at transition point Q of the flowchart 2400. From transition point Q of the flowchart 2400, operations are complete.

At block 2312, if the angularity and size distributions are not both bimodal with new peaks at increased size and lower angularity, it is determined if the angularity and size distributions are both bimodal with new peaks at decreased size and lower angularity. For instance, with reference to FIGS. 1-3, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If bimodal distribution occurs for both the size and angularity such that the new distribution for the size is decreasing and the new distribution for the angularity is lower, it can be assumed that the borehole cleaning is poor and cuttings are tumbling and remaining downhole. This information, when coupled with information such as changes in torque, drag, equivalent circulating density, standpipe pressure, etc., can lead to positive indicator for improper borehole cleaning. In this situation, it can also be assumed that current drilling parameters are not optimized and/or that the drill bit 326 is breaking down and is no longer fully functional.

If the angularity and size distributions are both bimodal with new peaks at decreased size and lower angularity, operations of the flowchart 2300 continue at transition point DD, which continues at transition point DD of the flowchart 2400. From transition point DD of the flowchart 2400, operations continue at block 2402. If the angularity and size distributions are both bimodal with new peaks at decreased size and lower angularity, operations of the flowchart 2000 continue at transition point Q, which continues at transition point Q of the flowchart 2400. From transition point Q of the flowchart 2400, operations are complete.

At block 2402, a notification or alarm is output. For instance, with reference to FIGS. 1-3, the processors 130 can generate the notification or alarm which is output to the display 196. The notification or alarm may indicate that hole cleanout is poor. The notification or alarm may also indicate that the current drilling parameters are not optimized. The notification or alarm could also indicate that the drill bit 326 is breaking down.

At block 2404, drilling is modified by increasing hole cleanout, updating drilling parameters, and/or replacing the drill bit. For example, with reference to FIGS. 1-3, cleanout of the borehole 312 may be increased by increasing flow rate of drilling fluid, adjusting drilling fluid properties, etc. Drilling parameters may also be updated by modifying rotation speed of the drill string 308, adjusting penetration rate of the drill bit 326, etc. The drill bit 326 also may be replaced for subsequent drilling operations.

Example Fracturing Application

Some embodiments can be used for processing and analyzing particles from downhole that are a result of fracturing operations. To illustrate, FIG. 25 depicts a schematic diagram of a system that includes downhole fracturing, according to some embodiments. In FIG. 25, a formation 2500 is composed of porous and permeable rocks that include hydrocarbons, e.g., in a reservoir, located in an onshore environment or in an offshore environment. The formation 2500 may be located in the range of a few hundred feet to a few tens of thousands of feet below a ground surface. A wellbore 2504 is drilled to penetrate the formation 2500 and to allow production of hydrocarbons from the formation 2500. The wellbore 2504 of FIG. 25 is formed at any suitable angle to reach the hydrocarbon portion of the formation 2500. For example, the wellbore 2504 can follow a near-vertical, partially-vertical, angled, or even a partially-horizontal path through the formation 2500. The wellbore 2504 may be lined with a protective lining 2506 extending through the formation 2500. The protective lining 2506 can include a casing, liner, piping, or tubing and is made of any material, including steel, alloys, or polymers, among others. The protective lining 2506 of FIG. 25 extends vertically downward and continues horizontally to further extend through the formation 2500. In other examples, the wellbore 2504 can be completely or partially lined or fully openhole, i.e., without the protective lining.

Hydrocarbons are located in the pore volume space of the formation 2500 and may be produced when the pore spaces are connected and permeability, or the ability to transmit proppants, is such that the hydrocarbons flow out of the formation 2500 and into the wellbore 2504. In some cases, the formation 2500 may have low permeability, and the hydrocarbons do not readily flow, or production is hampered due to formation damage. Thus, to further stimulate and to extract the hydrocarbons, a reservoir stimulation treatment program is initiated to break, fracture, or induce dilation of existing natural fractures in the rock of the formation 2500. The reservoir stimulation treatment program can include perforating the protective lining 2506, or installing stimulation specific protective lining equipment, to create formation entry points 2514, e.g., perforations, sliding stimulation sleeves, etc. The formation entry points 2514 provide a pathway for the hydrocarbons to flow from the formation 2500 and into the wellbore 2504.

Mechanical isolation and compartmentalization tools can be used such that the formation entry points 2514 segment the formation 2500 into any number of production zones where fracturing programs can be carried out. As shown in FIG. 25, the formation 2500 includes a first production zone 2508, a second production zone 2510, and a third production zone 2512. Each zone 2508, 2510, 2512 can be stimulated individually or simultaneously with other zones depending on the mechanical isolation and compartmentalization system employed. It should be understood that the number of zones in FIG. 25 is one example embodiment and that a wide variety of other examples, including increasing or decreasing the number of zones in the formation 2500, are possible.

The reservoir stimulation treatment program of the embodiments includes injecting proppants (such as a pressurized treating fluid 2516) into the wellbore 2504 to stimulate one or more of the production zones 2508, 2510, 2512. The treating fluid 2516 can be stored in injection equipment 2532, such as a storage tank or pipeline. The treating fluid 2516 is pumped from the injection equipment 2532 and into the wellbore 2504 with pressure greater than the fracture gradient or fissure opening pressure of the formation 2500. Other suitable programs can be used to flow the treating fluid 2516 into the wellbore 2504, for example, via a conduit, such as coiled tubing or piping, located within the wellbore 2504. As the treating fluid 2516 flows through the formation entry points 2514, the increased pressure created by the flowing treating fluid 2516 cracks the formation 2500 to create or further widen a network of fractures 2518. The network of fractures 2518 of FIG. 25 may include high flow capacity fractures 2524 and low flow capacity fractures 2526. The high flow capacity fractures 2524 are located in lower relative total stress areas of the stimulation interval where fluids from a conventional hydraulic fracturing treatment can be injected with little or no mechanical manipulation. The low flow capacity fractures 2526 are located in higher relative total stress areas where little to no fluids from a convention hydraulic fracturing treatment would be injected without mechanical manipulation.

The treating fluid 2516 includes a carrier fluid, i.e., a fracturing fluid 2528, and may also include a stimulation material 2530 at times. The fracturing fluid 2528 can include energized or non-energized water, brine, gels, cross-linked fluids, mineral or organic acids, non-aqueous based fluids, or any other type of fluids capable of fracturing the formation 2500 and transporting the stimulation material 2530 into the fractures 2524, 2526. The stimulation material 2530 is suspended in the fracturing fluid 2528 and settles into the high flow capacity fractures 2524, or low flow capacity fractures 2526 to hold the fractures open so as to permit the flow of hydrocarbons from the reservoir and into the wellbore 2504. The stimulation material 2530 can include proppant, such as small spheres composed of sand, ceramic material, plastics, and resins, or other conductivity enhancement materials.

The treating fluid 2516 may also include additives to optimize the fracturing program. The types of additives used can vary depending on the properties of the formation 2500 and the composition of the treating fluid 2516, among other factors. In particular, the additives can include stabilizers, surfactants, foamers, gel breakers, fluid loss additives, friction reducers, scale inhibitors, biocides, and pH control additives, and the like. In the embodiments, an additive (i.e., a flow constraint material (FCM) 2520) can be stored in FCM injection equipment 2534 to be injected into the wellbore 2504. Accordingly, the FCM 2520 can flow simultaneously with the treating fluid 2516 into the wellbore 2504. The FCM 2520 can be a particulate, rheological, or chemical additive that partially constrains or redistributes the flow of the treating fluid 2516 to a higher relative stress area, e.g., the low flow capacity fractures 2526, without completely diverting the fluid 2516 from the lower total stress area, e.g., the area where the high flow capacity fractures 2524 are located.

Analysis Operations of Downhole Particles from Fracturing Operations

Figure 26:
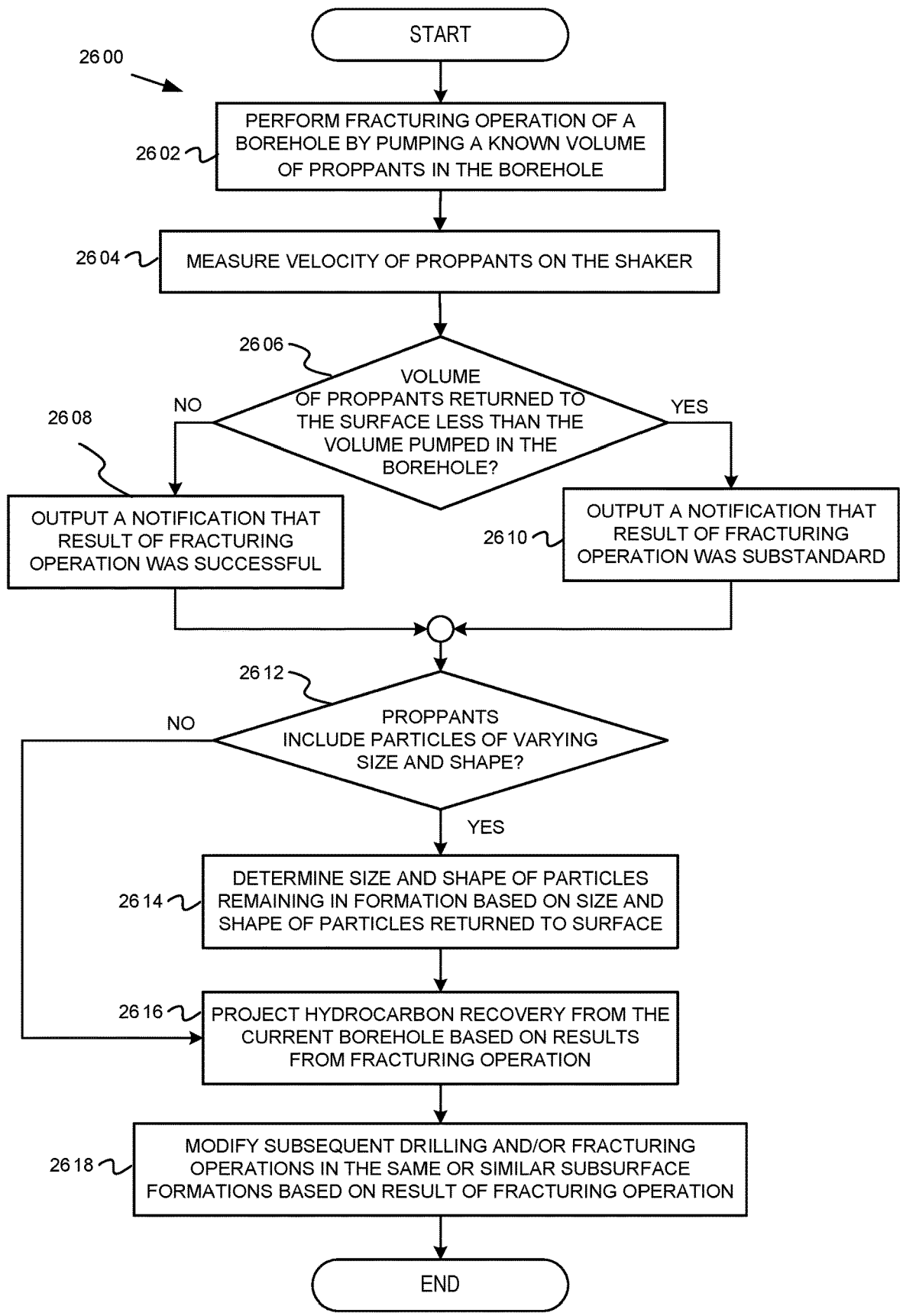
FIG. 26 is a flowchart of operations for evaluating and using results of a fracturing operation, according to some embodiments.

Example operations of analyzing and using downhole particles returned to the surface from fracturing operations. FIG. 26 is a flowchart of operations for evaluating and using results of a fracturing operation, according to some embodiments. Operations of flowchart 2600 can be performed by software, firmware, hardware, or a combination thereof. The operations of the flowchart 2600 start at block 2602.

At block 2602, a fracturing operation of a borehole is performed by pumping a known volume of proppant (e.g., sand) in the borehole. For instance, with reference to FIG. 25, injection equipment 2532 pumps fracturing fluid 2528 ("fluid 2528") into the wellbore 2504. The fluid 2528 contains a known volume of proppant. Proppant may remain in the fractures 2518 in the wellbore 2504 to keep the fractures 2518 open.

At block 2604, the velocity of the proppants on the shaker is determined. The velocity of the proppants may be determined using traditional approach of tracking a particle over a certain distance for a certain amount of time. For example, with reference to FIGS. 1-3, the imaging device 124, in conjunction with a velocity capture algorithm can be used to track the velocity of the proppants. Other methods using radars, may also be used to determine velocity of particles. This can be done by mounting a reference target on a static portion of the shaker 104 and capturing the pixel movement using the imaging device 124. An algorithm may be selected to capture the pixel movement on the shaker 104. Other methods, using accelerometers may also be used to baseline the vibrations on the shaker screen 108.

At block 2606, it is determined if the volume of proppant returned to the surface is less than the volume of proppant pumped in the borehole. The volume of proppant returned to the surface is determined with a process similarly used during volume analysis of downhole particles as described with reference to FIGS. 3-5. For example, with reference to FIGS. 1 and 25, the fluid 2528 and proppant are returned to the surface and deposited onto the shaker screen 108. The lasers 190 and/or 192 may then emit coherent electromagnetic radiation onto the proppant deposited onto the shaker screen 108. The imaging device 124 captures an image of the line of coherent radiation. The processors 130 can analyze the captured image to determine the distance between the initial line and the deflection of the line resulting from contact with the proppant. The resulting distance is used to determine the volume of the proppant which has been returned to the surface based on geometric relationships between known distances and/or thicknesses (e.g., with triangle properties) and/or by comparing the measured distance with distances previously measured for objects of a known thickness which are stored in memory 150 (e.g., in a lookup table). Volume of the proppants can be obtained by multiplying the surface area of the cuttings (determined by laser deflection) and the velocity of proppants passing over the laser line. An error threshold for the volume of proppant returned to the surface may be enforced. If the volume of proppant returned to the surface exceeds the error threshold, the fracturing operations can be defined as not being properly performed. For instance, an error threshold of 10% of the initial volume may be established. If the volume of proppant returned to the surface exceeds 10% of the volume initially pumped into the wellbore 2504, it is determined that an insufficient amount of proppant remained in the fractures 2518.

At block 2608, if the volume of proppants returned to the surface is not less than the volume of proppants pumped in the borehole, a notification or alarm which indicates that the result of the fracturing operation was successful is output. For instance, with reference to FIGS. 1 and 25, the processors 130 can generate the notification or alarm which is output to the display 196. A fracturing operation can be considered successful if essentially all of the proppants remain in the fractures 2518 (e.g., the percent of the proppant pumped into the wellbore 2504 which is returned to the surface is within the error threshold).

At block 2610, if the volume of proppants returned to the surface is less than the volume of proppants pumped in the borehole, a notification or alarm which indicates that the result of the fracturing operations was substandard is output. For instance, with reference to FIGS. 1 and 25, the processors 130 can generate the notification or alarm which is output to the display 196.

At block 2612, it is determined if the proppant returned to the surface includes particles of varying size and shape. The fluid which contains proppants returned to the surface may also include particles from the formation. Accordingly, a determination can be made as to which particles (specific to size and/or shape) were returned to the surface instead of remaining downhole (e.g., in the formation). The presence of particles with varying sizes and shapes can be determined through particle shape and size analysis as similarly described with reference to FIGS. 6-11 and/or FIGS. 12-21. For instance, with reference to FIGS. 1 and 25, the particles of the proppant can correspond to a distinct shape and size. This shape and size may be calibrated for prior to pumping the fluid 2528 into the wellbore 2504. After the fluid 2528 containing proppant and/or particles from the formation 2500 has returned to the surface and has been deposited into the shaker screen 108, images of the proppant and/or particles are captured with the imaging device 124. The images and the shape and size data determined from the images can be stored in memory 150. The shapes and sizes and/or shape and size distributions can be observed to determine if particles which deviate from the expected shape and size of the proppant have been returned to the surface. For instance, when performing shape (i.e., angularity) and size distribution analysis, the processors 130 generate size and angularity distributions based on the shape and size data collected for the particles. The processors 130 can then determine whether shapes and/or sizes outside of those expected for the proppant are present. For instance, distribution spreads may be generated for the particles contained in the shaker screen 108. An error threshold corresponding to observed distribution spread may be established. If the spread of the angularity and/or size distributions for the particles returned with the fluid 2528 exceeds the error threshold, the processors 130 may determine that particles of varying size and shape from the formation 2500 have been returned to the surface with the proppant. If particles of varying size and shape have been returned with the proppant, operations continue at block 2612. Otherwise, if particles of varying size and shape were not returned with the proppant, operations continue at block 2614.

At block 2614, the size and shape of particles remaining in the formation are determined based on the size and shape of particles which are returned to the surface. For instance, with reference to FIGS. 1 and 25, the processors 130 may analyze the shape and size data obtained for the particles from the formation 2500 captured in the shaker screen 108 as similarly described with reference to FIGS. 6-11 and 12-21 (e.g., by analyzing images of the particles in the shaker screen 108). The particles returned to the surface with the fluid 2528 can be determined to be similar in size and shape with respect to the particles which remain in the formation 2500. For instance, based on analysis of the shape and angularity distributions, the processors 130 may determine that the particles from the formation 2500 correspond to a large size and a low angularity (e.g., through analysis of the distribution means, spreads, etc.) The results of particle analysis may be output to the display 196.

At block 2616, hydrocarbon recovery from the current borehole is projected based on the results of the fracturing operation. The volume of proppant remaining in the wellbore 2504 as a result of fracturing may be used to determine projected hydrocarbon recovery. Subsequent operations to determine hydrocarbon recovery from fracturing operations can leverage the knowledge of the proppant remaining in the wellbore 2504 and/or the shapes and sizes of particles dislodged from and/or remaining in the formation 2500.

At block 2618, subsequent drilling and/or fracturing operations in the same or similar subsurface formations are modified based on the result of the fracturing operation. For instance, if a low volume of proppant remains in the fractures 2518 (i.e., the volume of proppant returned to the surface exceeds the error threshold), subsurface formations with similar properties relative to the current formation may be avoided for subsequent fracturing operations. Completion of fracturing stages may also be altered.

Example Computer

FIG. 27 depicts an example computer, according to some embodiments. The computer includes a processor 2701 (possibly including multiple processors, multiple cores, multiple nodes, and/or implementing multi-threading, etc.). The computer includes memory 2707. The memory 2707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 2703 (e.g., PCI, ISA, PCI-Express, HyperTransport® bus, InfiniBand® bus, NuBus, etc.) and a network interface 2705 (e.g., a Fiber Channel interface, an Ethernet interface, an internet small computer system interface, SONET interface, wireless interface, etc.). While depicted as a computer with a processor executing program code, in some other embodiments, any type of device or apparatus can be used to perform operations described herein.

The computer also includes an analyzer 2711 and a controller 2715. The analyzer 2711 can perform processing and analyzing of the vibration of the shaker and the downhole particles (as described above). The controller 2715 can control the different operations that can occur in the response to results from the analysis. For example, the controller 2715 can communicate instructions to the appropriate equipment, devices, etc. to alter the drilling operations. Any one of the previously described functionalities may be partially (or entirely) implemented in hardware and/or on the processor 2701. For example, the functionality may be implemented with an application specific integrated circuit, in logic implemented in the processor 2701, in a co-processor on a peripheral device or card, etc. Further, realizations may include fewer or additional components not illustrated in FIG. 27 (e.g., video cards, audio cards, additional network interfaces, peripheral devices, etc.). The processor 2701 and the network interface 2705 are coupled to the bus 2703. Although illustrated as being coupled to the bus 2703, the memory 2707 may be coupled to the processor 2701.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Using the apparatus, systems, and methods disclosed herein may provide the ability to monitor changes in down hole particles (e.g., cuttings), so that the impact of drilling fluid properties and activities in the field can be assessed immediately. This ability may be used to increase efficiency by redirecting pumping and drilling operations in real-time, perhaps as part of a closed-loop control system.

While the aspects of the disclosure are described with reference to various implementations and exploitations, it will be understood that these aspects are illustrative and that the scope of the claims is not limited to them. In general, techniques for processing and analyzing of particles from downhole as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1

A method comprising: performing a downhole operation in a borehole; capturing, during the downhole operation, downhole particles and drilling mud at the surface from the borehole into a screen of at least one shaker; shaking the screen to emit vibrations to separate the downhole particles from the drilling mud; defining a vibration limit for a normal operating condition of the at least one shaker; setting a vibration fault threshold based on the vibration limit for the normal operating condition; monitoring, using at least one sensor, the vibrations over time; and determining there is a fault condition for the shaker, in response to the vibrations exceeding the vibration fault threshold.

Embodiment 2

The method of Embodiment 1, further comprising: capturing a trend of vibrations over time for the at least one shaker, wherein defining the vibration limit is based on the trend of vibrations over time for the at least one shaker.

Embodiment 3

The method of Embodiments 1 or 2, further comprising: setting a vibration maintenance threshold based on the vibration limit for the normal operating condition; and triggering an alarm for predictive maintenance of the at least one shaker, in response to the vibrations exceeding the vibration maintenance threshold.

Embodiment 4

The method of any one of Embodiments 1-3, wherein monitoring the vibrations comprises monitoring the vibrations in at least one of an X direction, a Y direction, and a Z direction.

Embodiment 5

The method of any one of Embodiments 1-4, wherein the fault condition comprises at least one of damaged rubber mounts on the at least one shaker, an unbalanced motor of the at least one shaker, the screen being damaged, a damaged spring of the at least one shaker, and improper installation of the screen.

Embodiment 6

The method of any one of Embodiments 1-5, wherein the at least one sensor comprises at least one of a strain gauge and a multi-axis accelerometer.

Embodiment 7

The method of any one of Embodiments 1-6, further comprising: monitoring number of revolutions per unit of time of a motor of the at least one shaker causing the shaking; and in response to determining the number of revolutions per unit of time exceed a revolution threshold and in response to the vibrations exceeding the vibration fault threshold, determining that the fault condition comprises a fault in the motor.

Embodiment 8

The method of Embodiment 7, further comprising: in response to determining that the number of revolutions per unit of time do not exceed the revolution threshold and in response to the vibrations exceeding the vibration fault threshold, determining that the fault condition comprises a mechanical fault of the at least one shaker and the screen of the at least one shaker and unrelated to the motor.

Embodiment 9

The method of any one of Embodiments 1-8, further comprising: determining a measured volume of the downhole particles on the screen at a time corresponding to when the vibrations are monitored; and in response to determining a difference between the measured volume and a projected volume of anticipated downhole particles exceeds a volume error threshold and in response to the vibrations not exceeding the vibration fault threshold, determining that a downhole condition is occurring based on the measured volume.

Embodiment 10

The method of any one of Embodiments 1-9, wherein determining the measured volume comprises: emitting coherent electromagnetic radiation onto the downhole particles in the screen of the at least one shaker; and determining the measured volume of the downhole particles based on the coherent electromagnetic radiation emitted into the downhole particles.

Embodiment 11

A method comprising: performing a downhole operation in a borehole; capturing, during the downhole operation, downhole particles and drilling mud at the surface from the borehole into a screen of at least one shaker; shaking the screen to emit vibrations to separate the downhole particles from the drilling mud; defining a vibration limit for a normal operating condition of the at least one shaker; setting a vibration fault threshold based on the vibration limit for the normal operating condition; monitoring, using at least one sensor, the vibrations over time; in response to the vibrations exceeding the vibration fault threshold, determining that there is a fault condition for the at least one shaker; determining a measured volume of the downhole particles on the screen at a time corresponding to when the vibrations are monitored; in response to determining a difference between the measured volume and a projected volume of anticipated downhole particles exceeds a volume error threshold and in response to the vibrations not exceeding the vibration fault threshold, determining that a downhole condition is occurring based on the measured volume; monitoring number of revolutions per unit of time of a motor of the at least one shaker causing the shaking; and in response to determining the number of revolutions per unit of time exceed a revolution threshold and in response to the vibrations exceeding the vibration fault threshold, determining that the fault condition comprises a fault in the motor.

Embodiment 12

The method of Embodiment 11, further comprising: triggering an alarm to indicate the fault condition and an alarm to indicate that the measured volume is invalid, in response to the vibrations exceeding the vibration fault threshold and in response to determining the difference between the measured volume and the projected volume of anticipated downhole particles exceeds the volume error threshold.

Embodiment 13

The method of Embodiments 11 or 12, further comprising: capturing a trend of vibrations over time for the at least one shaker, wherein defining the vibration limit is based on the trend of vibrations over time for the at least one shaker.

Embodiment 14

The method of Embodiments 11-13, further comprising: setting a vibration maintenance threshold based on the vibration limit for the normal operating condition; and triggering an alarm for predictive maintenance of the at least one shaker, in response to the vibrations exceeding the vibration maintenance threshold.

Embodiment 15

The method of Embodiments 11-14, further comprising: in response to determining that the number of revolutions per unit of time do not exceed the revolution threshold and in response to the vibrations exceeding the vibration threshold, determining that the fault condition comprises a mechanical fault of at least one of the shaker and the screen of the shaker and unrelated to the motor.

Embodiment 16

A system comprising: a shaker screen onto which downhole particles and fluid from a borehole are to be placed, the downhole particles a product of a downhole operation; at least one shaker to vibrate the shaker screen to separate the downhole particles from the fluid; at least one sensor on the at least one shaker to monitor vibrations of the at least one shaker over time; a device to define a vibration limit for a normal operating condition of the at least one shaker; set a vibration fault threshold based on the vibration limit for the normal operating condition; set a vibration maintenance threshold based on the vibration limit for the normal operating condition; trigger an alarm for predictive maintenance of the at least one shaker, in response to the vibrations exceeding the vibration maintenance threshold; and determine that there is a fault condition for the at least one shaker, in response to the vibrations exceeding the vibration fault threshold.

Embodiment 17

The system of Embodiment 16, further comprising: a coherent electromagnetic radiation emitter to emit coherent electromagnetic radiation onto the downhole particles on the shaker screen; and a camera to capture images of the coherent electromagnetic radiation being emitted onto the downhole particles, wherein the device is to determine a measured volume of the downhole particles on the shaker screen based on the images of the coherent electromagnetic radiation, in response to determining a difference between the measured volume and a projected volume of anticipated downhole particles exceeds a volume error threshold and in response to the vibrations not exceeding the vibration fault threshold, determining that a downhole condition occurring based on the measured volume.

Embodiment 18

The system of Embodiments 16 or 17, wherein the device is to, monitor number of revolutions per unit of time of a motor of the at least one shaker causing the vibrating; and in response to determining the number of revolutions per unit of time exceed a revolution threshold and in response to the vibrations exceeding the vibration fault threshold, determine that the fault condition comprises a fault in the motor.

Embodiment 19

The system of Embodiment 18, wherein the device is to, in response to determining that the number of revolutions per unit of time do not exceed the revolution threshold and in response to the vibrations exceeding the vibration fault threshold, determine that the fault condition comprises a mechanical fault of the at least one shaker and the shaker screen and unrelated to the motor.

Embodiment 20

The system of any one of Embodiments 16-19, wherein the at least one sensor comprises at least one of a strain gauge and a multi-axis accelerometer.

What is claimed is:

1. A method comprising:
   performing a downhole operation in a borehole;
   capturing, during the downhole operation, downhole particles and drilling mud at the surface from the borehole into a screen of at least one shaker;
   shaking the screen to emit vibrations to separate the downhole particles from the drilling mud;
   defining a vibration limit for a normal operating condition of the at least one shaker;
   setting a vibration fault threshold based on the vibration limit for the normal operating condition;
   monitoring, using at least one sensor, the vibrations over time;
   monitoring number of revolutions per unit of time of a motor of the at least one shaker causing the shaking;
   determining there is a fault condition for the at least one shaker, in response to the vibrations exceeding the vibration fault threshold; and
   in response to determining the number of revolutions per unit of time exceed a revolution threshold and in response to the vibrations exceeding the vibration fault threshold, determining that the fault condition comprises a fault in the motor.

2. The method of claim 1, further comprising:
   capturing a trend of vibrations over time for the at least one shaker, wherein defining the vibration limit is based on the trend of vibrations over time for the at least one shaker.

3. The method of claim 1, further comprising:
   setting a vibration maintenance threshold based on the vibration limit for the normal operating condition; and
   triggering an alarm for predictive maintenance of the at least one shaker, in response to the vibrations exceeding the vibration maintenance threshold.

4. The method of claim 1, wherein monitoring the vibrations comprises monitoring the vibrations in at least one of an X direction, a Y direction, and a Z direction.

5. The method of claim 1, wherein the fault condition comprises at least one of damaged rubber mounts on the at least one shaker, an unbalanced motor of the at least one shaker, the screen being damaged, a damaged spring of the at least one shaker, and improper installation of the screen.

6. The method of claim 1, wherein the at least one sensor comprises at least one of a strain gauge and a multi-axis accelerometer.

7. The method of claim 1, further comprising:
   in response to determining that the number of revolutions per unit of time do not exceed the revolution threshold and in response to the vibrations exceeding the vibration fault threshold, determining that the fault condition comprises a mechanical fault of the at least one shaker and the screen of the at least one shaker and unrelated to the motor.

8. The method of claim 1, further comprising:
   determining a measured volume of the downhole particles on the screen at a time corresponding to when the vibrations are monitored; and
   in response to determining a difference between the measured volume and a projected volume of anticipated downhole particles exceeds a volume error threshold and in response to the vibrations not exceeding the vibration fault threshold, determining that a downhole condition occurred based on the measured volume.

9. The method of claim 8, wherein determining the measured volume comprises:
   emitting coherent electromagnetic radiation onto the downhole particles in the screen of the at least one shaker; and
   determining the measured volume of the downhole particles based on the coherent electromagnetic radiation emitted into the downhole particles.

10. A method comprising:
    performing a downhole operation in a borehole;
    capturing, during the downhole operation, downhole particles and drilling mud at the surface from the borehole into a screen of at least one shaker;
    shaking the screen to emit vibrations to separate the downhole particles from the drilling mud;
    defining a vibration limit for a normal operating condition of the at least one shaker;
    setting a vibration fault threshold based on the vibration limit for the normal operating condition;
    monitoring, using at least one sensor, the vibrations over time;
    in response to the vibrations exceeding the vibration fault threshold, determining there is a fault condition for the at least one shaker;
    determining a measured volume of the downhole particles on the screen at a time corresponding to when the vibrations are monitored;
    in response to determining a difference between the measured volume and a projected volume of anticipated downhole particles exceeds a volume error threshold and in response to the vibrations not exceeding the vibration fault threshold, outputting, determining that a downhole condition occurring based on the measured volume;
    monitoring number of revolutions per unit of time of a motor of the at least one shaker causing the shaking; and
    in response to determining the number of revolutions per unit of time exceed a revolution threshold and in response to the vibrations exceeding the vibration fault threshold, determining that the fault condition comprises a fault in the motor.

11. The method of claim 10, further comprising:
    triggering an alarm to indicate the fault condition and an alarm to indicate that the measured volume is invalid, in response to the vibrations exceeding the vibration fault threshold and in response to determining the difference between the measured volume and the projected volume of anticipated downhole particles exceeds the volume error threshold.

12. The method of claim 10, further comprising:
    capturing a trend of vibrations over time for the at least one shaker, wherein defining the vibration limit is based on the trend of vibrations over time for the at least one shaker.

13. The method of claim 10, further comprising:
    setting a vibration maintenance threshold based on the vibration limit for the normal operating condition; and
    triggering an alarm for predictive maintenance of the at least one shaker, in response to the vibrations exceeding the vibration maintenance threshold.

14. The method of claim 10, further comprising:
    in response to determining that the number of revolutions per unit of time do not exceed the revolution threshold and in response to the vibrations exceeding the vibration fault threshold, determining that the fault condition comprises a mechanical fault of the at least one shaker and the screen of the at least one shaker and unrelated to the motor.

15. A system comprising:
a shaker screen onto which downhole particles and fluid from a borehole are to be placed, the downhole particles a product of a downhole operation;
at least one shaker to vibrate the shaker screen to separate the downhole particles from the fluid;
at least one sensor on the at least one shaker to monitor vibrations of the at least one shaker over time, wherein the at least one sensor comprises at least one of a strain gauge and a multi-axis accelerometer;
a device to,
   define a vibration limit for a normal operating condition of the at least one shaker;
   set a vibration fault threshold based on the vibration limit for the normal operating condition;
   set a vibration maintenance threshold based on the vibration limit for the normal operating condition;
   trigger an alarm for predictive maintenance of the at least one shaker, in response to the vibrations exceeding the vibration maintenance threshold; and
   determine there is a fault condition for the at least one shaker, in response to the vibrations exceeding the vibration fault threshold.

16. The system of claim 15, further comprising:
a coherent electromagnetic radiation emitter to emit coherent electromagnetic radiation onto the downhole particles on the shaker screen; and
a camera to capture images of the coherent electromagnetic radiation being emitted onto the downhole particles,
wherein the device is to,
   determine a measured volume of the downhole particles on the shaker screen based on the images of the coherent electromagnetic radiation; and
   in response to determining a difference between the measured volume and a projected volume of anticipated downhole particles exceeds a volume error threshold and in response to the vibrations not exceeding the vibration fault threshold, determine that a downhole condition is occurring based on the measured volume.

17. The system of claim 15, wherein the device is to,
monitor number of revolutions per unit of time of a motor of the at least one shaker causing the vibrating; and
in response to determining the number of revolutions per unit of time exceed a revolution threshold and in response to the vibrations exceeding the vibration fault threshold, determine that the fault condition comprises a fault in the motor.

18. The system of claim 17, wherein the device is to,
in response to determining that the number of revolutions per unit of time do not exceed the revolution threshold and in response to the vibrations exceeding the vibration fault threshold, determine that the fault condition comprises a mechanical fault of the at least one shaker and the shaker screen and unrelated to the motor.

* * * * *